US010595304B2

(12) United States Patent
Agiwal et al.

(10) Patent No.: US 10,595,304 B2
(45) Date of Patent: *Mar. 17, 2020

(54) APPARATUS AND METHOD FOR PERFORMING RANDOM ACCESS IN BEAM-FORMED SYSTEM

(71) Applicant: Samsung Electronics Co., Ltd., Suwon-si, Gyeonggi-do (KR)

(72) Inventors: Anil Agiwal, Suwon-si (KR); Youngbin Chang, Anyang-si (KR); Nigam Anshuman, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,030

(22) Filed: Feb. 14, 2019

(65) Prior Publication Data
US 2019/0182817 A1    Jun. 13, 2019

Related U.S. Application Data

(63) Continuation of application No. 15/443,562, filed on Feb. 27, 2017, now Pat. No. 10,278,160.

(60) Provisional application No. 62/300,333, filed on Feb. 26, 2016, provisional application No. 62/334,660, filed on May 11, 2016.

(51) Int. Cl.
*H04W 72/04* (2009.01)
*H04B 7/06* (2006.01)
*H04W 74/08* (2009.01)

(52) U.S. Cl.
CPC ...... *H04W 72/0406* (2013.01); *H04B 7/0617* (2013.01); *H04W 74/0833* (2013.01)

(58) Field of Classification Search
None
See application file for complete search history.

(56) References Cited

U.S. PATENT DOCUMENTS

| | | |
|---|---|---|
| 2009/0280867 A1 | 11/2009 | Hovers et al. |
| 2012/0320874 A1 | 12/2012 | Li et al. |
| 2012/0327872 A1 | 12/2012 | Han |
| 2013/0021952 A1 | 1/2013 | Jeong et al. |
| 2013/0102345 A1 | 4/2013 | Jung |
| 2013/0182683 A1 | 7/2013 | Seol et al. |
| 2014/0376466 A1 | 12/2014 | Jeong et al. |
| 2015/0208443 A1 | 7/2015 | Jung et al. |
| 2016/0157267 A1 | 6/2016 | Frenne et al. |

FOREIGN PATENT DOCUMENTS

WO    2015/147717 A1    10/2015

*Primary Examiner* — Saumit Shah
(74) *Attorney, Agent, or Firm* — Jefferson IP Law, LLP

(57) ABSTRACT

A method for performing a random access is provided. The method includes identifying a first downlink (DL) reception (RX) beam based on a measurement on a beam measurement signal, identifying a first uplink (UL) transmission (TX) beam corresponding to the identified first DL RX beam and transmitting at least one random access preamble for an RX sweeping at a base station, using the identified first UL TX beam based on a first power.

12 Claims, 50 Drawing Sheets

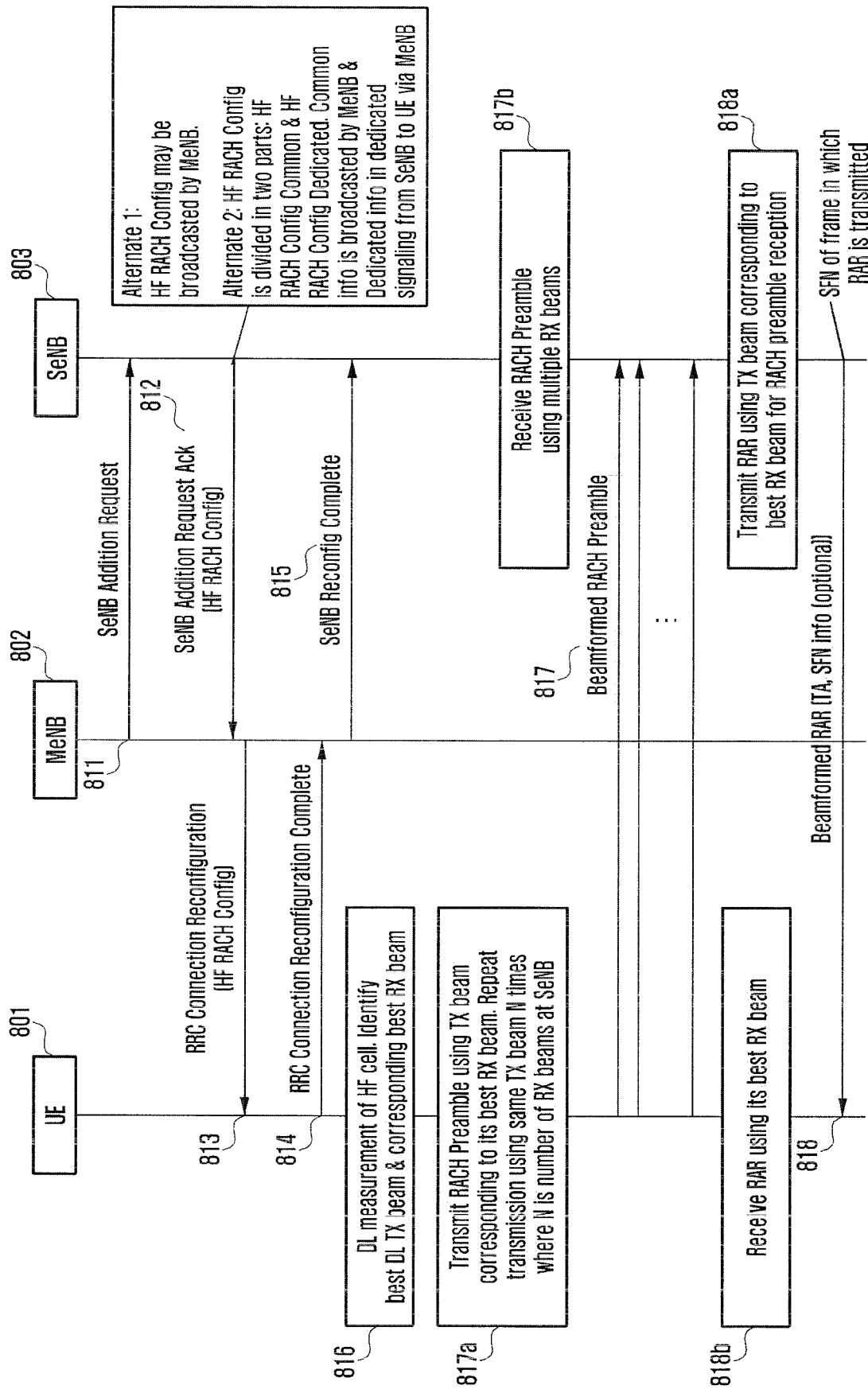

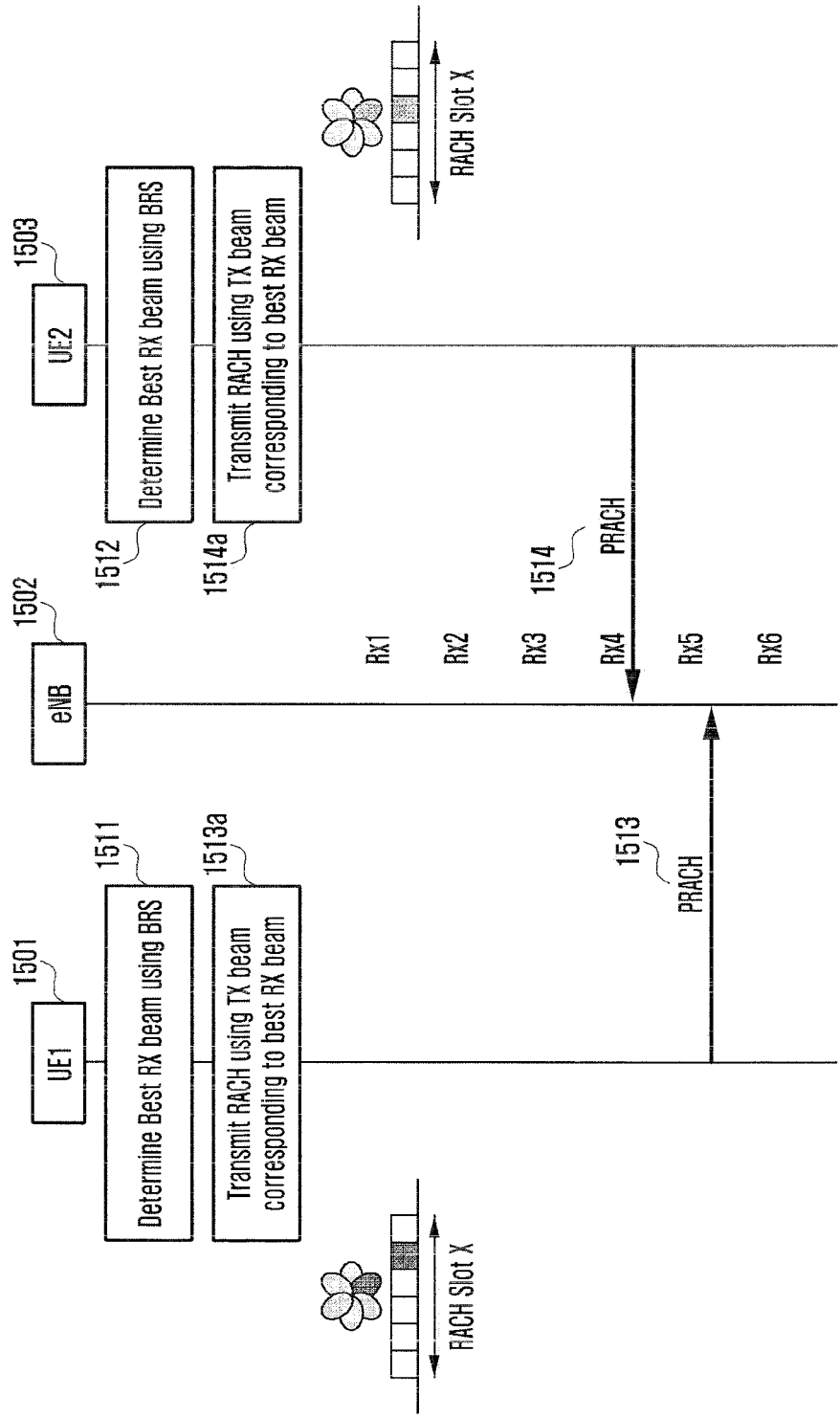

FIG. 23
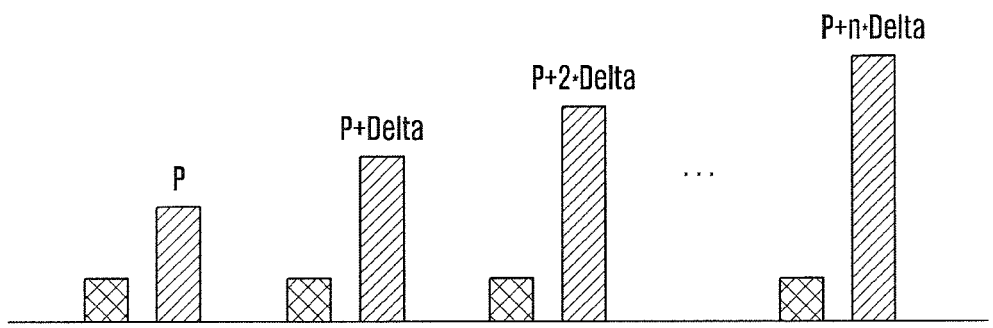
 Check DL Measurement result and identify best DL RX beam
 RACH preamble transmission using UL TX beam reciprocal to best DL RX beam. TX beam is transmitted multiple times for RX Sweeping at BS.

⊠ Check DL Measurement result and identify best DL RX beam

▨ RACH preamble transmission using UL TX beam reciprocal to best DL RX beam.
TX beam is transmitted one time or multiple times for RX Sweeping at BS.

☰ Beam is not changed

▥ Beam is changed

FIG. 29
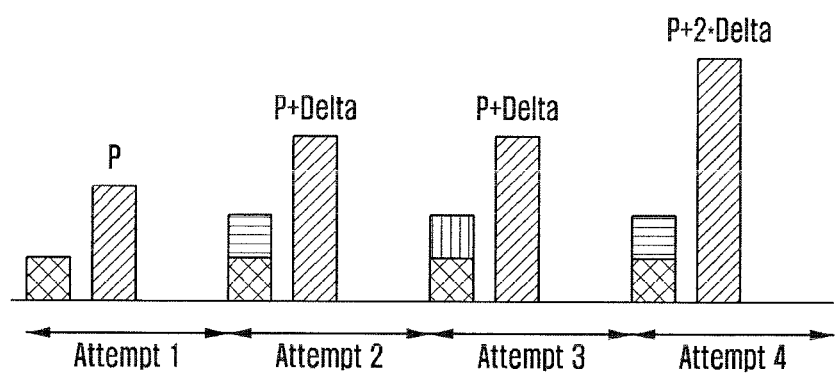
 Check DL Measurement result and identify best DL RX beam
 RACH preamble transmission using UL TX beam reciprocal to best DL RX beam. TX beam is transmitted one time or multiple times for RX Sweeping at BS.
 Beam is not changed
 Beam is changed

APPARATUS AND METHOD FOR PERFORMING RANDOM ACCESS IN BEAM-FORMED SYSTEM

CROSS-REFERENCE TO RELATED APPLICATION(S)

This application is a continuation application of prior application Ser. No. 15/443,562, filed on Feb. 27, 2017, which was based on and claimed priority 35 U.S.C. § 119(e) of a U.S. provisional patent application filed on Feb. 26, 2016 in the U.S. Patent and Trademark Office and assigned Ser. No. 62/300,333, and of a U.S. provisional patent application filed on May 11, 2016 in the U.S. Patent and Trademark Office and assigned Ser. No. 62/334,660, the disclosure of each of which is incorporated by reference herein in its entirety.

TECHNICAL FIELD

The present disclosure relates to wireless communication technologies. More particularly, the present disclosure relates to a filter bank multicarrier (FBMC) modulation-based signal transmitting method, signal receiving method and device.

BACKGROUND

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In the recent years, several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services.

A method of providing a generally high data transmission rate includes a method of providing communication using a wider frequency band and a method of increasing frequency usage efficiency. However, it is very difficult to provide a higher average data rate through the latter method. This is because communication technologies of a current generation provide frequency usage efficiency close to a theoretical limit and thus, it is very difficult to increase the frequency usage efficiency up to that or more through a technical improvement. Accordingly, it can be said that a feasible method for increasing the data transmission rate is a method of providing data services through the wider frequency band. At this time, the thing to consider is an available frequency band. In view of the current frequency distribution policy, a band in which a broadband communication of 1 GHz or more is possible is limited and a practically selectable frequency band is only the millimeter wave band of 30 GHz or more. Such a signal of the high frequency band causes severe signal attenuation according to a distance differently from a signal of a frequency band of 2 GHz used by the cellular systems of the related art. Due to such signal attenuation, service providing coverage of a base station using the same power as the cellular systems of the related art will be considerably reduced. In order to solve this problem, a beam forming technique is widely used which concentrates transmission/reception power into a narrow space to increase transmission/reception efficiency of an antenna.

Due to high path loss, heavy shadowing and rain attenuation reliable transmission at higher frequencies is one of the key issues that need to be overcome in order to make the millimeter wave systems a practical reality. The lower frequencies in cellular band having robust link characteristics can be utilized together with higher frequencies in mmWave band to overcome the reliability issues.

FIG. 1 illustrates a deployment of a wireless communication system using higher frequencies according to the related art.

Referring to FIG. 1, high frequency small cells are deployed in coverage of low frequency (LF) macro cell. Mobile station (MS) first connects with LF base station (BS)/eNB (master BS/eNB). LF BS/ENB adds high frequency (HF) BS (secondary BS) to meet quality of service (QoS) requirements high data rate (HDR). A user equipment (UE) communicates with both master BS/eNB and Secondary BS/eNB.

A typical procedure of adding a secondary BS in prior art is shown in FIG. 2 according to the related art.

FIG. 2 is a signal flow diagram illustrating a typical procedure of adding a secondary base station according to the related art.

Referring to FIG. 2, a master eNB (MeNB) decides to add a secondary eNB (SeNB) based on measurement result from the UE and sends addition request to the SeNB. The SeNB performs admission control and sends acknowledgement with the SeNB radio resource configuration. The MeNB sends the RRCConnectionReconfiguration message to the UE including the new radio resource configuration of the SeNB according to the SCG-Config. The UE applies the new configuration and replies with RRCConnectionReconfigurationComplete message. The MeNB informs the SeNB that the UE has completed the reconfiguration procedure successfully. The UE performs Uplink synchronisation towards the SeNB using the random access procedure. After the random access procedure, the UE may start transmitting and receiving the data from the SeNB.

In a beamformed system, the control plane operation is performed in a beam formed manner. In such a system, sending of the random access preamble (RACH) and the random access response (RAR) is also performed in a beam formed manner. However since at the time of random access procedure the best beams on which to operate are not known, the procedure typically involves sending the same information on multiple beams and attempted to be received by the receiver using all its receive beams. After this procedure, the best beams for transmission and reception are known at both the receiver and the transmitter. However this procedure is time consuming since it involves sending and receiving same information over multiple beams. Since future systems are required to achieve ultra-low latency and since random access is a typical process for establishment of data transfer, it is of utmost importance to optimize it to the maximum.

Therefore, a need exists for an enhanced random access procedure considering the beam forming.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for performing a random access by an apparatus in wireless communication system.

In accordance with an aspect of the present disclosure, a method for performing a random access by an apparatus in wireless communication system is provided. The method includes identifying a first downlink (DL) reception (RX) beam based on a measurement on a beam measurement signal, identifying a first uplink (UL) transmission (TX) beam corresponding to the identified first DL RX beam and transmitting at least one random access preamble for an RX sweeping at a base station, using the identified first UL TX beam based on a first power.

In accordance with another aspect of the present disclosure, an apparatus in wireless communication system is provided. The apparatus includes a transceiver configured to transmit and receive signals, and at least one processor configured to identify a first DL RX beam based on a measurement on a beam measurement signal, identify a first UL TX beam corresponding to the identified first DL RX beam, and transmit at least one random access preamble for an RX sweeping at a base station, using the identified first UL TX beam based on a first power.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a signal flow diagram illustrating a method for a beamformed random access procedure according to an embodiment of the present disclosure;

FIGS. 15A and 15B are signal flow diagrams illustrating a method for a beamformed random access procedure for identifying a correct RAR according to an embodiment of the present disclosure;

FIG. 23 is a schematic diagram illustrating a method for power ramping during a random access procedure in beamformed system according to an embodiment of the present disclosure;

FIG. 29 is a schematic diagram illustrating a method for power ramping during a random access procedure in beamformed system according to an embodiment of the present disclosure;

Throughout the drawings, it should be noted that like reference numbers are used to depict the same or similar elements, features, and structures.

DETAILED DESCRIPTION

Figure 1:
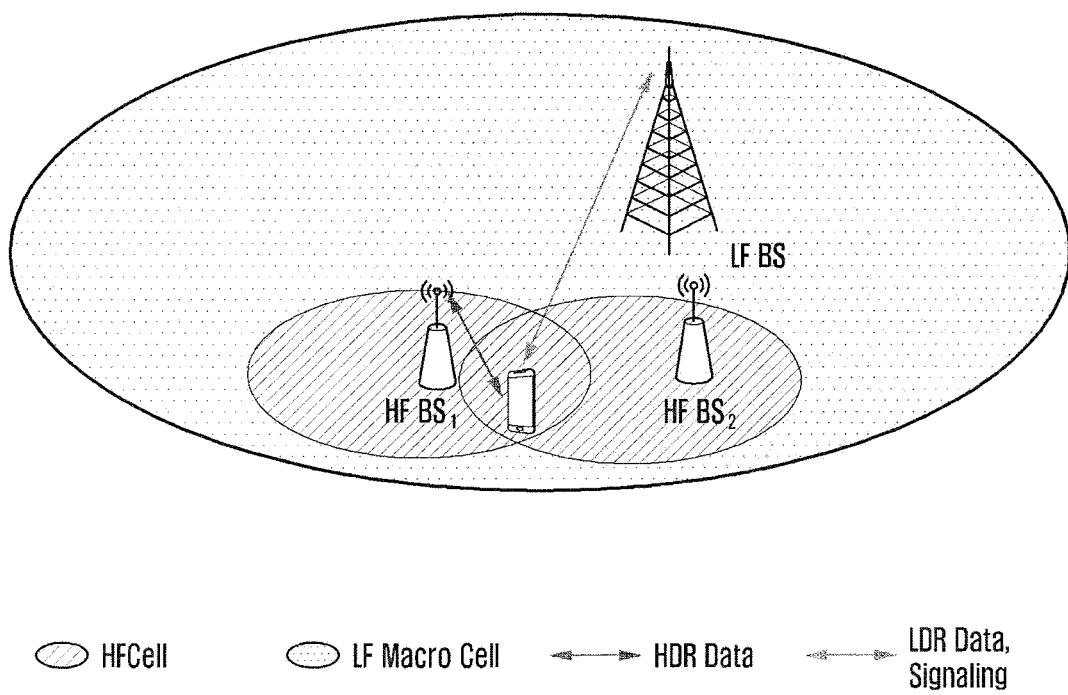
FIG. 1 illustrates a deployment of a wireless communication system using higher frequencies according to the related art.
Figure 2:
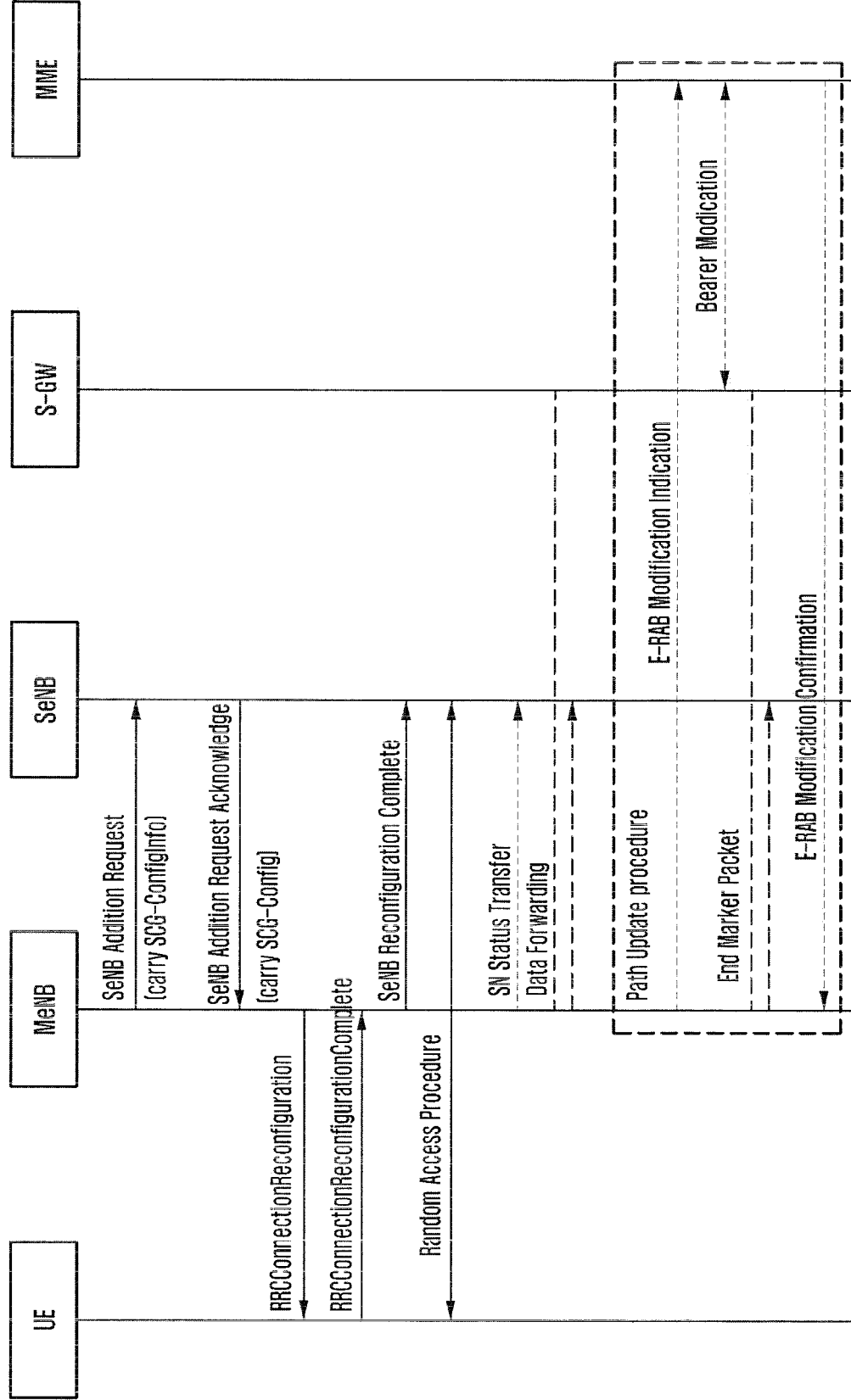
FIG. 2 is a signal flow diagram illustrating a typical procedure of adding a secondary base station according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 to 8, 9A and 9B, 10, 11A and 11B, 12A and 12B, 13A and 13B, 14A and 14B, 15A and 15B, 16A and 16B, 17, 18A and 18B, 19A and 19B, 20A and 20B, 21 to 27, 28A and 28B, 29, 30A and 30B, 31A and 31B, 32 to 35, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

To make objectives, technical solutions and advantages of the present disclosure more clear, detailed descriptions about the present disclosure will be provided in the following, accompanying with attached figures and embodiments.

In a plurality of the embodiment of the present disclosure, a Beamformed Random Access Procedure for next generation communication System is provided.

A system under consideration is next generation communications system wherein a base station employing a carrier frequency at higher frequencies (commonly referred to as high frequency (HF)-base station (BS)) than the sub-3 GHz typical cellular frequency is used for next generation communication (commonly referred to as 5th-generation (5G)) while another base station employing lower carrier frequency (commonly referred to as low frequency (LF)-BS) consisting of legacy cellular band (sub-3 GHz) is used for supporting communications on the HF-BS. The HF-BS is used typically for providing high data communications while LF-BS is used for legacy operations like lower data rates, supporting high mobility users, supporting control plane signaling, and the like. More particularly, a single procedure may be achieved by the joint usage of both the HF-BS and the LF-BS.

In this description, the procedure of random access is described in the light of such a HF-BS and LF-BS system which is more commonly referred to as 4th-generation (4G)+5G system or a Non-Standalone 5G System since the 5G (HF-BS) operates in conjunction with a LF-BS (5G). In such a system, one possible deployment scenario can be where the LF-BS' coverage overlaps with the coverage of one or more HF-BS' coverage. Such a deployment is further illustrated in FIG. 1. Further in the context of this disclosure, it is assumed that the mobile station (MS) capable of operating on both the HF-BS and LF-BS first connects with the LF-BS (which is also synonymously referred to as master BS-MeNB) and then the LF-BS adds the HF-BS (which is also synonymously referred to as secondary BS-SeNB) to the set of BSs used to serve the MS in order to meet the desired quality of service (QoS) requirement of the traffic flows established by the MS. Further in the context of this disclosure it is considered that the MS performs Idle mode operations (for e.g., cell reselection, monitoring paging, listening to system information, and the like) only on the LF-BS.

The procedure of random access described in this description is also applicable for a system in which MS first connects with the HF-BS and then the HF-BS adds the other HF-BS.

The procedure of random access described in this description is also applicable for a system in which the MS first connects with the HF-BS and then it is handed over to another HF-BS (which is also synonymously referred to as target eNB). In this case the MeNB in the description is a source eNB and the SeNB in the description is a target eNB.

Further in the context of this disclosure for the purpose of illustration, it is assumed that HF-BS operates in the millimeter wave carrier frequency range wherein beamforming is essentially used for achieving realistic transmission range of communication. However the concept holds good for any range of frequency if beamforming is used in the downlink (DL) and uplink (UL).

Figure 3:
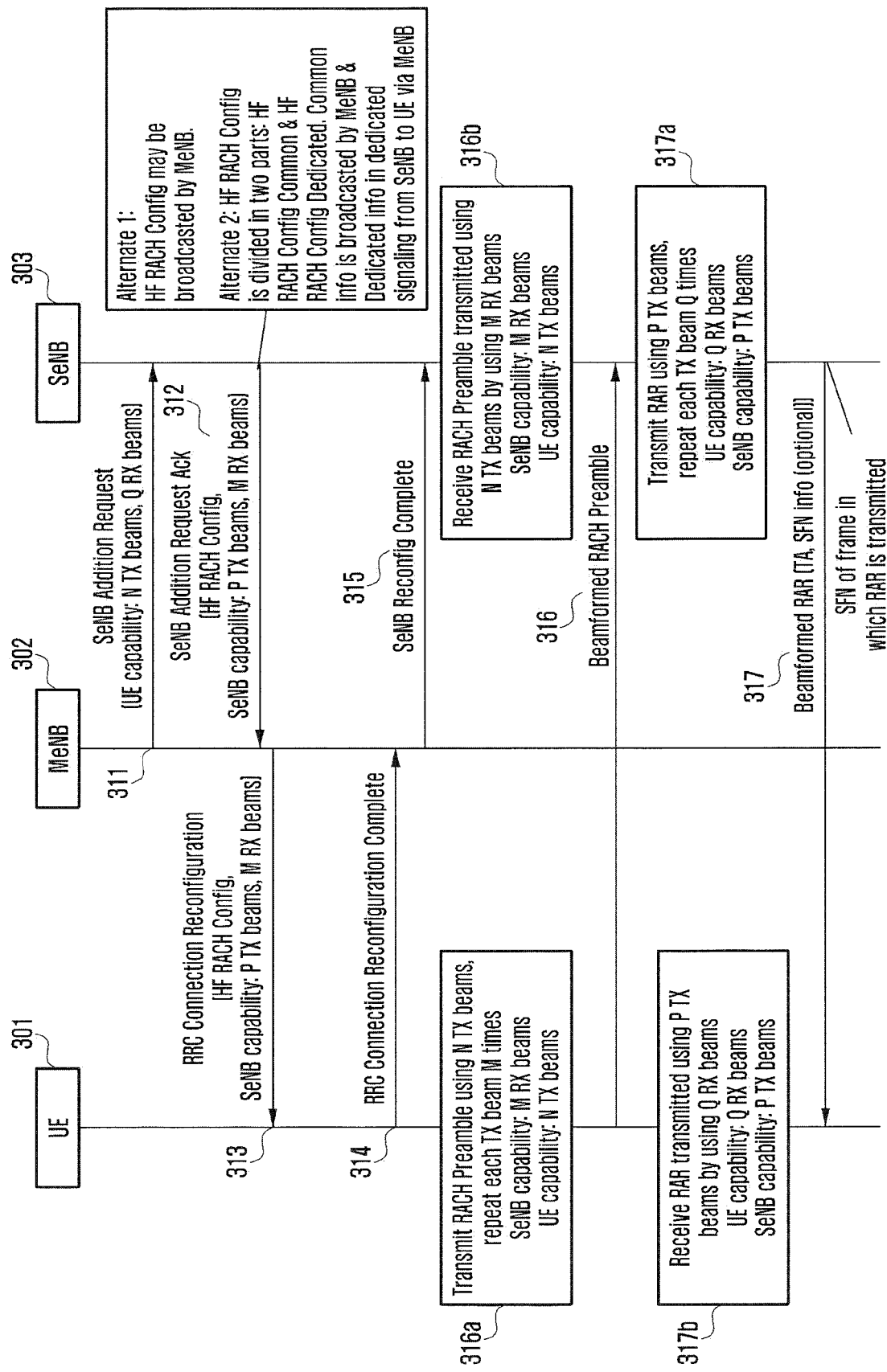
FIG. 3 is a signal flow diagram illustrating a method for a beamformed random access procedure according to an embodiment of the present disclosure.

Method 1:

This method of the disclosure is illustrated in FIG. 3 according to an embodiment of the present disclosure.

FIG. 3 is a signal flow diagram illustrating a method for a beamformed random access procedure according to an embodiment of the present disclosure.

Referring to FIG. 3, at operation 311, the user equipment (UE) beamforming capability is send by the MeNB 302 to the SeNB 303 for example in the SeNB Addition Request wherein the said capability includes the Number of TX Beams (N) and the Number of RX Beams (Q) supported by the UE. At operation 312, the SeNB 303 transmits the SeNB Addition Request ACK including its beamforming capability for example in the HF random access preamble (RACH) Config (or in any other system information) wherein the said capability includes the Number of TX Beams (P) and the Number of RX Beams (M) supported by the SeNB. Instead of indicating number of RX beams supported by the SeNB 303, the SeNB 303 may indicate the number of times (M) the UE 301 needs to repeat the physical random access channel (PRACH) transmission from each TX beam. The parameter M is greater than or equal to one. At operation 313, the MeNB 302 transmits the radio resource control (RRC) Connection Reconfiguration including the received HF RACH Config to the UE 301. According to various examples, the HF RACH Config may be broadcasted by the MeNB 302, or the HF RACH Config is divided in two parts: HF RACH Config Common and HF RACH Config Dedicated. The Common information is broadcasted by the MeNB 302, and the dedicated information is sent in dedicated signaling from the SeNB 303 to the UE 301 via the MeNB 302.

At operation 314, the UE 301 transmits the RRC Connection Reconfiguration Complete to the MeNB 302, and at operation 315, the MeNB 302 transmits the SeNB Reconfiguration Complete to the SeNB 303.

At operation 316, the RACH Preamble is transmitted from the UE 301 to the SeNB 303. At operation 316a, the UE 301 transmits the RACH Preamble using N TX Beams wherein transmission on each TX Beam is repeated M times sequentially. RACH preamble selected for transmission can be same for all N TX beams. Alternately, RACH preamble is randomly selected for each TX beam transmission. In an embodiment of the present disclosure, the UE 301 may wait for random access response (RAR) after transmitting PRACH using a TX beam M times. If the RAR is not received, the UE 301 transmits PRACH using next TX beam M times and then waits for the RAR and so on. In another embodiment of the present disclosure, the UE 301 may wait for the RAR after transmitting PRACH using multiple TX beams wherein transmission from each TX beam is repeated M times. If the RAR is not received, the UE 301 transmits PRACH using next set of TX beams M times and then waits for the RAR and so on. At operation 316b, the SeNB 303 receives the RACH Preamble transmitted by using M RX Beams.

At operation 317, the RAR is then transmitted from the SeNB 303 to the UE 301. At operation 317a, the SeNB 303 transmits the RAR using P TX Beams wherein each TX Beam is repeated Q times where Q is the Number of RX Beams at UE. At operation 317b, the UE 301 receives the RAR using Q RX Beams sequentially. The starting slot (e.g., subframe or TTI) or slots for the RACH Preamble transmissions and the corresponding RAR receptions can be indicated in the HF RACH Config. PRACH resource(s) and PRACH sequence(s) used by the UE is also indicated in HF RACH Config. HF RACH Config may indicate which PRACH resources/PRACH sequences to be used for each PRACH beam formed transmission. In an embodiment of the present disclosure, messages between the UE 301 and the SeNB 303 can be transparently transmitted by the MeNB 302. The information about the system frame number can also be included in the RAR. System frame number is the radio frame number of the radio frame in which the RAR is transmitted/received by SeNB/UE. This information can be used by the UE 301 to synchronize with system frame number timing of the SeNB 303. The UE 301 is not required to read the physical broadcast channel (which carries master information block) of the SeNB 303.

Figure 4:
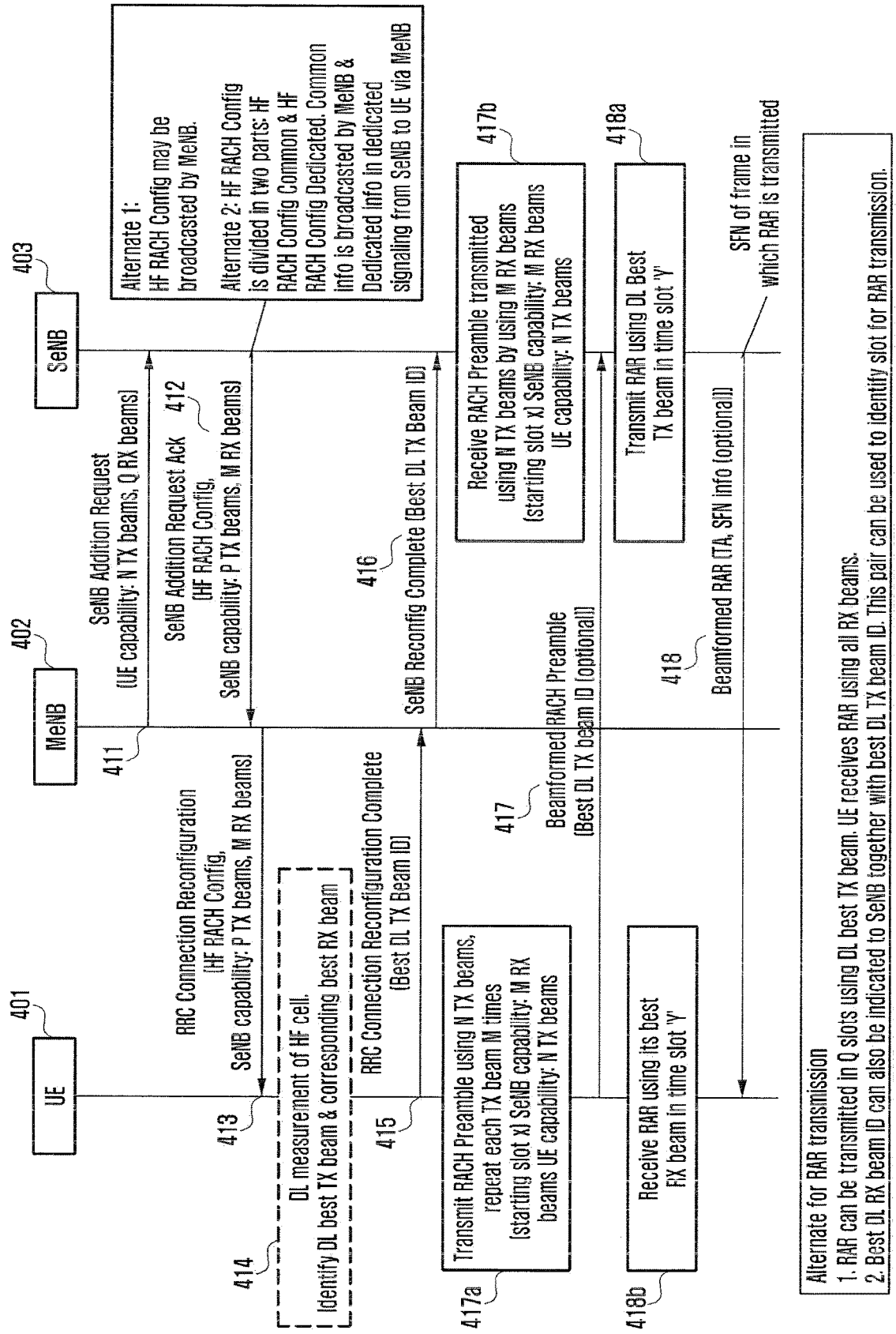
FIG. 4 is a signal flow diagram illustrating a method for a beamformed random access procedure according to an embodiment of the present disclosure.

Method 2:

This method of the disclosure is illustrated in FIG. 4 according to an embodiment of the present disclosure.

FIG. 4 is a signal flow diagram illustrating a method for a beamformed random access procedure according to an embodiment of the present disclosure.

Referring to FIG. 4, at operation 411, the UE beamforming capability is send to the SeNB 403 for example in the SeNB Addition Request wherein the said capability includes the Number of TX Beams (N) and the Number of RX Beams (Q) supported by the UE. At operation 412, the SeNB 403 transmits the SeNB Addition Request ACK including its beamforming capability to the UE 401 for example in the HF RACH Config (or in any other system information) wherein the said capability includes the Number of TX Beams (P) and the Number of RX Beams (M) supported by the SeNB. Instead of indicating number of RX beams supported by the SeNB 403, RACH config may indicate the number of times (M) the UE 401 needs to repeat the transmission from each TX beam. The parameter M can be greater than or equal to one.

At operation 413, the MeNB 402 transmits the RRC Connection Reconfiguration including the received HF RACH Config to the UE 401. According to various examples, the HF RACH Config may be broadcasted by the MeNB 402, or the HF RACH Config is divided in two parts: HF RACH Config Common and HF RACH Config Dedicated. The Common information is broadcasted by the MeNB 402, and the Dedicated information is sent in dedicated signaling from the SeNB 403 to the UE 401 via the MeNB 402. At operation 414, the UE 401 identifies the 'Best DL TX Beam' using the Downlink synchronization signals or reference signals transmitted by the SeNB 403. At operation 415, the UE 401 then reports the identified 'Best DL TX Beam ID' by including it in the RRC Connection Reconfiguration Complete. In alternate embodiment wherein Downlink synchronization signals or reference signals are transmitted using multiple synchronization signal (SS) blocks, SS block ID of SS block in which the UE 401 has received the synchronization signal or reference signal with best signal quality is reported instead of DL TX beam ID. At operation 416, the MeNB 402 then transmits the received 'Best DL TX Beam ID' or SS block ID by including it in the SeNB Reconfiguration Complete.

At operation 417, the RACH Preamble is transmitted from the UE 401 to the SeNB 403. At operation 417a, the UE 401 transmits the RACH Preamble using N TX Beams wherein transmission on each TX Beam is repeated M times. RACH preamble selected for transmission can be same for all N TX beams. Alternately, RACH preamble is randomly selected for each TX beam transmission. In an embodiment of the present disclosure, the UE 301 may wait for the RAR after transmitting PRACH using a TX beam M times. If the RAR is not received, the UE 301 transmits PRACH using next TX beam M times and then waits for the RAR and so on. In another embodiment of the present disclosure, the UE 301 may wait for the RAR after transmitting PRACH using multiple TX beams wherein transmission from each TX beam is repeated M times. If the RAR is not received, the UE 301 transmits PRACH using next set of TX beams M times and then waits for the RAR and so on. At operation 417b, the SeNB receives the RACH Preamble using M RX Beams. The starting slot (e.g., subframe or TTI) for the transmission of the RACH Preamble can be indicated in the mmW RACH Config. The 'Best DL TX Beam ID' or SS block ID may be indicated in the RACH Preamble optionally by selecting the PRACH preamble and/or PRACH resources according to DL TX Beam ID or SS block ID. There is mapping between PRACH preamble and/or PRACH resources and DL TX Beam ID or SS block ID. This mapping can be signaled in RACH config.

At operation 418, the RAR is then transmitted from the SeNB 403 to the UE 401. At operation 418a, the SeNB then transmits the RAR using the Best DL TX Beam as reported (in PRACH transmission (operation 417) or in RRC Connection Reconfiguration complete (operation 415)) by the UE 401. In an embodiment in which SS block ID is reported by the UE 401, the SeNB 403 transmits the RAR using the DL TX Beam which is used by the eNB for transmitting the synchronization signal or reference signal in the SS block corresponding to SS block ID. The slot of transmission of the RAR can be indicated in the HF RACH Config or alternatively, the RAR is transmitted at a slot derived from the slot on which RACH Preamble is received. At operation 418b, the UE 401 accordingly monitors the indicated the RAR slot or it monitors the RAR slot according to the pre-specified mapping between RACH Preamble slots to the RAR slot. The timing advance (TA) and system frame number (SFN) information may also be included in the RAR. In an embodiment of the present disclosure, messages between the UE 401 and the SeNB 403 can be transparently transmitted by the MeNB 402. The information about the system frame number can be included in the RAR. System frame number is the radio frame number of the radio frame in which the RAR is transmitted/received by SeNB/UE. This information can be used by the UE 401 to synchronize with system frame number timing of the SeNB 403. The UE 401 is not required to read the physical broadcast channel (which carries master information block) of the SeNB 403.

According to alternative embodiments of the present disclosure, the RAR can be transmitted in slots using the best DL TX beam. The UE 401 receives the RAR using all RX beams. The best DL RX beam ID can also be indicated to the SeNB 403 together with the best DL TX beam ID. This pair can be used to identify slot for the RAR transmission.

In method 1 and 2, the HF RACH configuration may further includes at least one of Dedicated Preamble Configuration: Preamble Sequence, Preamble Valid Duration, Beam formed RACH Slot Configuration, frame/subframe/slot, and the like, for RACH transmission, the SeNB beamforming capability, Number of TX beams, Number of RX beams, TX/RX beamforming gain, Timing offset between frame/subframe of the MeNB and slot of the SeNB, and Number of Best DL TX/RX beam to report.

In method 1 and 2, the HF RACH configuration may also include Number of TX beams to transmit (N) which is Less than equal to number of TX beams supported by the UE and Number of times each TX beam is repeated consecutively (M) for the PRACH transmission, and number of TX beams to transmit (N) which is Less than equal to number of TX beams supported by the eNB and Number of times each TX beam is repeated consecutively (M) for the RAR transmission.

Method 3:

Embodiment 1 (Beam Feedback)

Figure 5:
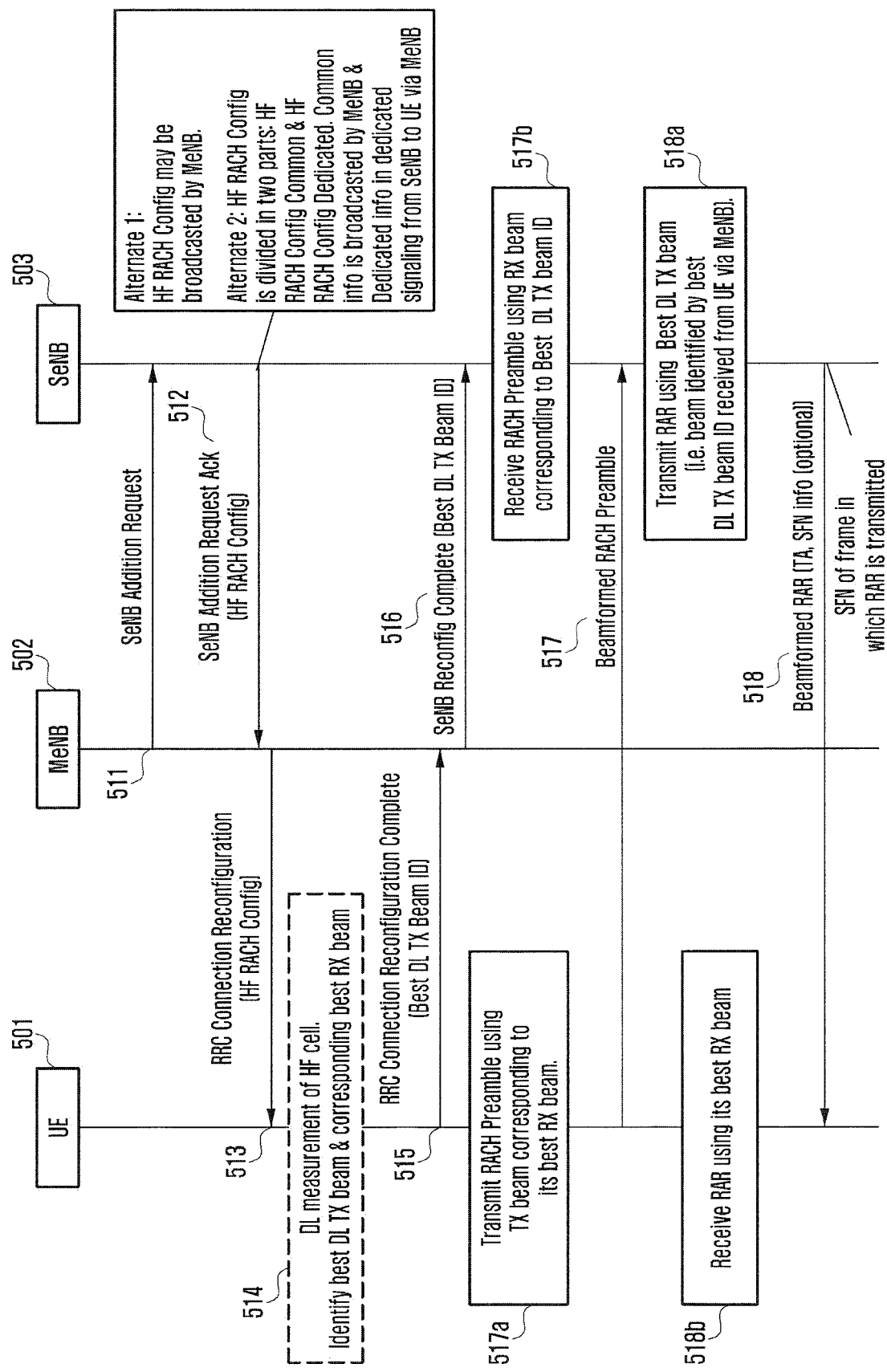
FIG. 5 is a signal flow diagram illustrating a method for a beamformed random access procedure according to an embodiment of the present disclosure.

This Method of the disclosure is illustrated in FIG. 5 according to an embodiment of the present disclosure.

FIG. 5 is a signal flow diagram illustrating a method for a beamformed random access procedure according to an embodiment of the present disclosure.

Referring to FIG. 5, at operation 511, an MeNB 502 transmits the SeNB Addition Request. At operation 512, an SeNB 503 transmits the SeNB Addition Request ACK including the HF RACH Config. At operation 513, the MeNB 502 transmits the RRC Connection Reconfiguration including the received HF RACH Config to a UE 501. According to various examples, the HF RACH Config may be broadcasted by the MeNB 502, or the HF RACH Config is divided in two parts: HF RACH Config Common and HF RACH Config Dedicated. The Common information is broadcasted by the MeNB 502, and the dedicated information is sent in dedicated signaling from the SeNB 503 to the UE 501 via the MeNB 502.

At operation 514, the UE 501 identifies the 'Best DL TX Beam' and corresponding 'Best RX beam' by measuring the HF cell. For example, if the UE 501 is doing RX beamforming then it uses all the RX beams one at a time to check the best received strength for a particular TX beam and this procedure is then repeated for all TX beams. After completion of all the RX-TX beam pair measurements, the UE 501 picks the one with the best received signal strength.

At operation 515, the UE 501 reports the 'Best DL TX Beam ID'. The UE 501 can report the 'Best DL TX Beam ID' in the 'RRC Connection Reconfiguration Complete' message that it sends to the MeNB 502 in response to the reception of RRC Connection Reconfiguration sent by the MeNB 502 for the addition of the HF cell to the UE 501. In alternate embodiment wherein Downlink synchronization signals or reference signals are transmitted using multiple SS blocks, SS block ID of SS block in which the UE 501 has received the synchronization signal or reference signal with best signal quality is reported instead of DL TX beam ID. At operation 516, the MeNB 502 then transmits the received 'Best DL TX Beam ID' or SS block ID by including it in the SeNB Reconfiguration Complete.

At operation 517, the RACH Preamble is transmitted from the UE 501 to the SeNB 503. At operation 517a, the UE 501 transmits the RACH Preambles using the TX Beam corresponding to (i.e., in same direction as) 'Best RX Beam' wherein the 'Best RX Beam' is the beam used to receive the 'Best DL TX Beam' or 'Best RX Beam' is the beam used to receive the SS block in which the UE has received the synchronization signal or reference signal with best signal quality. At operation 517b, the reception of the RACH Preamble by the SeNB 503 is done using the RX Beam corresponding to (i.e., in same direction as) the 'Best DL TX Beam' or SS Block which is reported by the UE 501.

At operation 518, the RAR is then transmitted from the SeNB 503 to the UE 501. At operation 518a, The SeNB 503 transmits the RAR using the 'Best DL TX Beam' reported by the UE 501. In an embodiment in which SS block ID is reported by the UE 501, the SeNB 503 transmits the RAR using the DL TX Beam which is used by the eNB for transmitting synchronization signal or reference signal in the SS block corresponding to SS block ID. At operation 518b, the UE 501 receives the RAR using the identified 'Best RX Beam' that is used to receive the 'Best DL TX Beam' or 'Best RX Beam' is the beam used to receive the SS block in which the UE has received the synchronization signal or reference signal with best signal quality. The TA and SFN information may be included in the RAR. System frame number is the radio frame number of the radio frame in which the RAR is transmitted/received by the eNB/UE. This information can be used by the UE 501 to synchronize with system frame number timing of the SeNB 503. The UE 501 is not required to read the physical broadcast channel (which carries master information block) of the SeNB 503.

Embodiment 2 (Beam Feedback+Slot)

Figure 6:
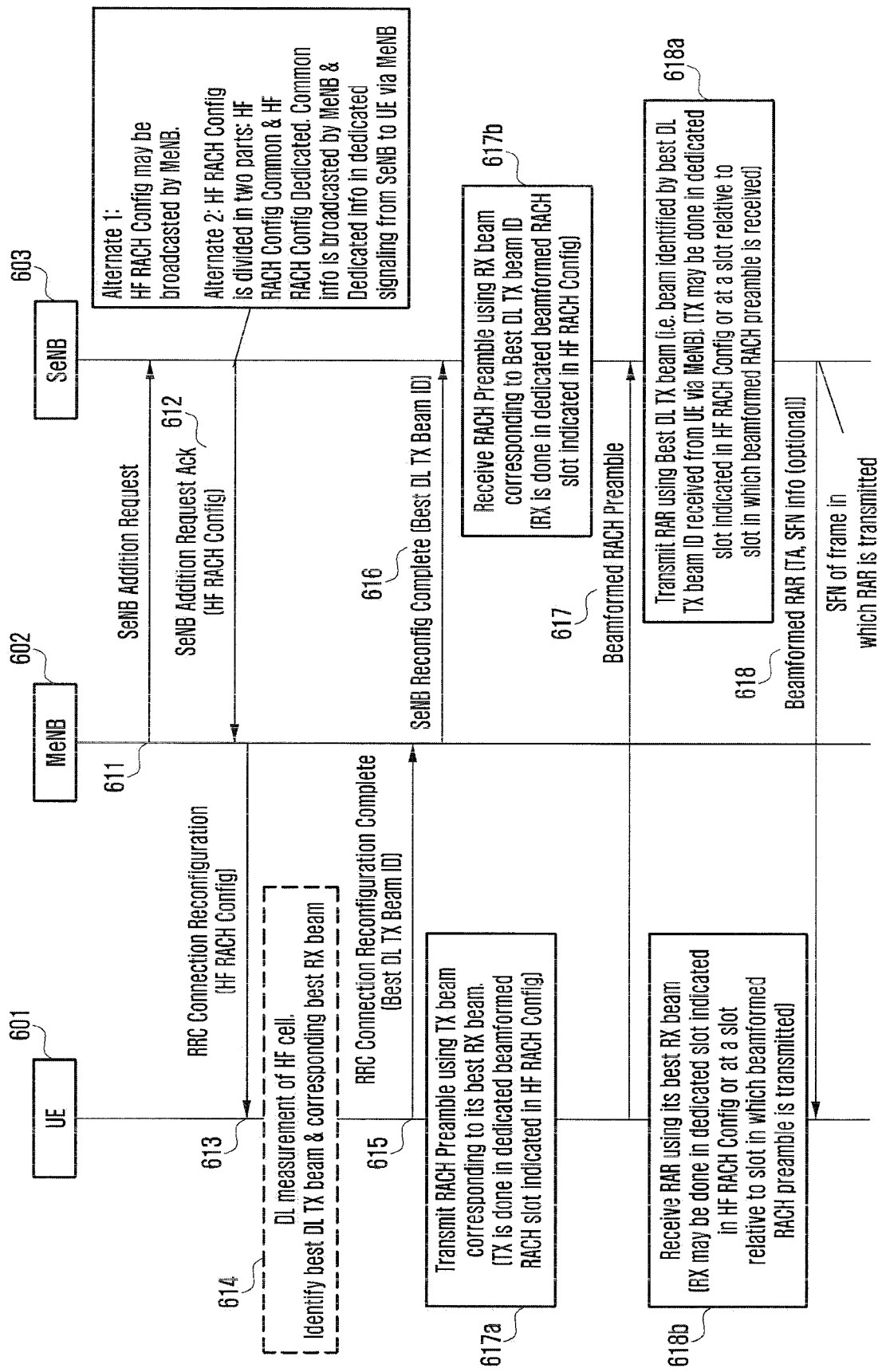
FIG. 6 is a signal flow diagram illustrating a method for a beamformed random access procedure according to an embodiment of the present disclosure.

This Method of the disclosure is illustrated in FIG. 6 according to an embodiment of the present disclosure.

FIG. 6 is a signal flow diagram illustrating a method for a beamformed random access procedure according to an embodiment of the present disclosure.

Referring to FIG. 6, at operation 611, when an LF-BS (MeNB) 602 adds an HF-BS (SeNB) 603 for a UE 601, the MeNB 602 sends the SeNB Addition Request to the SeNB 603. At operation 612, the SeNB 603 in the response sends the SeNB Addition Request Ack and includes the 'HF RACH config' which carries all the parameters required for efficient RACH operation over the HF-BS. At operation 613, the MeNB 602 then sends the RRC Connection Reconfiguration to the UE 601 including the 'HF RACH config' received from the SeNB 603. According to various examples, the HF RACH Config may be broadcasted by the MeNB 602, or the HF RACH Config is divided in two parts: HF RACH Config Common and HF RACH Config Dedicated. The Common information is broadcasted by the MeNB 602, and the dedicated information is sent in dedicated signaling from the SeNB 603 to the UE 601 via the MeNB 602.

At operation 614, the UE 601 performs the DL measurement of the HF cell and identifies the 'Best DL TX beam' and the corresponding 'best RX beam' wherein the 'Best DL TX beam' refers to the DL beam transmitted by the SeNB 603 which is received best by the UE 601 and the 'Best RX beam' refers to the RX beam used by the UE 601 for the reception of the 'Best DL TX beam'. The UE 601 basically searches for the best TX-RX beam pair among the set of TX beams transmitted by the SeNB 603 and the set of RX beams used by the UE 601 for the reception of the TX beams transmitted by the SeNB 603. At operation 615, the UE 601 identifies the 'Best DL TX Beam' and sends the ID of the identified 'Best DL TX Beam' ('Best DL TX Beam ID') to the SeNB 603 via the MeNB 602 by including it in the RRC Connection Reconfiguration Complete message that it sends to the MeNB 602. At operation 616, the MeNB 602 then forwards the received 'Best DL TX Beam ID' to the SeNB 603. In alternate embodiment wherein Downlink synchronization signals or reference signals are transmitted using multiple SS blocks, SS block ID of SS block in which the UE 601 has received the synchronization signal or reference signal with best signal quality is reported instead of DL TX beam ID. Best DL TX beam or SS block ID reported by the UE is used by the SeNB 603 for receiving RACH preamble from the UE 601.

At operation 617, the RACH Preamble is transmitted from the UE 601 to the SeNB 603. At operation 617*b*, the SeNB 603 receives RACH preamble from the corresponding the UE 601 using the 'RX Beam' corresponding to (i.e., in same direction as) the 'Best DL TX Beam ID' reported by the UE 601. In embodiment in which SS block ID is reported instead of DL TX Beam ID, the SeNB 603 receives RACH preamble using RX beam reciprocal or in same direction as the DL TX Beam used by the eNB in the SS block identified by SS block ID reported by the UE 601. At operation 617*a*, the transmission of the RACH by the UE 601 is done in the dedicated transmission RACH slots assigned by the SeNB 603 as indicated in the 'HF RACH config'. The SeNB 603 also uses the corresponding indicated dedicated slots for the reception of the RACH preamble from the UE 601.

At operation 618, the RAR is then transmitted from the SeNB 603 to the UE 601. At operation 618*a*, the SeNB 603 transmits the RAR using the 'Best DL TX Beam ID' reported by the UE 601 in the dedicated slots as indicated in the HF RACH Config. In an embodiment in which SS block ID is reported by the UE, the SeNB 303 transmits the RAR using the DL TX Beam which is used by the eNB for transmitting the synchronization signal or reference signal in the SS block corresponding to SS block ID. At operation 618*b*, the UE 601 receives the RAR on the slots as indicated in the HF RACH Config using its 'Best RX beam' that it had identified as the best RX beam for the reception of the identified 'Best DL TX beam' or SS block. The TA and SFN information may be included in the RAR. System frame number is the radio frame number of the radio frame in which the RAR is transmitted/received by the eNB/UE. This information can be used by the UE 601 to synchronize with system frame number timing of the SeNB 603. The UE 601 is not required to read the physical broadcast channel (which carries master information block) of the SeNB 603.

In another embodiment of the present disclosure, the RAR is sent by the SeNB 603 at a slot relative to the slot on which the RACH Preamble is received. The UE 601 also receives the RAR on the slot relative to slot on which it had transmitted the RACH Preamble.

In one or more of the embodiments of the present disclosure, the timings specified in the HF RACH configuration are with respect to the MeNB timing.

Figure 7:
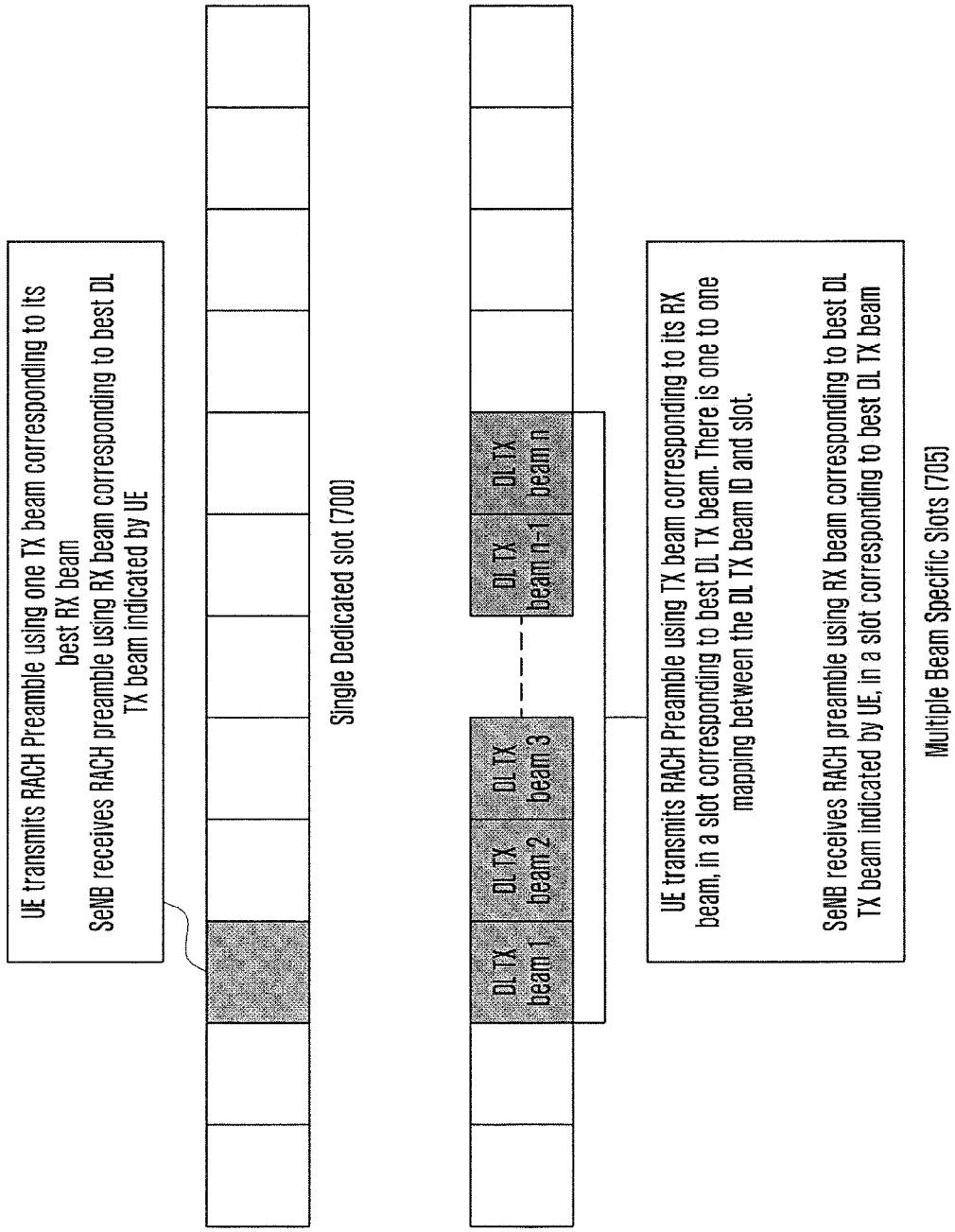
FIG. 7 is a schematic diagram illustrating transmission of a random access preamble according to an embodiment of the present disclosure.

FIG. 7 is a schematic diagram illustrating transmission of a random access preamble according to an embodiment of the present disclosure.

In existing system dedicated RACH slot is configured to avoid RACH collision. Referring to FIG. 7, RACH slot is configured/indicated in the disclosure so that the eNB can use specific RX beam (based on TX beam ID or SS block ID indicated by the UE) in the indicated slot. In the absence of it, even the UE transmits using one beam, it has to transmit it multiple times for each RX beam of BS. Slots can be configured using one of the following options:

Option 1: One dedicated slot 700: the UE transmit RACH preamble in this slot and the eNB receives in this RACH slot.

Option 2: Multiple slots 705: Dedicated slot for each DL TX beam ID or SS block ID is provided. The UE transmit in the slot corresponding to the best DL TX beam ID or SS block ID of SS block in which the UE has received the synchronization signal or reference signal with best signal quality.

In addition to the preceding embodiment as illustrated in FIG. 7, more than one slot can be assigned for the transmission of the RACH Preamble by the SeNB to the UE in the HF RACH Config. The UE transmits the RACH Preamble using the TX Beam(s) corresponding to its 'Best RX Beam' wherein the 'Best RX Beam' is the RX Beam corresponding to the 'Best DL TX Beam' or 'Best RX Beam' is the beam used to receive the SS block in which the UE has received the synchronization signal or reference signal with best signal quality. A UE may typically need to transmit the RACH using multiple TX beams if due to different Beam widths in the RX and TX there are more than one TX Beams corresponding to one RX Beam assuming that the RX Beam width of the UE is greater than the TX Beam width of the SeNB.

In another variant of the preceding embodiment of the present disclosure, a mapping of TX Beam ID(s) or SS block ID(s) to the slots is specified. The UE transmits the PRACH TX in a slot as per the assigned mapping. The mapping can be assigned by the SeNB in the HF RACH Config.

The 'HF RACH Config' as used in the various embodiments consists of information pertaining to the HF cell (HF-BS/SeNB) which is useful for the UE for efficiently performing Random Access on the SeNB subsequent to the addition of the SeNB. The 'HF RACH Config' contains at least one of 'RACH slot configuration', 'RAR Slot Configuration', 'Preamble Configuration', Timing Information', 'SeNB Beamforming Capability' and 'Beamforming Gain', wherein the 'RACH Slot Configuration' includes the 'Dedicated RACH slot for preamble TX/RX' or the RACH slots corresponding to each DL TX beam', and the 'Preamble Configuration' includes the 'Preamble Sequence' and the 'Preamble Valid Duration', and the 'Timing Information' includes the frame and/or subframe offset between the MeNB and the SeNB, and the 'SeNB Beamforming Capability' indicates the Number of TX and RX Beams of the SeNB.

In an embodiment of the present disclosure, the MeNB indicates to the UE whether the RAR will be transmitted by the MeNB or the SeNB. In case of idea backhaul, the MeNB indicates that the RAR will be transmitted by the MeNB, otherwise, by the SeNB. After transmitting the RACH preamble, the UE monitors the UE-MeNB link for the RAR if the MeNB indicates so, otherwise the UE monitors the UE-SeNB link for the RAR. Alternately, the MeNB may indicate to the UE whether the RAR for RACH transmission on frequency F1 will be transmitted by cell on frequency F2.

In yet another embodiment of the present disclosure, the SeNB provides a mapping between the RACH slot in the SeNB to the corresponding slot on the MeNB where the RAR will be transmitted in the scenario where the RAR is transmitted via the MeNB.

In an embodiment of the present disclosure, the contents of the mmW RACH Config can be partitioned into 'Common' and 'Dedicated' wherein the common part is broadcasted. The Common part can include at least one of RACH slots corresponding to each DL TX Beam, TX/RX Beamforming Gain, a Number of RX Beams of the eNB, a Number of TX beams of the eNB, Timing offset between the MeNB and the SeNB including the Frame Offset, subframe offset and slot offset.

Method 4:

Embodiment 1 (No Beam Feedback)

This Method of the disclosure is illustrated in FIG. 8 according to an embodiment of the present disclosure.

FIG. 8 is a signal flow diagram illustrating a method for a beamformed random access procedure according to an embodiment of the present disclosure.

Referring to FIG. 8, at operation 811, when an LF-BS (MeNB) 802 adds an HF-BS (SeNB) 803 for a UE 801, the MeNB 802 sends the SeNB Addition Request to the SeNB 803. At operation 812, the SeNB 803 in the response sends the SeNB Addition Request Ack and includes the 'HF RACH config' which carries all the parameters required for efficient RACH operation over the HF-BS. At operation 813, the MeNB 802 then sends the RRC Connection Reconfiguration to the UE 801 including the 'HF RACH config' received from the SeNB 803. According to various examples, the HF RACH Config may be broadcasted by the MeNB 802, or the HF RACH Config is divided in two parts: HF RACH Config Common and HF RACH Config Dedicated. The Common information is broadcasted by the MeNB 802, and the dedicated information is sent in dedicated signaling from the SeNB 803 to the UE 801 via the MeNB 802. At operation 814, the UE 801 sends the RRC Connection Reconfiguration Complete message. At operation 815, the MeNB 802 sends the SeNB Reconfiguration Complete.

At operation 816, the UE 801 performs the DL measurement of the HF cell and identifies the 'Best DL TX beam' and the corresponding 'best RX beam' wherein the 'Best DL TX beam' refers to the DL beam transmitted by the SeNB 803 which is received best by the UE 801 and the 'Best RX beam' refers to the RX beam used by the UE 801 for the reception of the 'Best DL TX beam'. The UE 801 basically searches for the best TX-RX beam pair among the set of TX beams transmitted by the SeNB 803 and the set of RX beams used by the UE 801 for the reception of the TX beams transmitted by the SeNB 803.

At operation 817, the RACH Preamble is transmitted from the UE 801 to the SeNB 803. At operation 817a, the UE transmits the RACH Preamble using the TX Beam corresponding to (i.e., in same direction as) the Best RX Beam wherein the 'Best RX Beam' is the RX Beam corresponding to the 'Best DL TX Beam' or 'Best RX Beam' is the beam used to receive the SS block (downlink synchronization signals are transmitted using multiple SS blocks) in which the UE has received the synchronization signal or reference signal with best signal quality. Transmission of RACH Preamble is repeated 'N' times wherein N is the Number of RX Beams at the SeNB 803. N is signaled to the UE either in broadcast or dedicated signaling. At operation 817b, the reception of the RACH Preamble at the SeNB 803 is performed using multiple RX Beams as per the SeNB capability.

At operation 818, the RAR is then transmitted from the SeNB 803 to the UE 801. At operation 818a, the SeNB 803 transmits the RAR using the TX Beam corresponding to the Best RX Beam identified based on the reception of RACH Preamble using multiple RX Beams. At operation 818b, the UE 801 receives the RACH Preamble using the 'Best RX Beam' as identified during the measurement of the SeNB 803. The TA and SFN information may be included in the RAR. System frame number is the radio frame number of the radio frame in which the RAR is transmitted/received by the eNB/UE. This information can be used by the UE 801 to synchronize with system frame number timing of the SeNB 803. The UE 801 is not required to read the physical broadcast channel (which carries master information block) of the SeNB 803.

Embodiment 2 (No Beam Feedback+Slots)

Figure 9A:
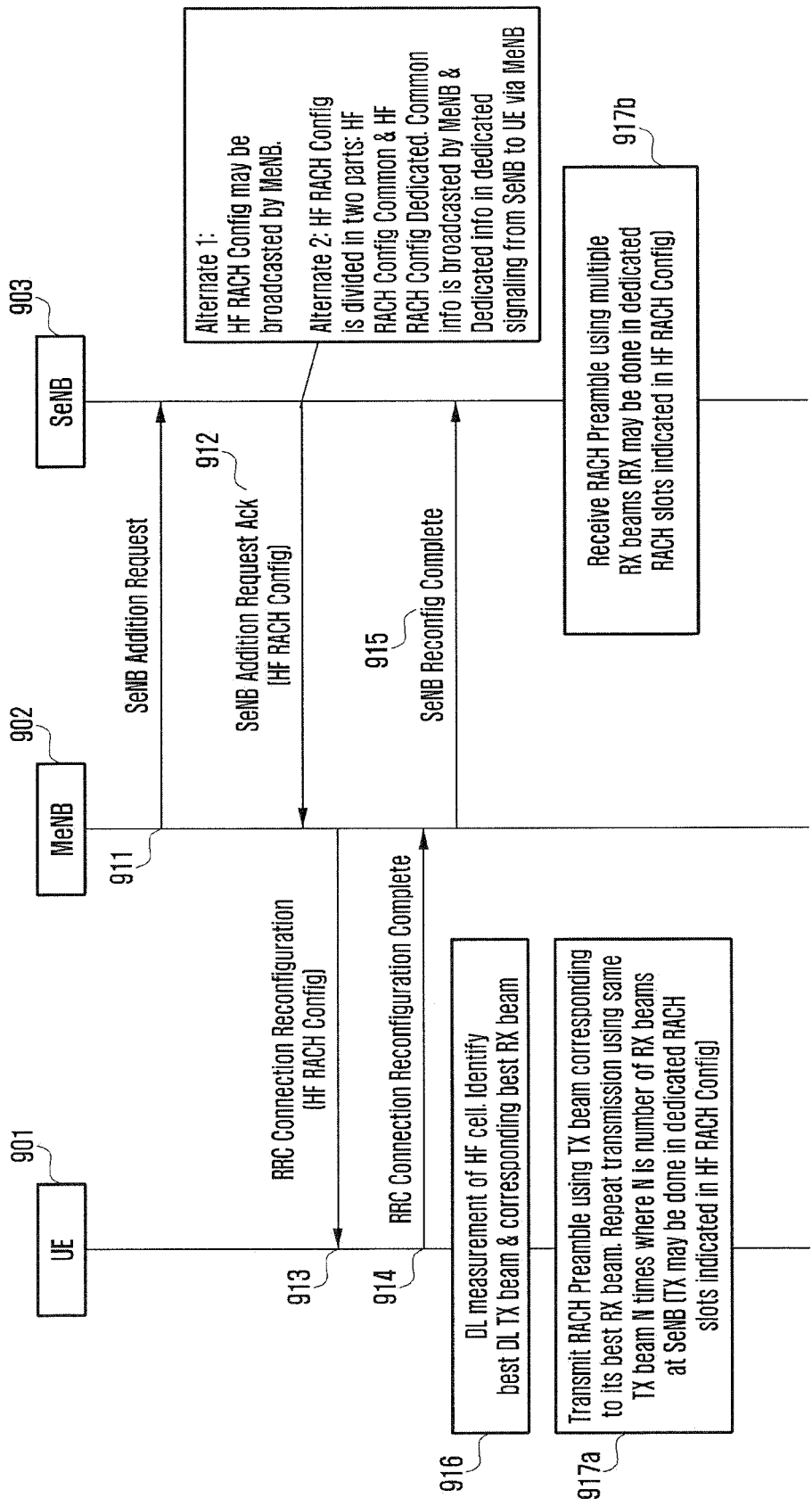
FIGS. 9A and 9B are signal flow diagrams illustrating a method for a beamformed random access procedure according to an embodiment of the present disclosure.
Figure 9B:
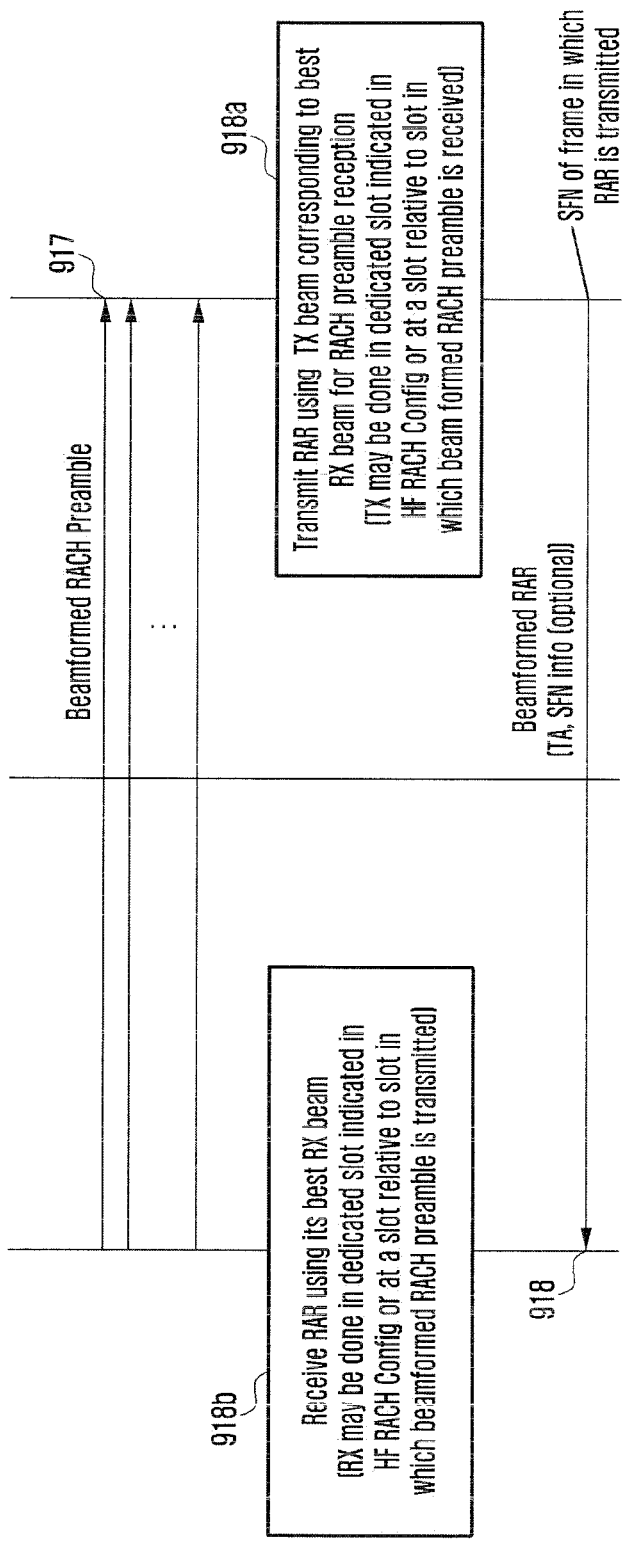

This Method of the disclosure is illustrated in FIGS. 9A and 9B according to an embodiment of the present disclosure.

FIGS. 9A and 9B are signal flow diagrams illustrating a method for a beamformed random access procedure according to an embodiment of the present disclosure.

Referring to FIGS. 9A and 9B, at operation 911, when an LF-BS (MeNB) 902 adds an HF-BS (SeNB) 903 for a UE 901, the MeNB 902 sends the SeNB Addition Request to the SeNB 903. At operation 912, the SeNB 903 in the response sends the SeNB Addition Request Ack and includes the 'HF RACH config' which carries all the parameters required for efficient RACH operation over the HF-BS. At operation 913, the MeNB 902 then sends the RRC Connection Reconfiguration to the UE 901 including the 'HF RACH config' received from the SeNB 903. According to various examples, the HF RACH Config may be broadcasted by the MeNB 902, or the HF RACH Config is divided in two parts: HF RACH Config Common and HF RACH Config Dedicated. The Common information is broadcasted by the MeNB 902, and the dedicated information is sent in dedicated signaling from the SeNB 903 to the UE 901 via the MeNB 902. At operation 914, the UE 901 sends the RRC Connection Reconfiguration Complete message. At operation 915, the MeNB 902 sends the SeNB Reconfiguration Complete.

At operation 916, the UE 901 performs the DL measurement of the HF cell and identifies the 'Best DL TX beam' and the corresponding 'best RX beam' wherein the 'Best DL TX beam' refers to the DL beam transmitted by the SeNB 903 which is received best by the UE 901 and the 'Best RX beam' refers to the RX beam used by the UE 901 for the reception of the 'Best DL TX beam'. The UE 901 basically searches for the best TX-RX beam pair among the set of TX beams transmitted by the SeNB 903 and the set of RX beams used by the UE 901 for the reception of the TX beams transmitted by the SeNB 903.

At operation 917, the RACH Preamble is transmitted from the UE 901 to the SeNB 903. At operation 917a, the UE transmits the RACH Preamble using the TX Beam corresponding to the Best RX Beam wherein the 'Best RX Beam' is the RX Beam corresponding to the 'Best DL TX Beam'. Transmission of RACH Preamble is repeated 'N' times wherein N is the Number of RX Beams at the SeNB 903. At operation 917b, the reception of the RACH Preamble at the SeNB 903 is performed using multiple RX Beams as per the SeNB capability.

According to this embodiment of the present disclosure, the transmission of the RACH by the UE 901 is done in the dedicated transmission RACH slots assigned by the SeNB 903 as indicated in the 'HF RACH config'. The SeNB 903 also uses the corresponding indicated dedicated slots for the reception of the RACH preamble from the UE 901. The RACH Preamble transmission is repeated for N times where N is number of RX Beams at the SeNB 903. N is signaled to the UE 901 either in broadcast or dedicated signaling.

At operation 918, the RAR is then transmitted from the SeNB 903 to the UE 901. At operation 918a, after the receipt of the beamformed RACH preamble from the UE using multiple RX Beams on the dedicated slots as indicated in the HF RACH Config, the SeNB 903 transmits the RAR using the using TX Beam corresponding to Best RX Beam for RACH reception in the dedicated slots as indicated in the HF RACH Config. At operation 918b, the UE 901 receives the RAR on the slots as indicated in the HF RACH Config using its 'Best RX beam' that it had identified as the best RX beam for the reception of the identified 'Best DL TX beam' or SS block. The TA and SFN information may be included in the RAR. System frame number is the radio frame number of the radio frame in which the RAR is transmitted/received by the eNB/UE. This information can be used by the UE 901 to synchronize with system frame number timing of the SeNB 803. The UE 901 is not required to read the physical broadcast channel (which carries master information block) of the SeNB 903.

Figure 10:
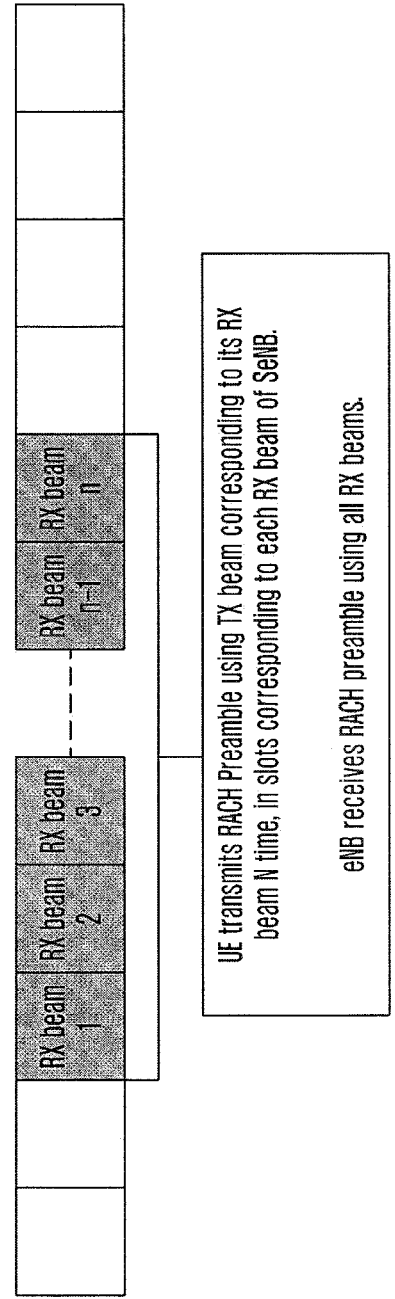
FIG. 10 is a schematic diagram illustrating transmission of a random access preamble according to an embodiment of the present disclosure.

FIG. 10 is a schematic diagram illustrating transmission of a random access preamble according to an embodiment of the present disclosure.

Referring to FIG. 10, a mapping between the RACH slots and the RX beam of the SeNB is provided in the HF RACH Config and a mapping between the RAR slots and the TX Beams or SS blocks of the SeNB is provided. The UE based on this information, transmits RACH Preamble using selected TX Beam in slots corresponding to each RX beam of the SeNB.

In another variant of the embodiment of the present disclosure, the RAR is sent by the SeNB at a slot relative to the slot on which the RACH Preamble is received. The UE also receives the RAR on the slot relative to slot on which it had transmitted the RACH Preamble.

In embodiments of the present disclosure, the eNB indicates a set of slots for RACH preamble wherein the number of indicated slots is equal to the number of RX beams of the eNB, so that even if the UE has not reported the best DL beam feedback, the UE sends the RACH on the UL beam corresponding to the best DL TX beam or SS blocks on each of the indicated slots and the eNB receives them using each RX beam.

In an embodiment of the present disclosure, the RAR can be transmitted using same beam as many times as the number of the RX beams at the UE and received by the UE using multiple RX beams In an embodiment of the present disclosure wherein RACH Preamble or RAR is sent on multiple slots using a single selected beam, a starting slot is indicated to the UE.

In one variant of the embodiment of the present disclosure, the selection of the TX Beam by the SeNB for the RAR transmission is done based on the identification of the 'Best RX Beam' corresponding to the beams on which RACH Preamble is received wherein the selection of the Best RX Beam is done based on RSRP/RSSI measurements. The TX Beam is chosen as the one that corresponds to the selected Best RX Beam.

In another variant of the embodiment of the present disclosure, the selection of the TX Beam by the SeNB for the RAR transmission is done based on the selection of any RX Beam amongst the set of RX Beams on which RACH Preamble is received. The TX Beam is chosen as the one that corresponds to the selected RX Beam.

In another variant of the embodiment of the present disclosure, the SeNB selects TX beams corresponding to all the RX beams on which the RACH Preamble is received. The RAR is sent on all the selected TX Beams.

The 'HF RACH Config' as used in the various embodiments consists of information pertaining to the HF cell (HF-BS/SeNB) which is useful for the UE for efficiently performing Random Access on the SeNB subsequent to the addition of the SeNB. The 'HF RACH Config' contains at least one of: Dedicated Preamble Configuration, i.e., Preamble Sequence, Preamble Valid Duration, Beam formed RACH Slot Configuration: RACH slots corresponding to each RX beam of the eNB, Beam formed RAR Slot Configuration: RAR slots corresponding to each TX beam of the eNB or Dedicated RAR slot, TX/RX beamforming gain, Timing offset between frame/subframe of the MeNB and slot of the SeNB, and SFN info in the RAR if BCH is not supported in HF Cell.

Figure 11A:
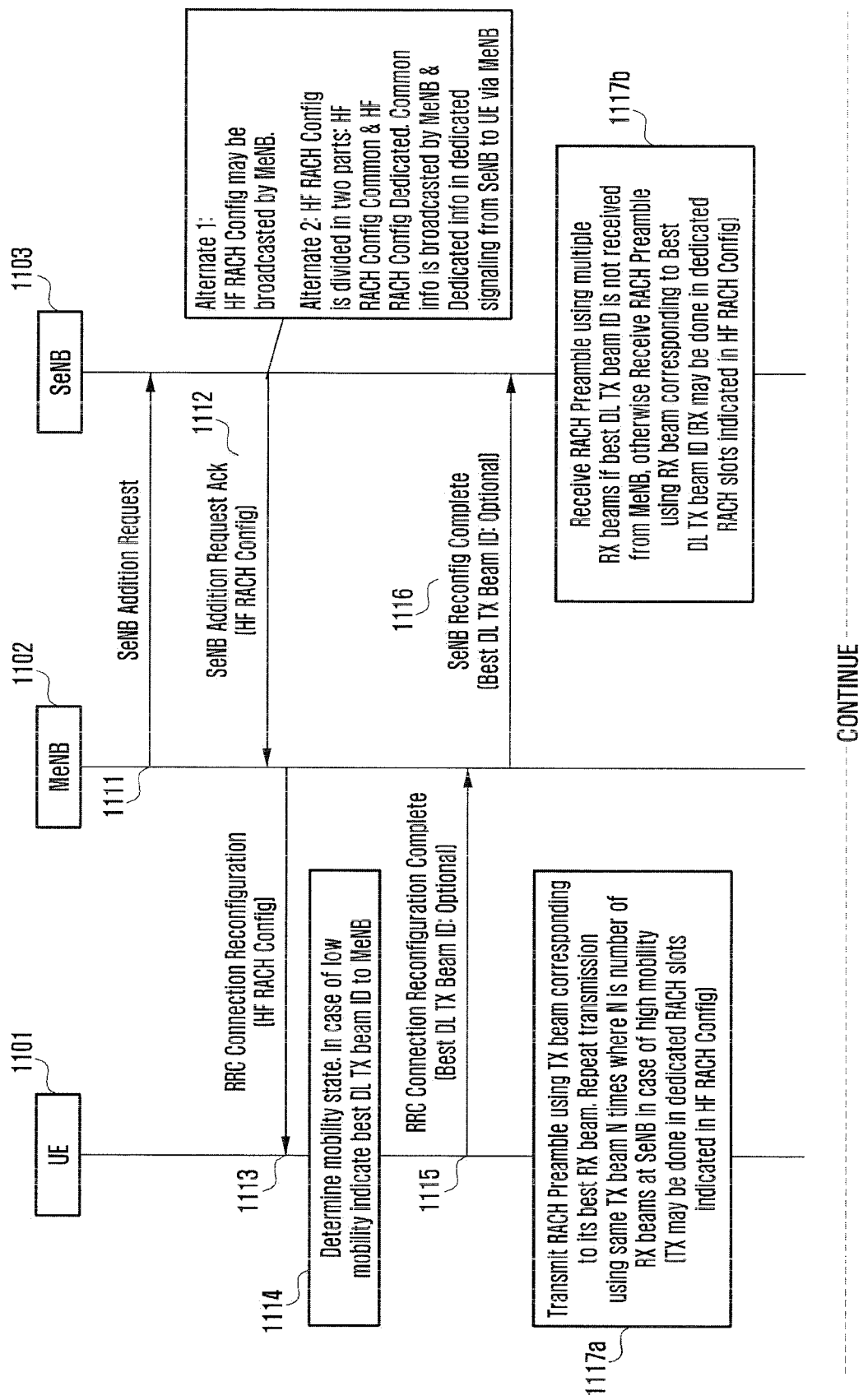
FIGS. 11A and 11B are signal flow diagrams illustrating a method for a beamformed random access procedure according to an embodiment of the present disclosure.
Figure 11B:
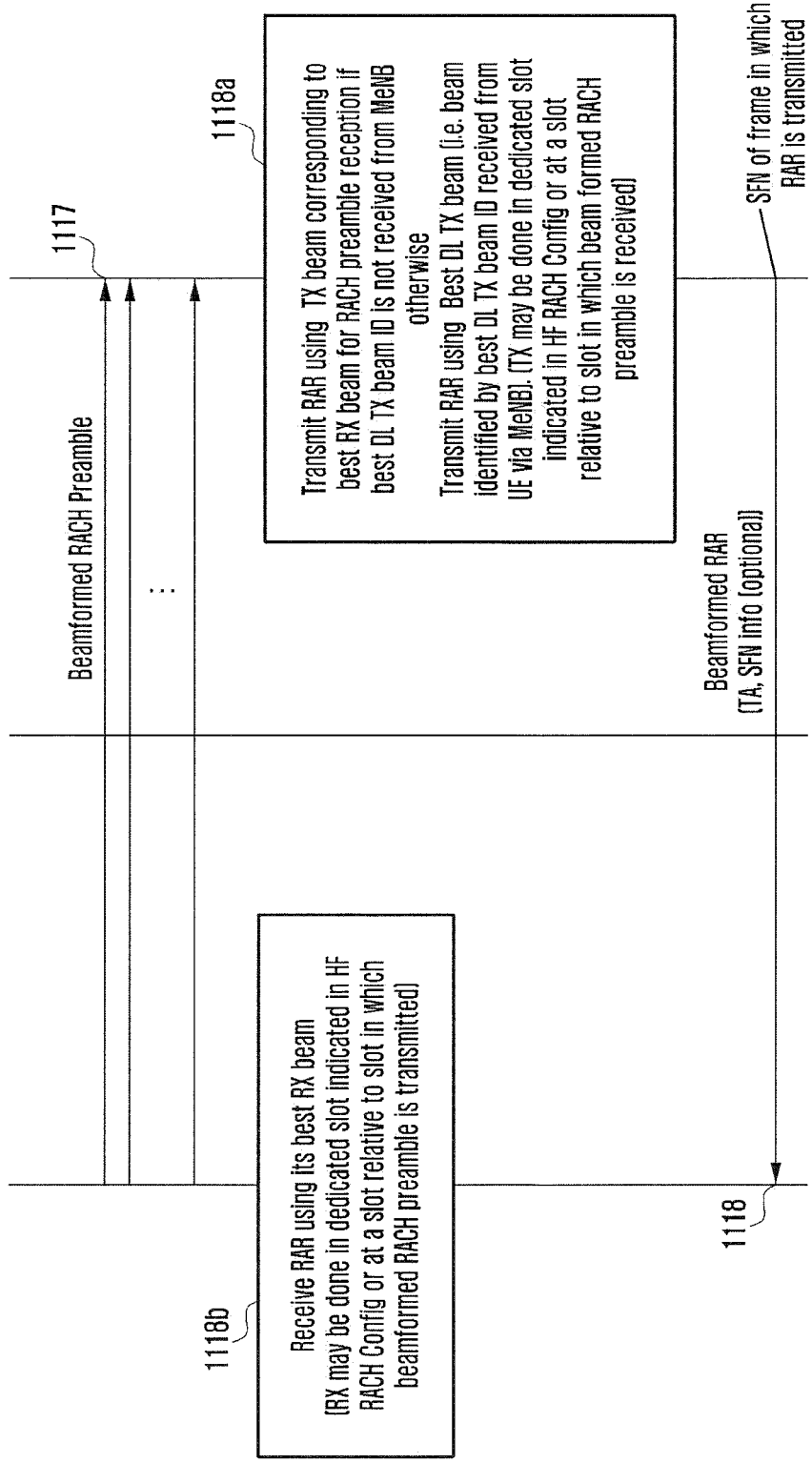

Method 5:

This method of the disclosure is illustrated in FIGS. 11A and 11B according to an embodiment of the present disclosure.

FIGS. 11A and 11B are signal flow diagrams illustrating a method for a beamformed random access procedure according to an embodiment of the present disclosure.

Referring to FIGS. 11A and 11B, at operation 1111, when an LF-BS (MeNB) 1102 adds an HF-BS (SeNB) 1103 for a UE 1101, the MeNB 1102 sends the SeNB Addition Request to the SeNB 1103. At operation 1112, the SeNB 1103 in the response sends the SeNB Addition Request Ack and includes the 'HF RACH config' which carries all the parameters required for efficient RACH operation over the HF-BS. At operation 1113, the MeNB 1102 then sends the RRC Connection Reconfiguration to the UE 1101 including the 'HF RACH config' received from the SeNB 1103. According to various examples, the HF RACH Config may be broadcasted by the MeNB 1102, or the HF RACH Config is divided in two parts: HF RACH Config Common and HF RACH Config Dedicated. The Common information is broadcasted by the MeNB 1102, and the dedicated information is sent in dedicated signaling from the SeNB 1103 to the UE 1101 via the MeNB 1102.

At operation 1114, the UE 1101 performs the DL measurement of the HF cell and identifies the 'Best DL TX beam' and the corresponding 'best RX beam' wherein the 'Best DL TX beam' refers to the DL beam transmitted by the SeNB 1103 which is received best by the UE 1101 and the 'Best RX beam' refers to the RX beam used by the UE 1101 for the reception of the 'Best DL TX beam'. The UE 1101 basically searches for the best TX-RX beam pair among the set of TX beams transmitted by the SeNB 1103 and the set of RX beams used by the UE 1101 for the reception of the TX beams transmitted by the SeNB 1103.

At operation 1115, the UE 1101 reports the identified 'Best DL TX Beam ID' only if the Mobility State of the UE 1101 is below a pre-configured threshold. For example, if the Mobility State of the UE 1101 is identified to be 'Low' then only the UE 1101 reports the identified 'Best DL TX Beam ID' because in case of high mobility the Selected 'Best DL TX Beam ID' can change prior to the completion of the RACH procedure. In alternate embodiment wherein Downlink synchronization signals are transmitted using multiple SS blocks, SS block ID of SS block in which the UE 1101 has received the synchronization signal with best signal quality is reported instead of DL TX beam ID. The 'Best DL TX Beam ID' or SS block ID is included in the RRC Connection Reconfiguration Complete message. At operation 1116, the MeNB 1102 then forwards the received 'Best DL TX Beam ID' or SS block ID to the SeNB 1103.

At operations 1117 and 1118, the UE 1101 and the SeNB 1103 performs the RACH reception and RAR transmission based on whether it has received the 'Best DL TX Beam ID' or SS block ID if reported by the UE 1101 or not. At operation 1117a, if the UE 1101 has reported the 'Best DL TX Beam ID' then it transmits the RACH Preamble using the TX Beam corresponding to the 'Best RX Beam' wherein the 'Best RX Beam' is the RX Beam corresponding to the selected 'Best DL TX Beam ID'. If the UE has reported the 'SS block ID' then it transmits the RACH Preamble using the TX Beam corresponding to the 'Best RX Beam' wherein the 'Best RX Beam' is the RX Beam used to receive the SS block corresponding to reported SS block ID. At operation 1117a, if the UE has not reported the 'Best DL TX Beam ID' or SS block ID then it transmits the RACH Preamble using the TX Beam corresponding to the Best RX Beam wherein the 'Best RX Beam' is the RX Beam corresponding to the 'Best DL TX Beam' or 'Best RX Beam' is the RX Beam corresponding to SS block in which the UE has received synchronization or reference signal with best signal quality. The transmission of RACH Preamble is repeated 'N' times wherein N is the Number of RX Beams at the SeNB. At operation 1117b, the SeNB 1103 upon reception of the 'Best DL TX Beam ID' reported by the UE 1101 utilizes this information for reception of the RACH preamble from the corresponding UE 1101 using the 'RX Beam' corresponding to the 'Best DL TX Beam ID' reported by the UE 1101. The SeNB 1103 upon reception of the 'SS Block ID' reported by the UE 1101 utilizes this information for reception of the RACH preamble from the corresponding UE 1101 using the 'RX Beam' corresponding to the 'DL TX Beam' of SS block reported by the UE 1101. The transmission of the RACH by the UE 1101 is done in the dedicated transmission RACH slots assigned by the SeNB 1103 as indicated in the 'HF RACH config'. The SeNB 1103 also uses the corresponding indicated dedicated slots for the reception of the RACH preamble from the UE 1101. At operation 1117b, if the UE has not reported the 'Best DL TX Beam ID' or SS block ID, the SeNB receives the RACH Preamble using multiple RX Beams as per the SeNB capability.

At operation 1118a, after the receipt of the beamformed RACH preamble from the UE 1101, the SeNB 1103 transmits the RAR using the 'Best DL TX Beam ID' reported by the UE 1101 or using the 'DL TX Beam' of SS block reported by the UE 1101 in the dedicated slots as indicated in the HF RACH Config. If the best DL TX beam ID or SS Block ID is not reported by the UE, then The SeNB 1103 transmits the RAR using the TX Beam corresponding to the Best RX Beam identified based on the reception of RACH Preamble using multiple RX Beams.

At operation 1118b, the UE 1101 receives the RAR using on the slots as indicated in the HF RACH Config its 'Best RX beam' that it had identified as the best RX beam for the reception of the identified 'Best DL TX beam' or SS block. On the other hand if the UE 1101 has not reported the 'Best DL TX Beam ID' or SS block ID then it transmits the RACH Preamble using the TX Beam corresponding (i.e., in same direction as) to the Best RX Beam wherein the 'Best RX Beam' is the RX Beam corresponding to the 'Best DL TX Beam' or 'Best RX Beam' is the RX Beam corresponding to SS block in which the UE has received synchronization or reference signal with best signal quality.

The UE 1101 receives the RACH Preamble using the 'Best RX Beam' as identified during the measurement of the SeNB 1103. Further as in preceding embodiments of the present disclosure, the HF RACH Config can include the slot information for transmission of the RACH and for reception of the RAR. In addition a mapping between the RACH slots and the RX beam of the SeNB 1103 and a mapping between the RAR slots and the TX Beams of the SeNB 1103 is provided in the HF RACH Config. The TA and SFN information may be included in the RAR.

The 'HF RACH Config' as used in the various embodiments consists of information pertaining to the HF cell (HF-BS/SeNB) which is useful for the UE for efficiently performing Random Access on the SeNB subsequent to the addition of the SeNB. The 'HF RACH Config' contains at least one of: Dedicated Preamble Configuration, i.e., Preamble Sequence, Preamble Valid Duration, Beam formed RACH Slot Configuration: RACH slots corresponding to each RX beam of the eNB, Beam formed RAR Slot Configuration: RAR slots corresponding to each TX beam of the eNB or Dedicated RAR slot, TX/RX beamforming gain, Timing offset between frame/subframe of the MeNB and slot of the SeNB, and SFN info in the RAR if BCH is not supported in HF Cell.

Method 6

In another embodiment of the present disclosure, the eNB indicates the number of TX beams that are to be used for sending of the RACH Preamble in mmW RACH Config for example, based on the RX BW and TX BW used at the UE. Similar to the preceding embodiments of the present disclosure, the eNB can also indicate the slots corresponding to the transmission of RACH on each beam.

It is to be noted that in methods 1 to 6, in case of a handover, the UE will not send an RRCConnectionReconfiguration complete message to the MeNB after receiving the RRCConnectionReconfiguration message from the MeNB. The MeNB will not send RRCConnectionReconfiguration message to the SeNB. In case of a handover, the MeNB is a source eNB and the SeNB is a target eNB. The rest of the procedure is the same.

In a plurality of the embodiment of the present disclosure, a RAR Identification in Contention based Random Access in Beamformed System is provided.

Figure 12A:
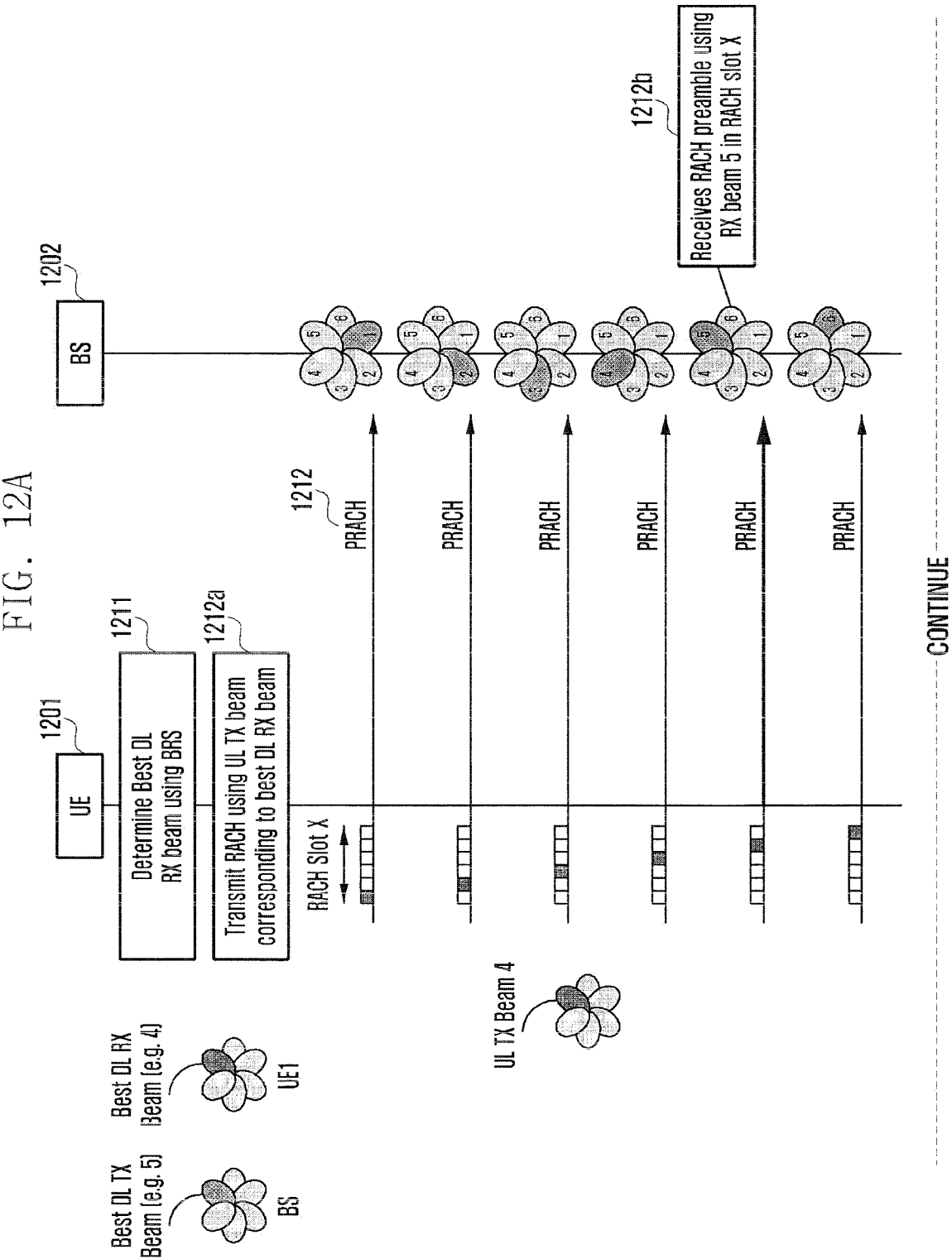
FIGS. 12A and 12B are signal flow diagrams illustrating a random access procedure based on channel reciprocity according to an embodiment of the present disclosure.
Figure 12B:
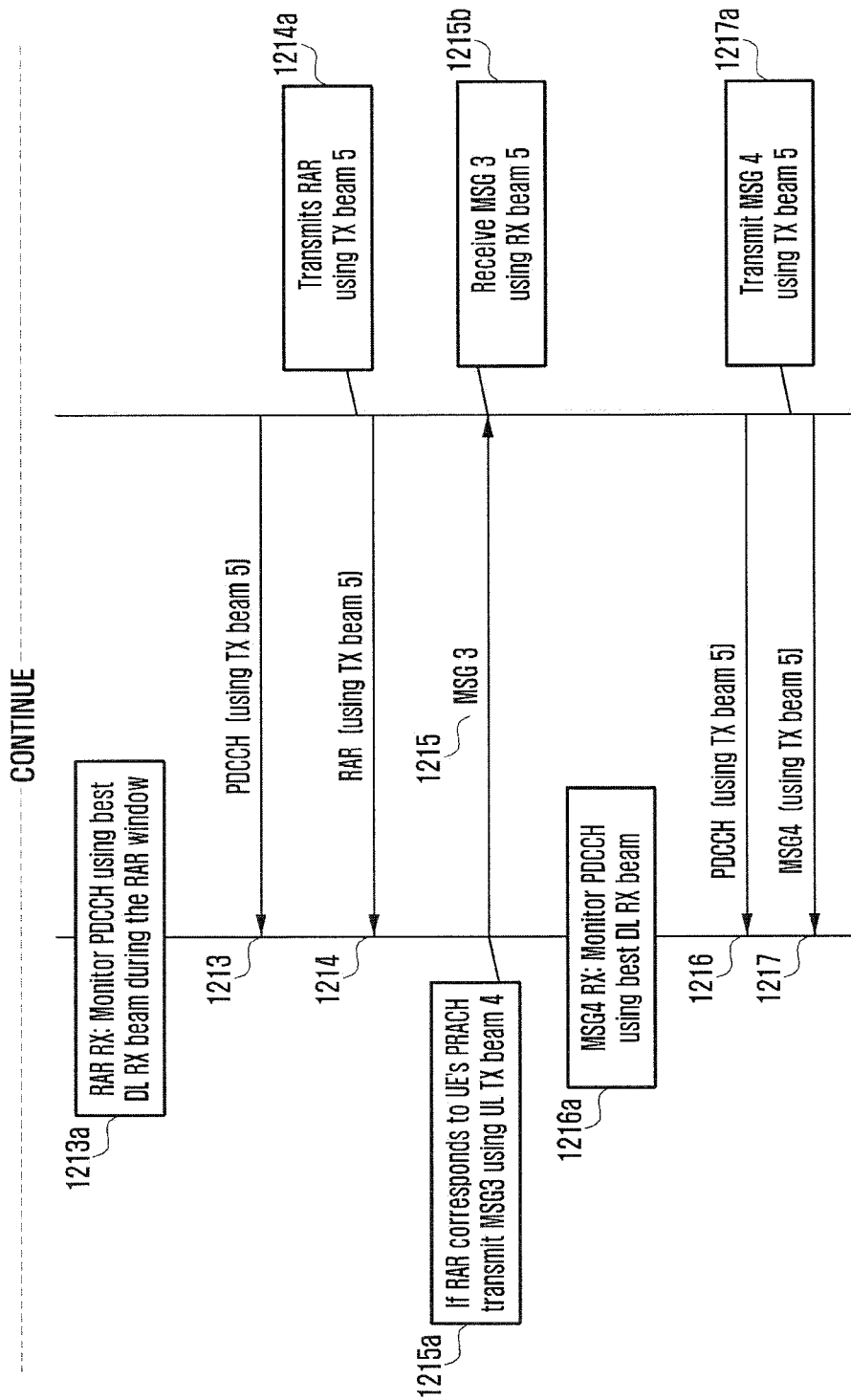

Random access procedure is illustrated in FIGS. 12A and 12B according to an embodiment of the present disclosure.

FIGS. 12A and 12B are signal flow diagrams illustrating a random access procedure based on channel reciprocity according to an embodiment of the present disclosure.

Referring to FIGS. 12A and 12B, a UE 1201 measures the beamformed beam measurement signal (SS, RS, and the like) transmitted by a BS 1202 and determines the best DL RX beam at operation 1211. At operation 1212, the UE 1201 transmits the PRACH using UL TX beam corresponding to (i.e., in same direction as) best DL RX beam at operation 1212a. The UE 1201 transmits PRACH in RACH slot X, wherein PRACH is transmitted using UL TX beam multiple times. At operation 1212b, the BS monitors the RACH slot X using multiple RX beams.

At operations 1213 and 1214, physical downlink control channel (PDCCH) and the RAR are transmitted by the BS 1202 using a TX beam 5 corresponding to (i.e., in same direction as) a RX beam 5 for example wherein BS 1202 has received the PRACH preamble using RX beam 5. After transmitting the PRACH in RACH slot X, the UE monitors for PDCCH for the RAR using best DL RX beam during the RAR window at operation 1213a. If a PRACH preamble is received using the RX beam 5, then the BS 1202 transmits the RAR using the corresponding TX beam 5 at operation 1214a. The RAR includes TA and grant.

At operation 1215, MSG 3 is transmitted by the UE 1201 to the BS 1202. If a RAR corresponding to the UE's PRACH (preamble ID in the RAR corresponds to PRACH preamble transmitted by the UE) is received, the UE 1201 transmits MSG3 using the UL TX beam used to transmit PRACH at operation 1215a. MSG 3 may include best DL TX beam ID or SS block ID. If downlink synchronization signals or reference signals are transmitted using multiple SS blocks, SS block ID of SS block in which the UE 1201 has received the synchronization signal or reference signal with best signal quality may be included in MSG3. At operation 1215b, the BS 1202 receives MSG 3 in grant using RX beam with which the BS 1202 has received the PRACH. BS 1202 receives the MSG3 using the RX beam used to receive the PRACH.

At operation 1216 and 1217, PDCCH and MSG 4 are transmitted by the BS 1202 using a TX beam 5 corresponding to a RX beam 5 for example. After transmitting the MSG 3, the UE 1201 monitors PDCCH for MSG 4 using best DL RX beam at operation 1216*a*. On receiving the MSG 3, the BS 1202 transmits MSG 4 using TX beam with which the BS 1202 has transmitted the RAR or using TX beam indicated in MSG 3 at operation 1217*a*. If SS block ID is indicated in MSG3, the BS 1202 transmits MSG4 using TX beam which the BS 1202 has used for transmitting Downlink synchronization signals or reference signals in SS block identified by SS block.

Figure 13A:
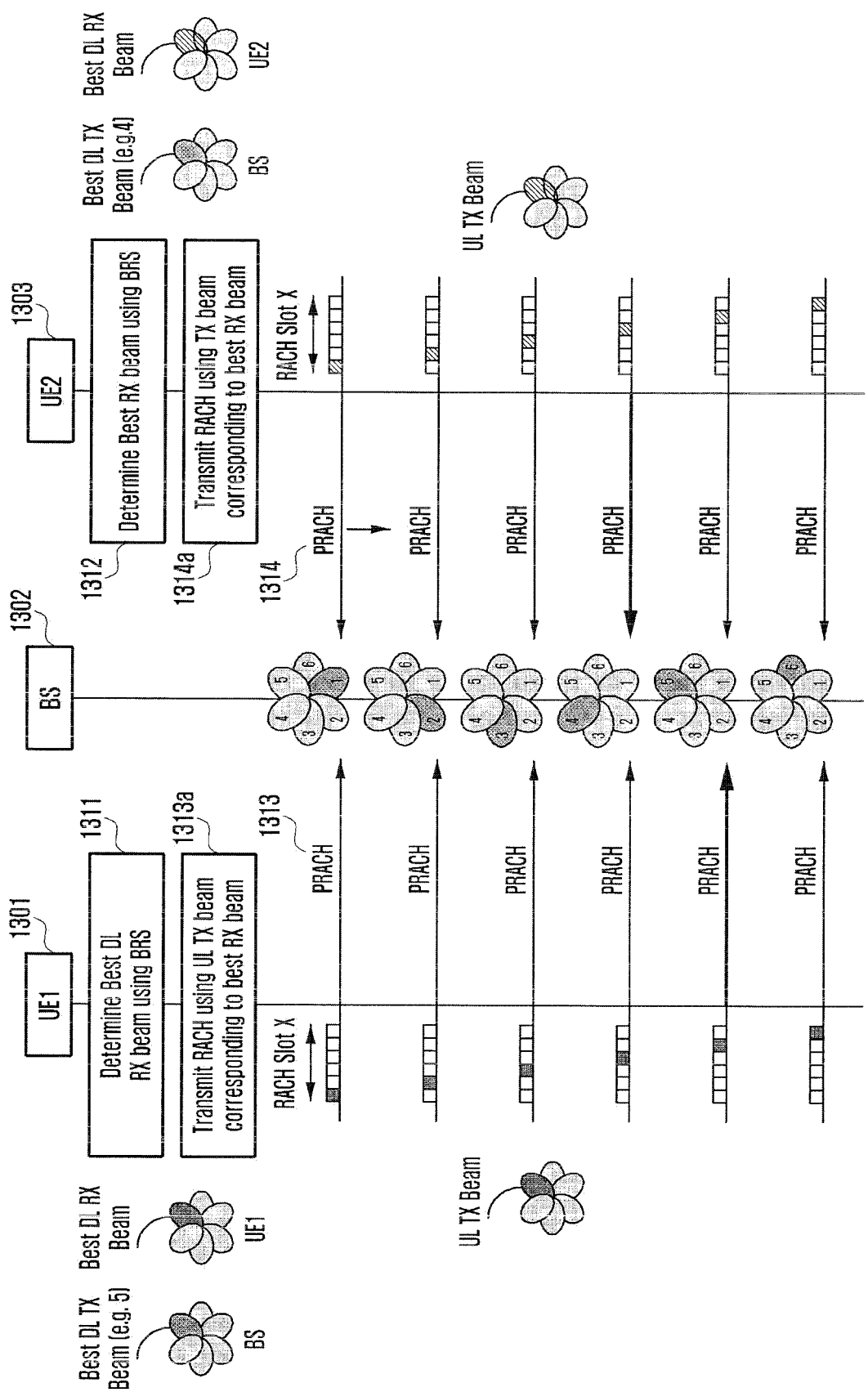
FIGS. 13A and 13B are signal flow diagrams illustrating a problem when random access procedures are performed by multiple user equipment (UEs) with one base station according to an embodiment of the present disclosure.
Figure 13B:
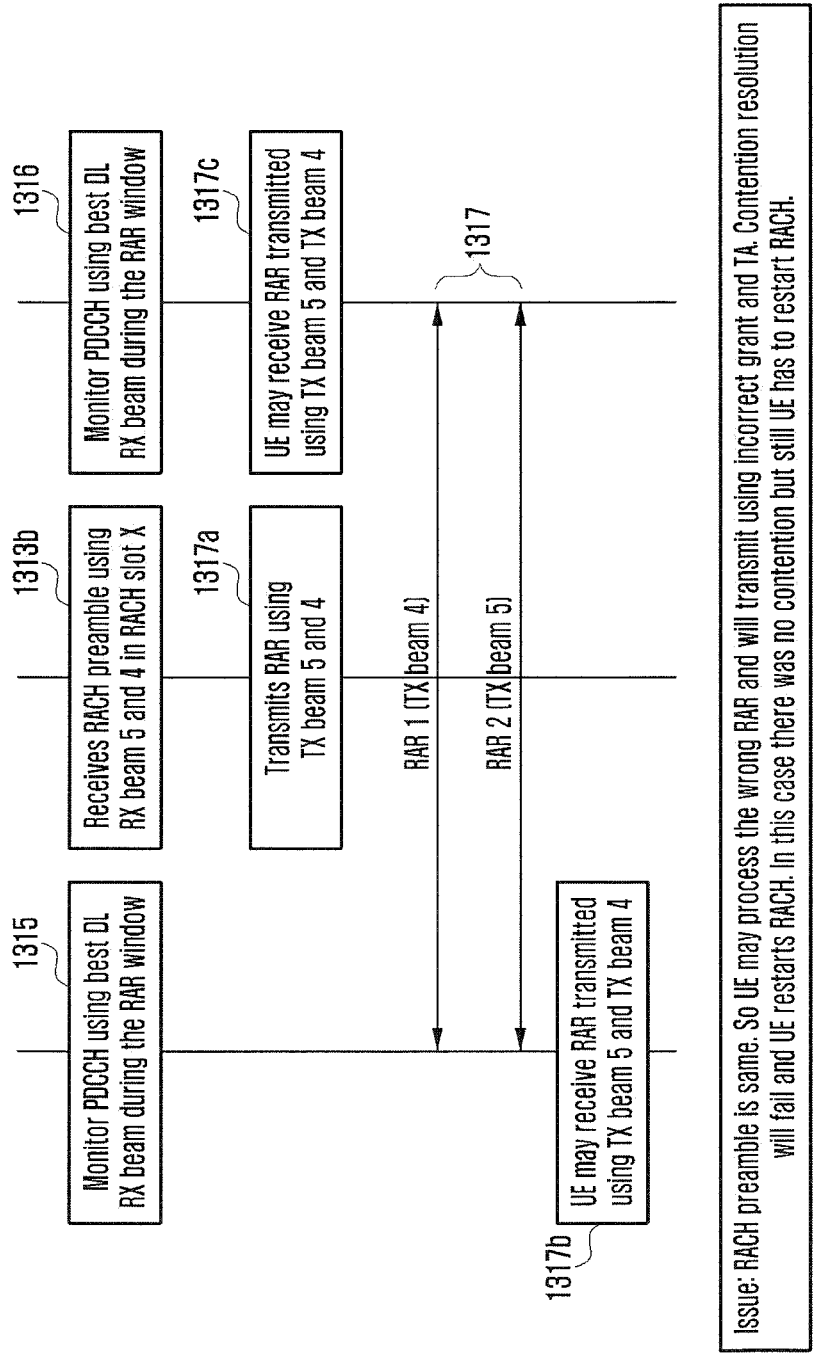

One of the issues in the above procedure is illustrated in FIGS. 13A and 13B according to an embodiment of the present disclosure.

FIGS. 13A and 13B are signal flow diagram illustrating a problem when random access procedures are performed by multiple UEs with one base station according to an embodiment of the present disclosure.

Referring to FIGS. 13A and 13B, at operations 1311 and 1312, the UE1 1301 and UE2 1303 transmit determines the best DL RX beam by measuring a beam measurement reference signal (BRS or SS). At operation 1313 and 1314, the UE1 1301 and the UE2 1303 transmit the PRACH preamble in same RACH slot X. At operation 1313*a*, the UE1 1301 transmits the PRACH using UL TX beam corresponding to best DL RX beam. At operation 1314*a*, the UE2 1303 transmits the PRACH using UL TX beam corresponding to best DL RX beam. At operation 1313*b*, the BS 1302 receives PRACH from both UEs 1301, 1303 using different RX beam in RACH slot x. After transmitting the PRACH in RACH slot X, UEs 1301, 1303 monitor for PDCCH for the RAR using each best DL RX beam during the RAR window at operations 1315 and 1316.

At operations 1317 and 1317*a*, the BS 1302 transmits RAR1 for UE2's RACH and RAR2 for UE's RACH using TX beam 4 and TX beam 5, respectively, corresponding to PRACH preamble reception using RX beam 4 and RX beam 5. While monitoring PDCCH using best DL RX beam, each UE 1301, 1303 may receive transmission from multiple TX beams at operations 1317*b* and 1317*c*. For example, the UE1 1301 can receive the RAR1 which is for UE2 and processes it. This leads to transmission of MSG3 using incorrect grant and TA and eventually leads to random access failure.

RAR Identification Method 1:

Embodiment 1

Figure 14A:
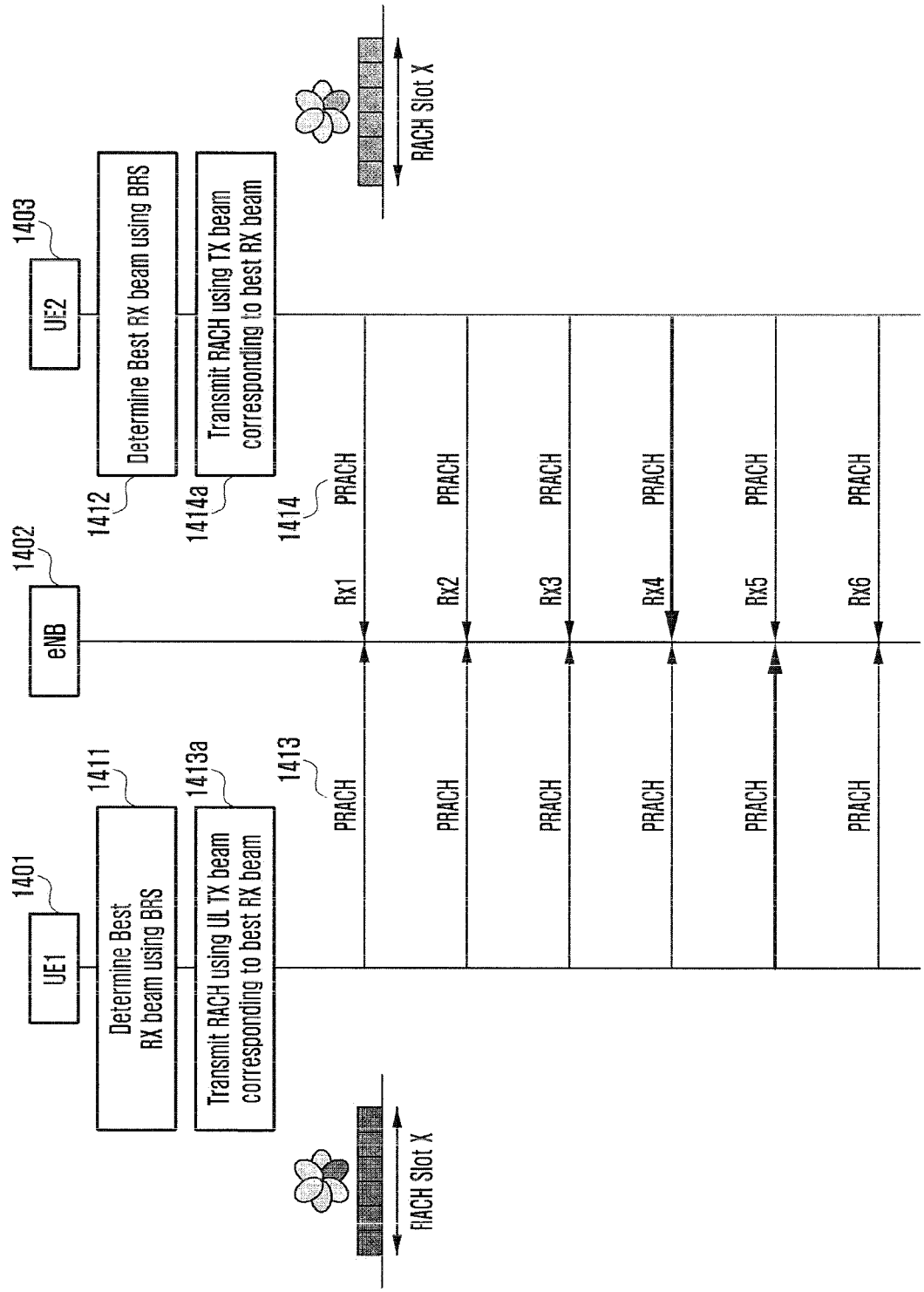
FIGS. 14A and 14B are signal flow diagrams illustrating a method for a beamformed random access procedure for identifying a correct random access response (RAR) according to an embodiment of the present disclosure.
Figure 14B:
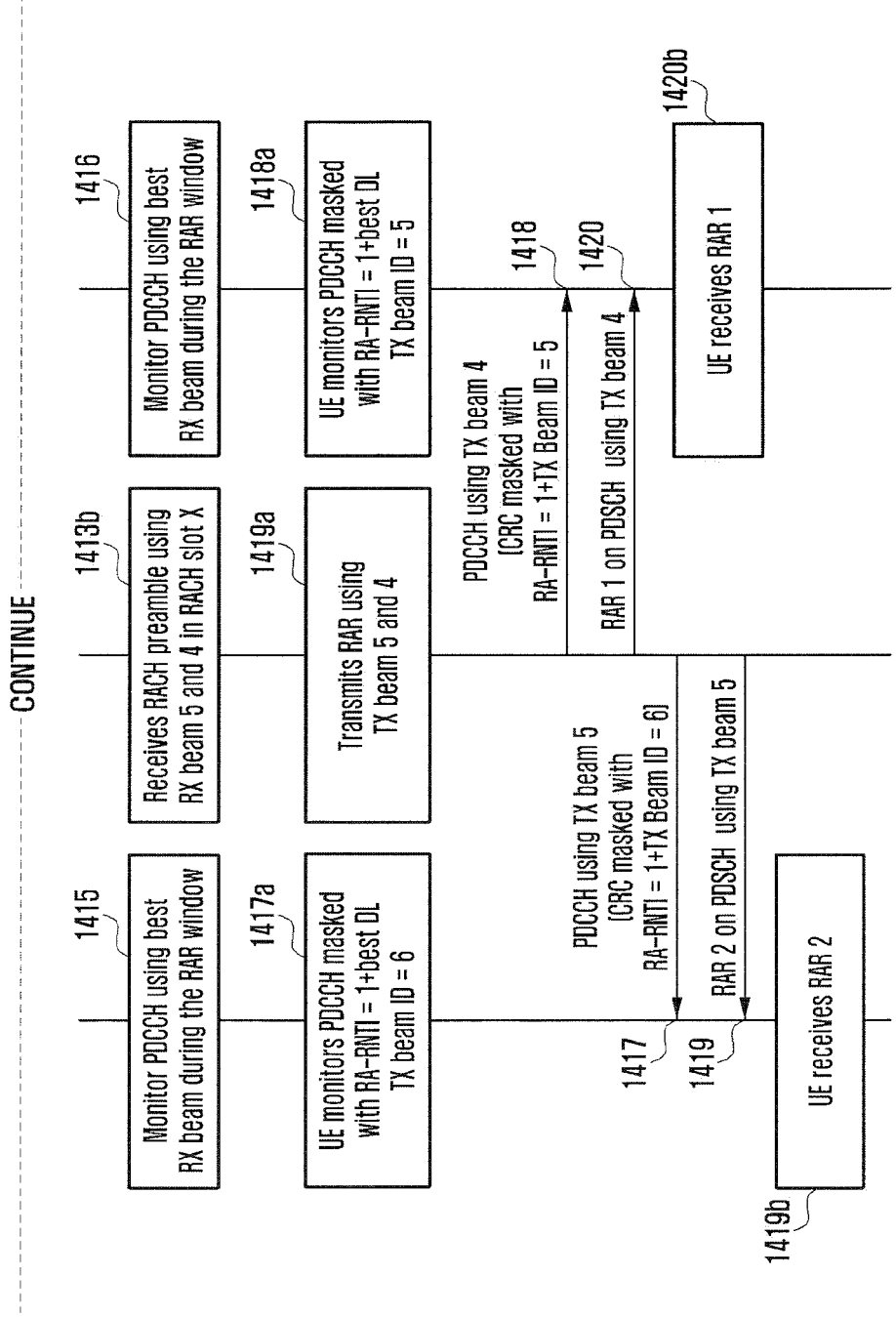

In an embodiment of the present disclosure, the issue of RAR identification can be resolved as illustrated in FIGS. 14A and 14B according to an embodiment of the present disclosure.

FIGS. 14A and 14B are signal flow diagrams illustrating a method for a beamformed random access procedure for identifying a correct random access response (RAR) according to an embodiment of the present disclosure.

Referring to FIGS. 14A and 14B, at operations 1411 and 1412, the UE1 1401 and UE2 1403 transmit determines the best DL RX beam by measuring a BRS or SS. At operations 1413 and 1414, the UE1 1401 and the UE2 1403 transmit the PRACH preamble in same RACH slot X. At operation 1413*a*, the UE1 1401 transmits the PRACH using UL TX beam corresponding to best DL RX beam. At operation 1414*a*, the UE2 1403 transmits the PRACH using UL TX beam corresponding to best DL RX beam. At operation 1413*b*, the BS 1402 receives PRACH from both UEs 1401, 1403 using different RX beam in RACH slot x.

After transmitting the PRACH in RACH slot X, UEs 1401, 1403 monitor for PDCCH for the RAR using each best DL RX beam during the RAR window at operations 1415 and 1416. In this embodiment of the present disclosure, at operations 1417 and 1418, the BS 1402 transmits PDCCHs which are cyclic redundancy check (CRC) masked with random access (RA)-radio network temporary identifiers (RNTIs). At operations 1417*a* and 1418*a*, each UE 1401, 1403 monitors (E) PDCCH for the RARs identified by the RA-RNTI defined below, in the RA response window which starts at fixed position relative to subframe in which PRACH is transmitted and has length configured by BS 1402.

In an embodiment of the present disclosure, each UE 1401, 1403 use the RA-RNTI=1+best DL TX beam ID (or SS block ID) for receiving the RAR. SS block ID is the ID of SS block in which each UE 1401, 1403 has received the synchronization or reference signal with best signal quality. The PDCCH indicating the RAR is CRC masked by the BS 1402 with RA-RNTI=1+TX beam ID (or SS block ID) wherein TX beam ID identifies the TX beam used to transmit the PDCCH and the corresponding RAR. SS block ID is the ID of the SS block in which the BS 1402 transmits synchronisation or reference signal using the TX beam which is used for transmitting the PDCCH and the corresponding RAR.

Alternately, RA-RNTI=1+RX beam ID wherein RX beam ID is the beam ID of the RX beam with which the BS 1402 has received PRACH. The BS 1402 provides mapping between its RX beam ID and TX beam ID(s) or SS block IDs. Each UE 1401, 1403 know the best DL TX beam ID or SS block ID, so it can know BS RX beam ID based on above mapping. Accordingly each UE 1401, 1403 knows the RA-RNTI for receiving the RAR.

The RA-RNTI associated with the PRACH in which the Random Access Preamble is transmitted, can be computed as:

$$N + t\_id + k1 * f\_id + k2 * b\_id,$$

Where, t_id is the index of RACH slot e.g., subframe index of the first subframe of PRACH;

f_id is the index of the specified PRACH within that subframe, in ascending order of frequency domain;

b_id is the beam index or SS block index; N is fixed offset, can be 1

$$0 <= t\_id < N1;\ 0 <= f\_id < N2;\ 0 <= b\_id < N3;$$

$$k1 = 1 + t\_id;\ k2 = 1 + t\_id + k1 * f\_id$$

$$N + t\_id + k1 * b\_id,$$

Where, t_id is the index of RACH slot e.g., subframe index of the first subframe of PRACH b_id is the beam index or SS block index; N is fixed offset, can be 1

$$0 <= t\_id < N1;\ 0 <= b\_id < N2;\ k1 = 1 + t\_id;$$

$$N + f\_id + k1 * b\_id,$$

Where, f_id is the index of the specified PRACH within that subframe, in ascending order of frequency domain, b_id is the beam index; N is fixed offset, can be 1

$$0 <= f\_id < N1;\ 0 <= b\_id < N2;\ k1 = 1 + f\_id;$$

In an embodiment of the present disclosure, b_id can be DL TX beam index or SS block index, DL RX beam Index. In another embodiment of the present disclosure, both can be used in computing RA-RNTI.

At operations 1419 and 1420, the BS 1402 transmits RAR1 for UE2's RACH and RAR2 for UE1's RACH using TX beam 4 and TX beam 5 respectively, at operation 1419*a*.

PDCCH indicates DL assignment for the RAR. The UE processes the PDCCH corresponding to its RA-RNTI as determined above. Each UE 1401, 1403 decodes transport block (TB) and receives the RAR based on the DL assignment in the PDCCH processed at operations 1419*b* and 1420*b*.

After receiving the RAR, if the RAR includes the PRACH preamble ID, then each of the UE 1401, 1403 considers this Random Access Response reception successful. Each UE 1401, 1403 processes the TA received in the RAR and transmits MSG3 using the received grant in the RAR.

Each UE 1401, 1403 may stop monitoring for Random Access Response(s) after successful reception of a Random Access Response containing Random Access Preamble identifiers that matches the transmitted Random Access Preamble.

Embodiment 2

Figure 15B:
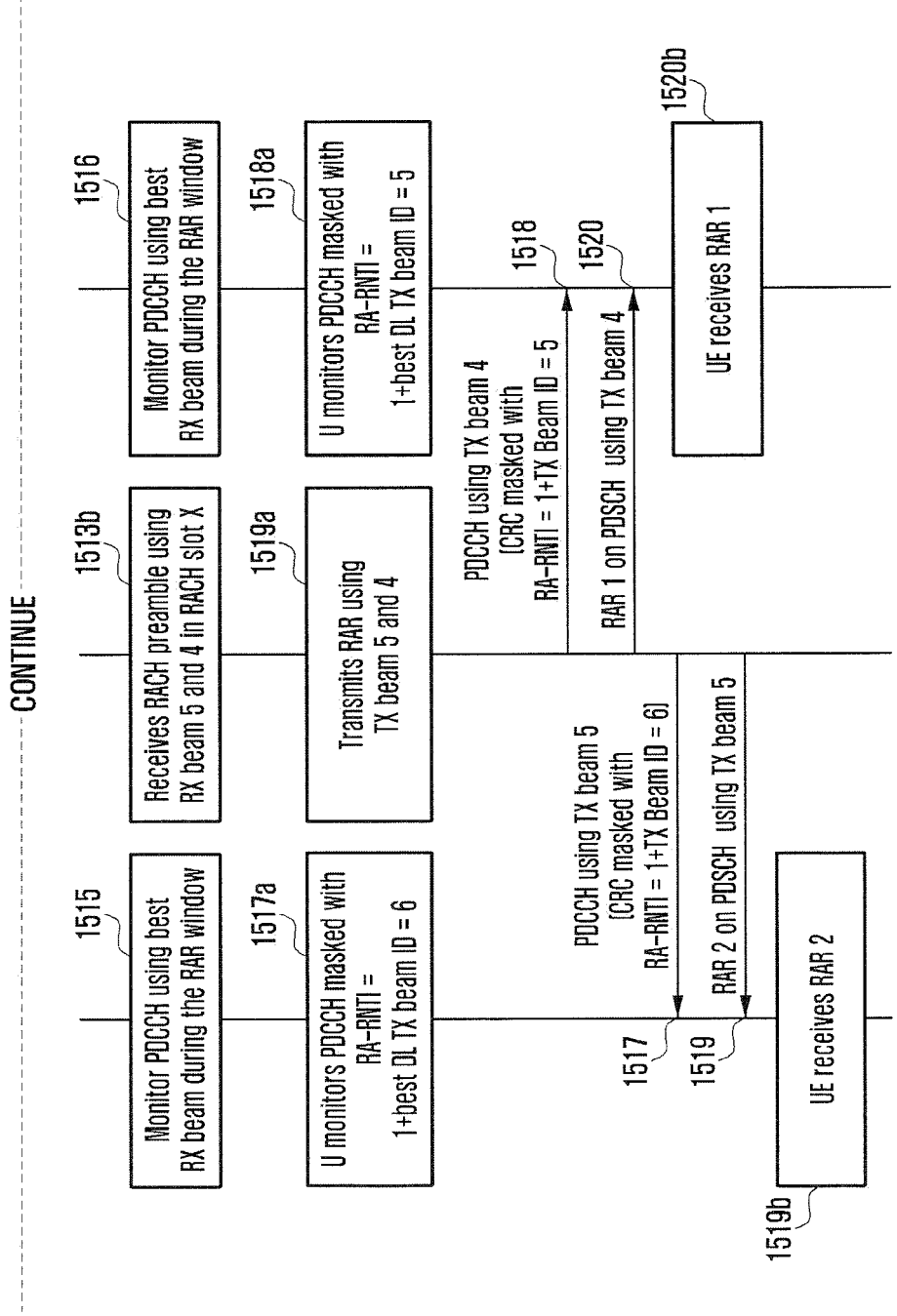

In another embodiment of the present disclosure, the issue of RAR identification can be resolved as illustrated in FIGS. 15A and 15B according to an embodiment of the present disclosure.

FIGS. 15A and 15B are signal flow diagrams illustrating a method for a beamformed random access procedure for identifying a correct RAR according to an embodiment of the present disclosure.

Referring to FIGS. 15A and 15B, at operations 1511 and 1512, the UE1 1501 and UE2 1503 transmit determines the best DL RX beam by measuring a BRS. At operations 1513 and 1514, the UE1 1501 and the UE2 1503 transmit the PRACH preamble in same RACH slot X. At operations 1513*a* and 1514*a*, PRACH is transmitted using a TX beam once instead of transmitting multiple times for RX sweeping at the BS 1502. There is one to mapping between RACH transmission opportunity and DL TX beam ID. The UE 1501 transmits in RACH transmission opportunity corresponding to its best DL TX beam ID. Alternately, there is one to mapping between RACH transmission opportunity and DL RX beam ID. Mapping between DL RX beam ID and one or more DL TX beam IDs can be signaled to the UE or DL RX beam ID can be same as DL TX beam ID. The UE transmit in RACH transmission opportunity corresponding to its best DL TX beam ID. At operation 1513*b*, the BS 1502 receives PRACH from both UEs 1501, 1503 using different RX beam in RACH slot x.

After transmitting the PRACH in RACH slot X, UEs 1501, 1503 monitor for PDCCH for the RAR using each best DL RX beam during the RAR window at operation 1515 and 1516. In this method, at operation 1517 and 1518, the BS 1502 transmits PDCCHs which are CRC masked with RA-RNTI. At operations 1517*a* and 1518*a*, each UE 1501, 1503 monitors (E) PDCCH for the RARs identified by the RA-RNTI in the RA response window which starts at fixed position relative to subframe in which PRACH is transmitted and has length configured by BS 1502.

At operation 1519 and 1520, the BS 1502 transmits RAR1 for UE2's RACH and RAR2 for UE1's RACH using TX beam 4 and TX beam 5 respectively, at operation 1519*a*.

PDCCH indicates DL assignment for the RAR. The UE processes the PDCCH corresponding to its RA-RNTI as determined above. Each UE determines its RA-RNTI as explained in embodiment 1. Each UE 1501, 1503 decodes TB and receives the RAR for each based on the DL assignment in the PDCCH processed at operations 1519*b* and 1520*b*.

RAR Identification Method 2

Embodiment 1

Figure 16A:
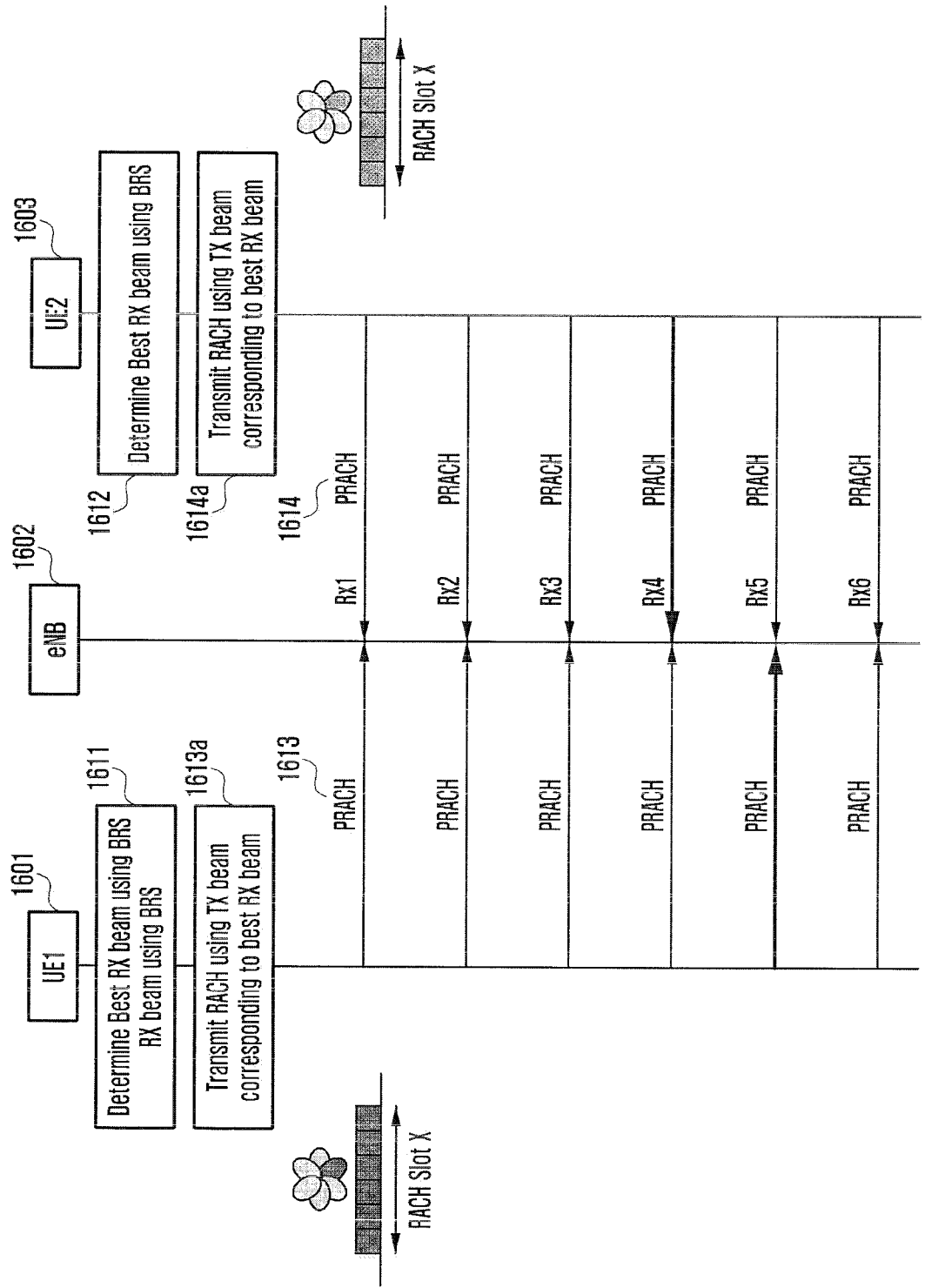
FIGS. 16A and 16B are signal flow diagrams illustrating a method for a beamformed random access procedure for identifying a correct RAR according to an embodiment of the present disclosure.
Figure 16B:
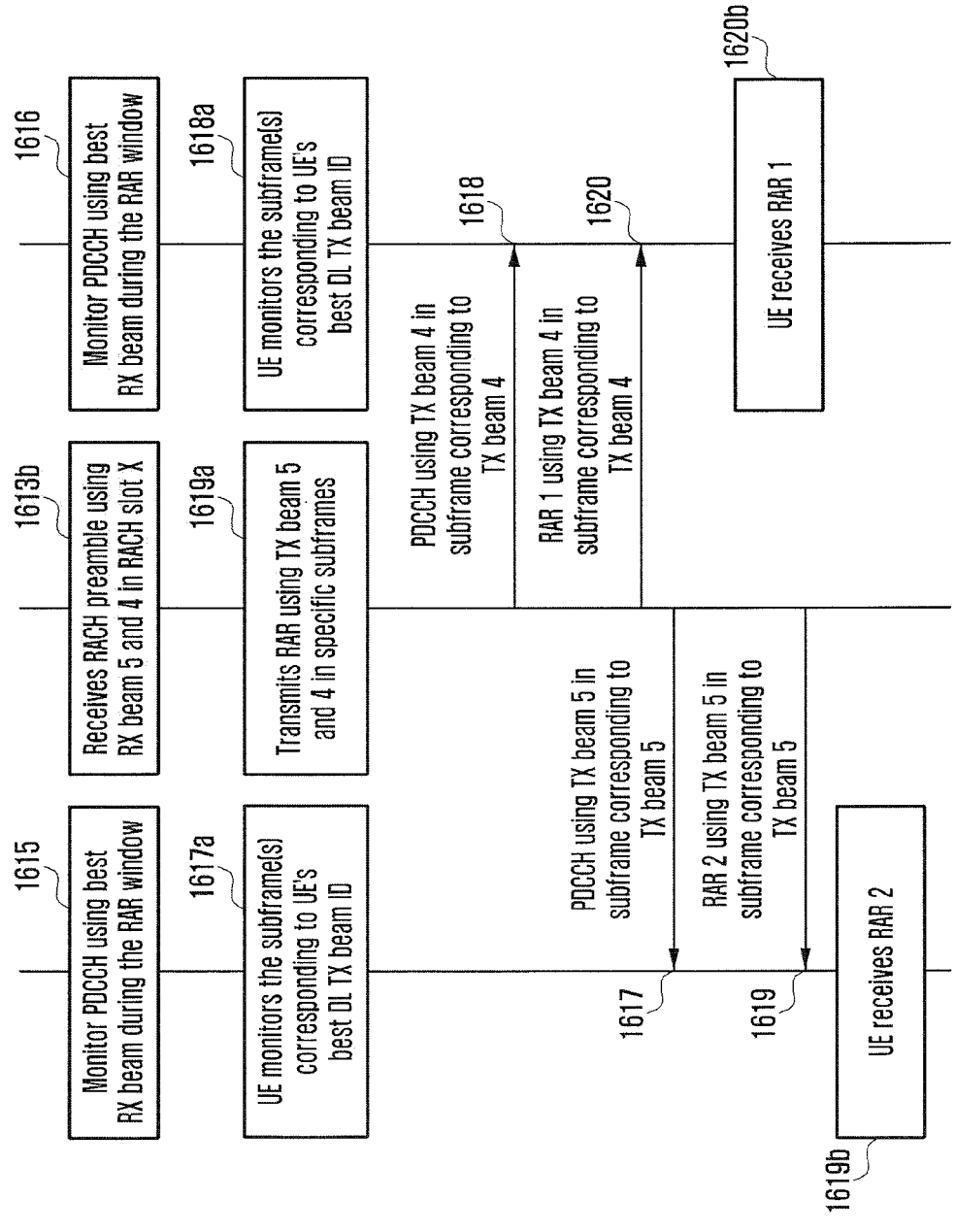

In an embodiment of the present disclosure, the issue of RAR identification can be resolved as illustrated in FIGS. 16A and 16B according to an embodiment of the present disclosure.

FIGS. 16A and 16B are signal flow diagrams illustrating a method for a beamformed random access procedure for identifying a correct RAR according to an embodiment of the present disclosure.

Referring to FIGS. 16A and 16B, at operations 1611 and 1612, the UE1 1601 and UE2 1603 transmit determines the best DL RX beam by measuring a BRS or SS. At operations 1613 and 1614, the UE1 1601 and the UE2 1603 transmit the PRACH preamble in same RACH slot X. At operation 1613*a*, the UE1 1601 transmits the PRACH using UL TX beam corresponding to best DL RX beam. At operation 1614*a*, the UE2 1603 transmits the PRACH using UL TX beam corresponding to best DL RX beam. At operation 1613*b*, the BS 1602 receives PRACH from both UEs 1601, 1603 using different RX beam in RACH slot x.

After transmitting the PRACH in RACH slot X, UEs 1601, 1603 monitor for PDCCH for the RAR using each best DL RX beam during the RA response window which starts at fixed position relative to subframe in which PRACH is transmitted and has length configured by the BS 1602, at operations 1615 and 1616. In this embodiment of the present disclosure, at operations 1617 and 1618, the BS 1602 transmits PDCCH in each subframe(s) corresponding to each DL TX beam ID using TX beam 4 and TX beam 5 respectively at operation 1619*a*. In the RAR window, each UE 1601, 1603 monitors the subframe(s) corresponding to the UE's best DL TX beam ID or SS block ID, at operations 1617*a* and 1618*a*. SS block ID is the ID of SS block in which each UE 1601, 1603 has received the synchronisation or reference signal with best signal quality.

Figure 17:
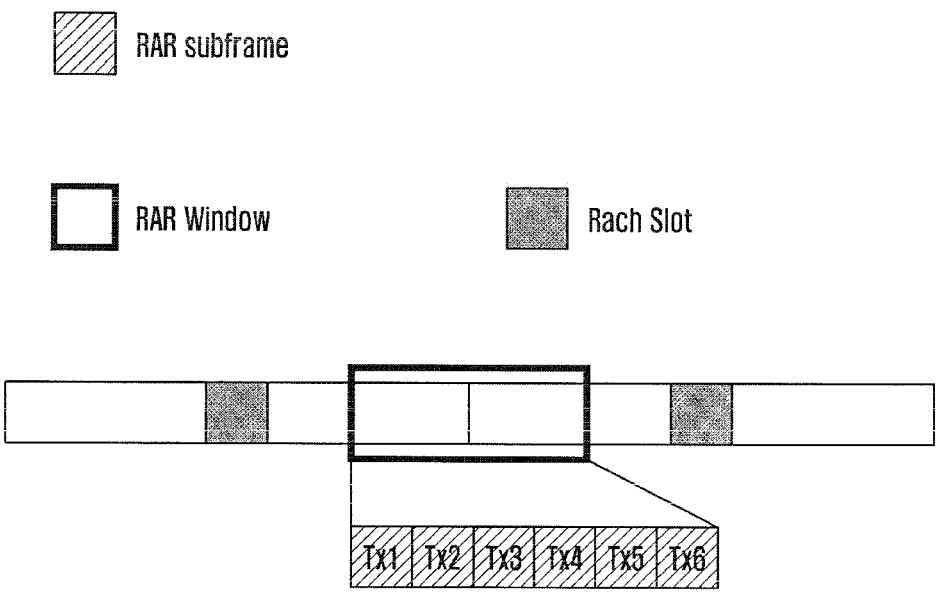
FIG. 17 is a schematic diagram illustrating identification of a RAR according to an embodiment of the present disclosure.

One example of mapping between the subframe and DL TX beam ID (or SS block ID) in the RAR window is illustrated in FIG. 17.

FIG. 17 is a schematic diagram illustrating identification of a RAR according to an embodiment of the present disclosure.

Referring to FIG. 17, mapping between the subframe(s) in the RAR window and the DL TX beam IDs (or SS block IDs) is signaled by the BS or it may be fixed. Alternately, the subframe number corresponding to a beam ID (or SS block ID) can be equal to beam ID (or SS block ID) mod (Number of subframes in the RAR Window).

At operations 1619 and 1620, the BS 1602 transmits RAR1 for UE2's RACH and RAR2 for UE1's RACH using TX beam 4 and TX beam 5 in each subframe corresponding to each TX Beam ID (or SS block ID) in the RAR window. SS block ID is the ID of the SS block in which the BS 1602 transmits synchronisation or reference signal using the TX beam which is used for transmitting the PDCCH and the corresponding RAR.

In an embodiment of the present disclosure, the RAR window can be different for different DL TX beam and SS block. The UE monitors the RAR window corresponding to its best DL TX beam or SS block ID of SS block in which it has received the synchronisation or reference signal with best signal quality.

PDCCH indicates DL assignment for the RAR. Each UE processes the PDCCH corresponding to its RA-RNTI. Each UE 1601, 1603 decodes TB and receives the RAR based on the DL assignment of processed PDCCH at operations 1619*b* and 1620*b*.

After receiving the RAR, if the RAR includes the PRACH preamble ID, then each of the UE 1601, 1603 considers this Random Access Response reception successful. Each UE 1601, 1603 processes the TA received in the RAR and transmits MSG3 using the received grant in the RAR.

Each UE 1601, 1603 may stop monitoring for Random Access Response(s) after successful reception of a Random Access Response containing Random Access Preamble identifiers that matches the transmitted Random Access Preamble.

Embodiment 2

Figure 18A:
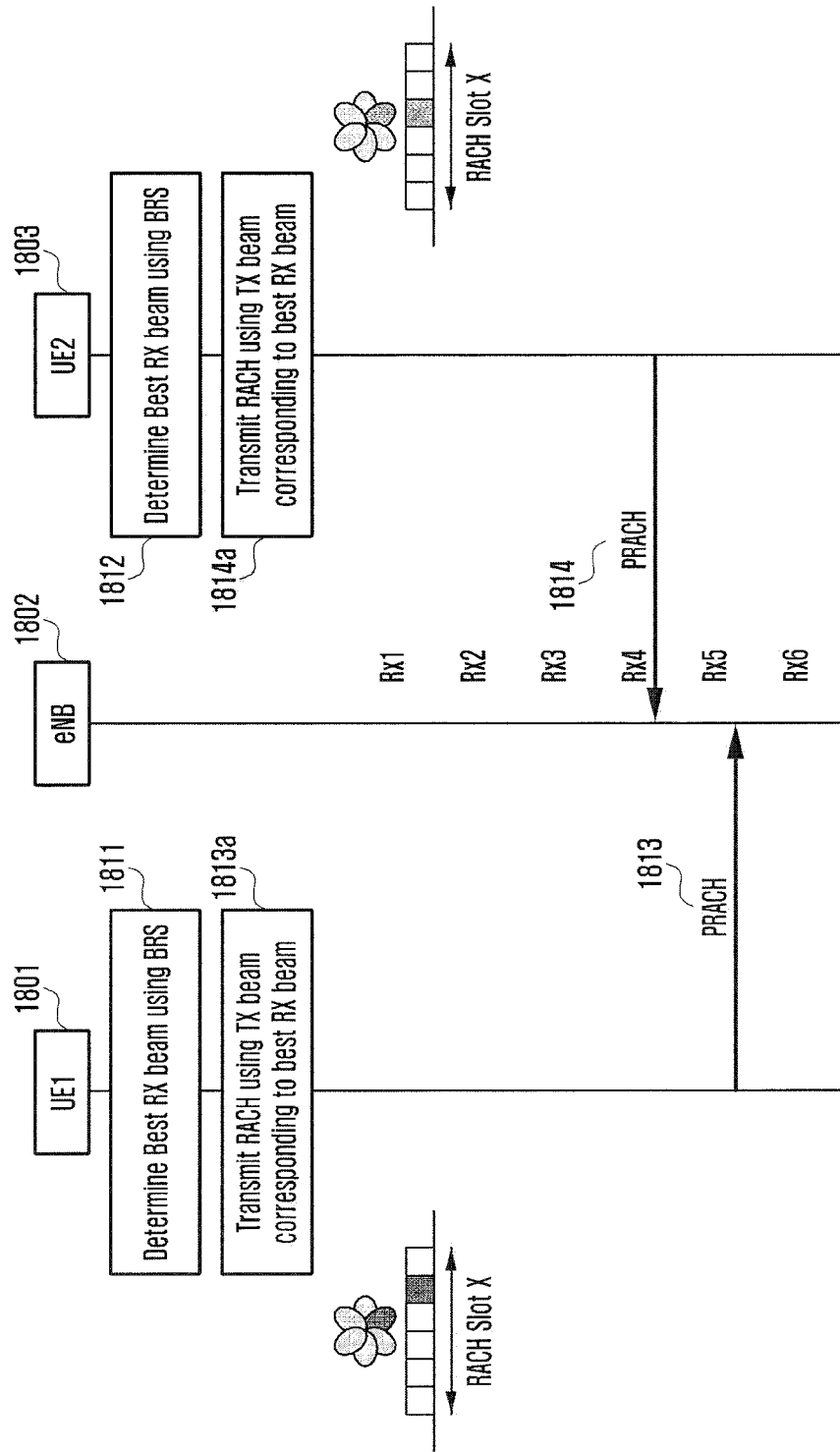
FIGS. 18A and 18B are signal flow diagrams illustrating a method for a beamformed random access procedure for identifying a correct RAR according to an embodiment of the present disclosure.
Figure 18B:
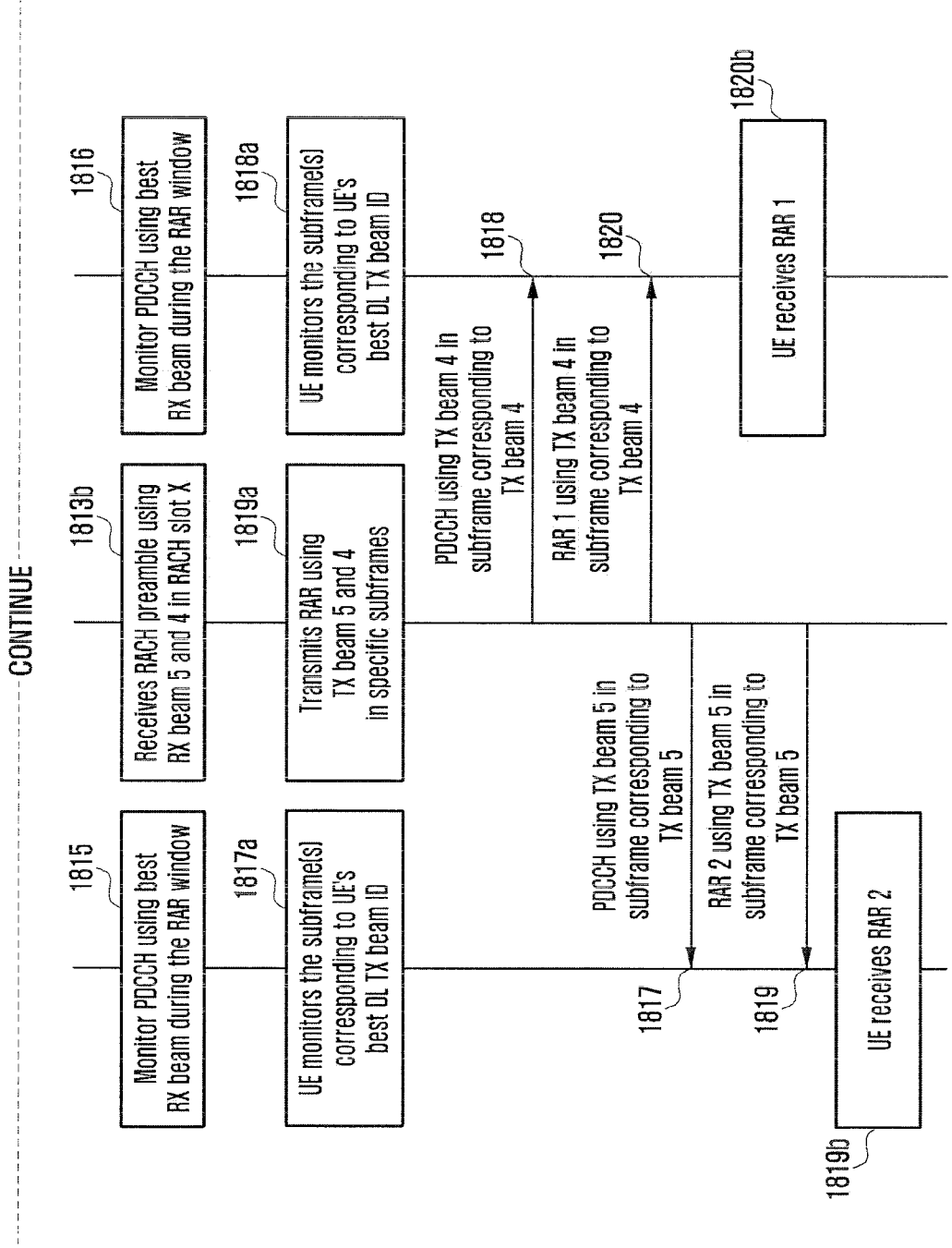

In another embodiment of the present disclosure, the issue of RAR identification can be resolved as illustrated in FIGS. 18A and 18B according to an embodiment of the present disclosure.

FIGS. 18A and 18B are signal flow diagrams illustrating a method for a beamformed random access procedure for identifying a correct RAR according to an embodiment of the present disclosure.

Referring to FIGS. 18A and 18B, at operations 1811 and 1812, the UE1 1801 and UE2 1803 transmit determines the best DL RX beam by measuring a BRS. At operation 1813 and 1814, the UE1 1801 and the UE2 1803 transmit the PRACH preamble in same RACH slot X. At operations 1813*a* and 1814*a*, PRACH is transmitted using a TX beam once instead of transmitting multiple times for RX sweeping at the BS 1802. There is one to mapping between RACH transmission opportunity and DL TX beam ID (or SS block ID). The UE 1801 transmits in RACH transmission opportunity corresponding to its best DL TX beam ID (or SS block ID). Alternately, there is one to mapping between RACH transmission opportunity and DL RX beam ID. Mapping between DL RX beam ID and one or more DL TX beam IDs can be signaled to the UE or DL RX beam ID can be same as DL TX beam ID. The UE transmit in RACH transmission opportunity corresponding to its best DL TX beam ID (or SS block ID). At operation 1813*b*, the BS 1802 receives PRACH from both UEs 1801, 1803 using different RX beam in RACH slot x.

After transmitting the PRACH in RACH slot X, UEs 1801, 1803 monitor for PDCCH for the RAR using each best DL RX beam during the RA response window which starts at fixed position relative to subframe in which PRACH is transmitted and has length configured by the BS 1802, at operations 1815 and 1816. In this embodiment of the present disclosure, at operations 1817 and 1818, the BS 1802 transmits PDCCH in each subframe(s) corresponding to each DL TX beam ID using TX beam 4 and TX beam 5 respectively at operation 1819*a*. In the RAR window, each UE 1801, 1803 monitors the subframe(s) corresponding to the UE's best DL TX beam ID, at operations 1817*a* and 1818*a*. One example of mapping between the subframe and DL TX beam ID in the RAR window is illustrated in FIG. 17. Mapping between the subframe in the RAR window and the DL TX beam ID is signaled by the BS or it may be fixed. Alternately, the subframe number corresponding to a beam ID can be equal to beam ID mod (Number of subframes in the RAR Window).

At operations 1819 and 1820, the BS 1802 transmits RAR1 for UE2's RACH and RAR2 for UE1's RACH using TX beam 4 and TX beam 5 in each subframe corresponding to each TX Beam ID in RAR window.

PDCCH indicates DL assignment for the RAR. Each UE processes the PDCCH corresponding to its RA-RNTI. Each UE 1801, 1803 decodes TB and receives the RAR based on the DL assignment of processed PDCCH at operations 1819*b* and 1820*b*.

RAR Identification Method 3

Embodiment 1

Figure 19A:
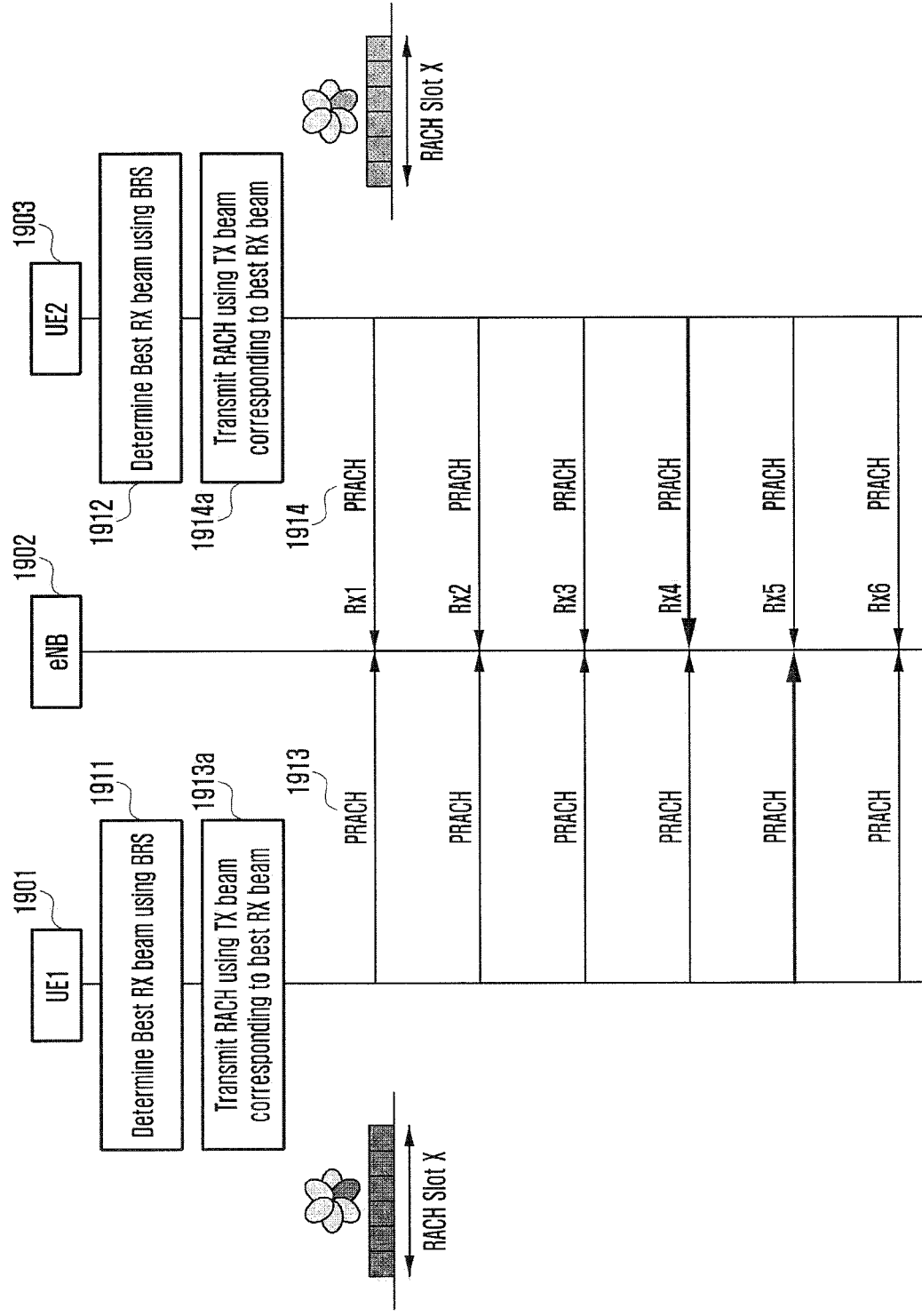
FIGS. 19A and 19B are signal flow diagrams illustrating a method for a beamformed random access procedure for identifying a correct RAR according to an embodiment of the present disclosure.
Figure 19B:
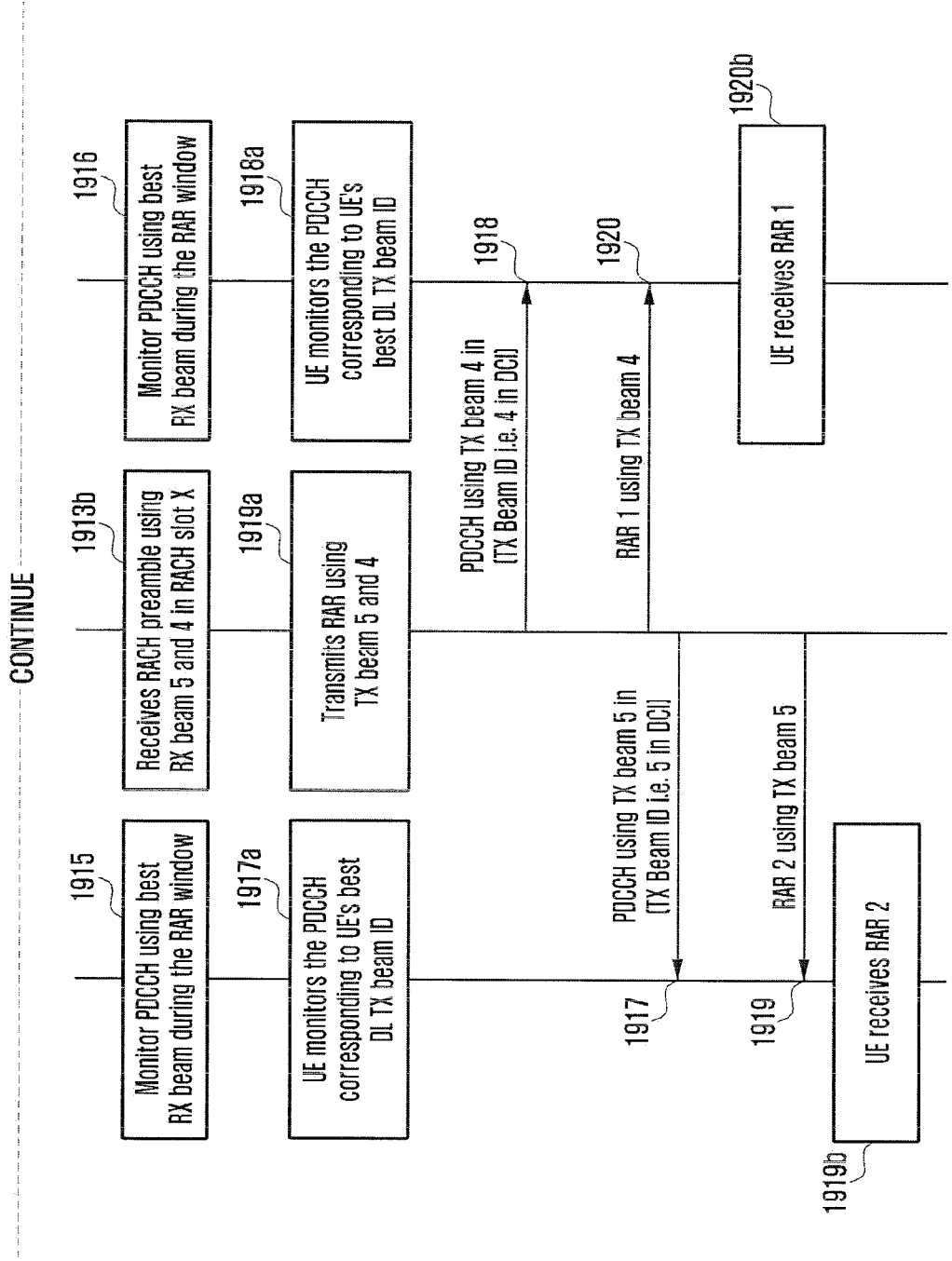

In an embodiment of the present disclosure, the issue of RAR identification can be resolved as illustrated in FIGS. 19A and 19B according to an embodiment of the present disclosure.

FIGS. 19A and 19B are signal flow diagrams illustrating a method for a beamformed random access procedure for identifying a correct RAR according to an embodiment of the present disclosure.

Referring to FIGS. 19A and 19B, at operations 1911 and 1912, the UE1 1901 and UE2 1903 transmit determines the best DL RX beam by measuring a BRS. At operations 1913 and 1914, the UE1 1901 and the UE2 1903 transmit the PRACH preamble in same RACH slot X. At operation 1913*a*, the UE1 1901 transmits the PRACH using UL TX beam corresponding to best DL RX beam. At operation 1914*a*, the UE2 1903 transmits the PRACH using UL TX beam corresponding to best DL RX beam. At operation 1913*b*, the BS 1902 receives PRACH from both UEs 1901, 1903 using different RX beam in RACH slot x.

After transmitting the PRACH in RACH slot X, UEs 1901, 1903 monitor for PDCCH for the RAR using each best DL RX beam during the RA response window which starts at fixed position relative to subframe in which PRACH is transmitted and has length configured by the BS 1902, at operations 1915 and 1916. In this embodiment of the present disclosure, at operations 1917 and 1918, the BS 1902 transmits PDCCH containing a downlink control information (DCI) including the DL TX beam ID, using TX beam 4 and TX beam 5 respectively at operation 1919*a*. The DL TX beam ID included in the DCI is the beam ID of the DL TX beam used to transmit the PDCCH containing this DCI. Alternately SS block ID may be included in DCI instead of DL TX beam ID wherein SS block ID is the ID of the SS block in which the BS transmits a synchronization or reference signal using the TX beam which is used for transmitting the PDCCH and the corresponding RAR.

In the RAR window, each UE 1901, 1903 monitors the PDCCH corresponding to the UE's best DL TX beam ID, at operations 1917*a* and 1918*a*.

At operations 1919 and 1920, the BS 1902 transmits RAR1 for UE2's RACH and RAR2 for UE1's RACH using TX beam 4 and TX beam 5 in the RAR window.

PDCCH indicates DL assignment for the RAR. Each UE processes the PDCCH corresponding to its RA-RNTI. Each UE 1901, 1903 decodes TB and receives the RAR based on the DL assignment of processed PDCCH at operations 1919*b* and 1920*b*.

Each UE 1901, 1903 processes the RAR and transmits MSG3 using the allocated grant if the DCI in associated PDCCH includes UE's best DL TX beam ID (or SS block ID) and the RAR includes the PRACH preamble ID transmitted by it. The BS 1902 includes the TX beam ID (or SS block ID) of the beam used to transmit PDCCH in the DCI of the PDCCH. SS block ID is the ID of the SS block in which the BS 1902 transmits synchronisation or reference signal using the TX beam which is used for transmitting the PDCCH and the corresponding RAR.

Embodiment 2

Figure 20A:
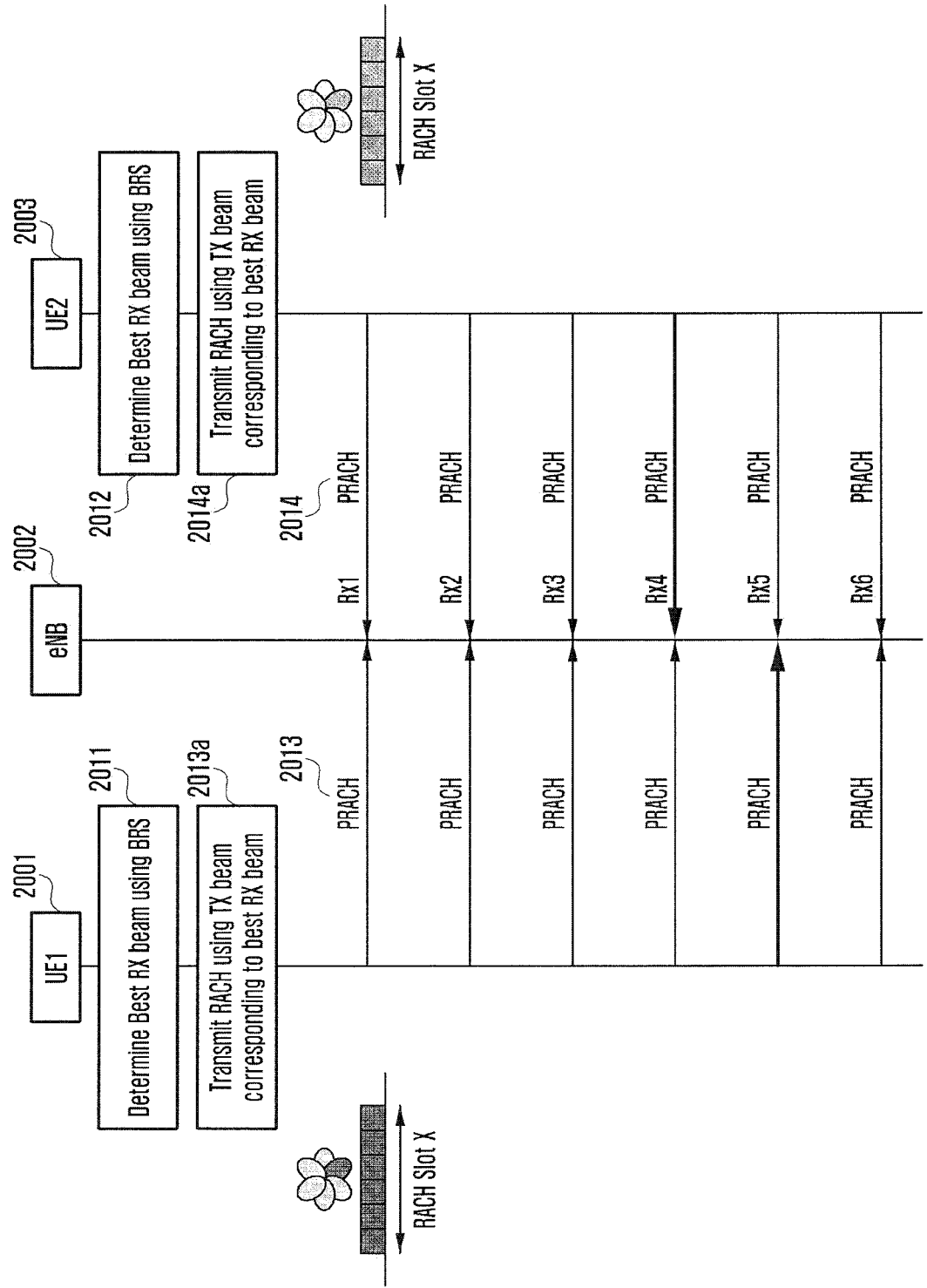
FIGS. 20A and 20B are signal flow diagrams illustrating a method for a beamformed random access procedure for identifying a correct RAR according to an embodiment of the present disclosure.
Figure 20B:
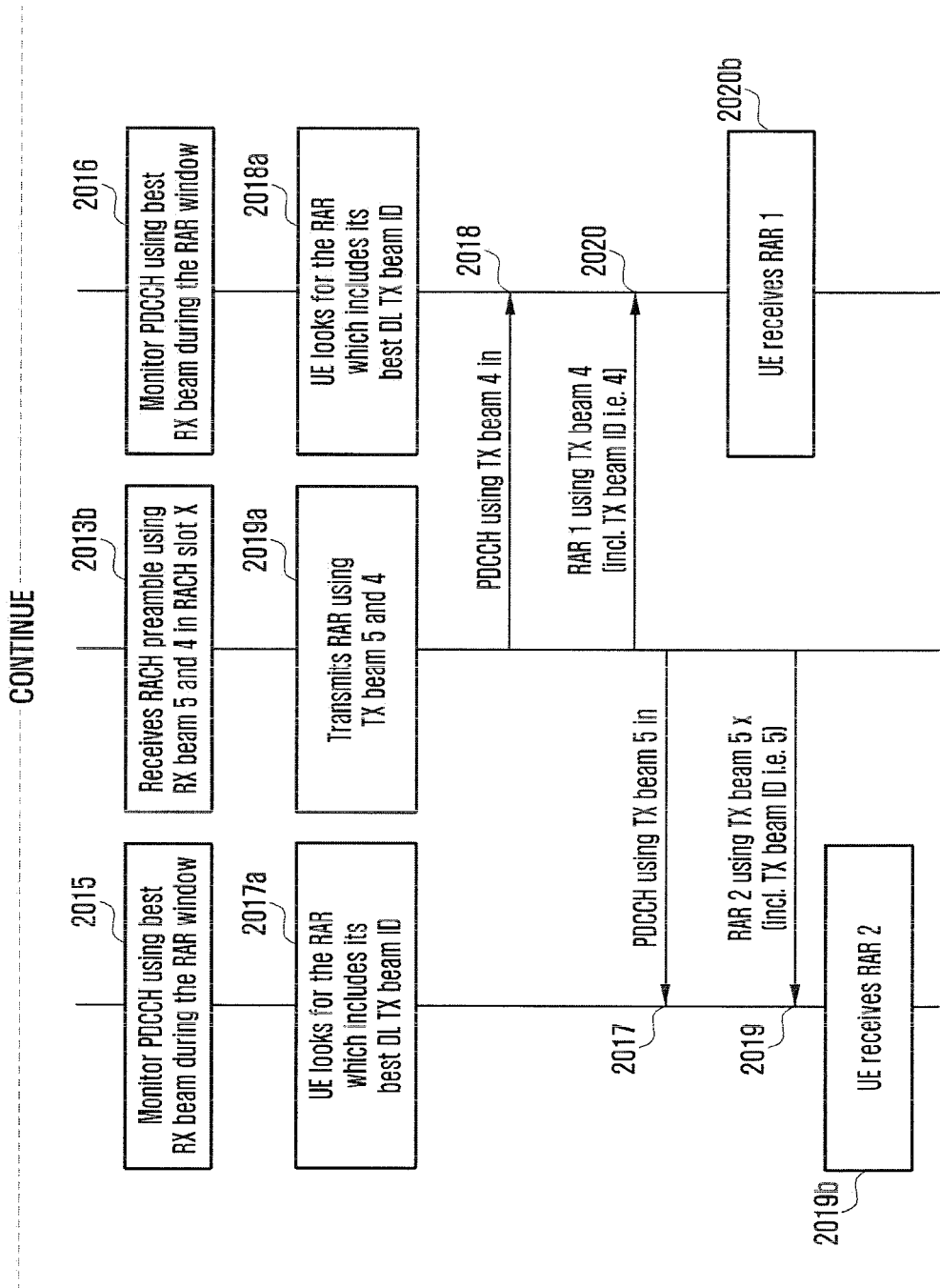

In another embodiment of the present disclosure, the issue of RAR identification can be resolved as illustrated in FIGS. 20A and 20B according to an embodiment of the present disclosure.

FIGS. 20A and 20B are signal flow diagrams illustrating a method for a beamformed random access procedure for identifying a correct RAR according to an embodiment of the present disclosure.

Referring to FIGS. 20A and 20B, at operations 2011 and 2012, the UE1 2001 and UE2 2003 transmit determines the best DL RX beam by measuring a BRS. At operations 2013 and 2014, the UE1 2001 and the UE2 2003 transmit the PRACH preamble in same RACH slot X. At operation 2013*a*, the UE1 2001 transmits the PRACH using UL TX beam corresponding to best DL RX beam. At operation 2014*a*, the UE2 2003 transmits the PRACH using UL TX beam corresponding to best DL RX beam. At operation 2013*b*, the BS 2002 receives PRACH from both UEs 2001, 2003 using different RX beam in RACH slot x.

After transmitting the PRACH in RACH slot X, UEs 2001, 2003 monitor for PDCCH for the RAR using each best DL RX beam during the RA response window which starts at fixed position relative to subframe in which PRACH is transmitted and has length configured by the BS 2002, at operations 2015 and 2016. At operation 2017 and 2018, the BS 2002 transmits PDCCH using TX beam 4 and TX beam 5 respectively at operation 2019*a*.

In this embodiment of the present disclosure, at operations 2019 and 2020, the BS 2002 transmits RAR1 including TX beam ID 4 for UE2 and RAR2 including TX beam ID 5 for UE1 using TX beam 4 and TX beam 5 in the RAR window. DL TX beam ID (or SS block ID) can be included in the RAR. If a RAR is transmitted using DL TX beam X, DL TX beam ID X is included in the RAR. BS 2002 includes in a RAR, DL TX beam ID of TX beam used to transmit this RAR. Alternately SS block ID may be included in the RAR instead of DL TX beam ID wherein SS block ID is the ID of the SS block in which the BS transmits a synchronization or reference signal using the TX beam which is used for transmitting the PDCCH and the corresponding RAR.

At operations 2017*a* and 2018*a*, UE1 2001 monitors the RAR including its best DL TX beam ID and UE2 2003 monitors the RAR including its best DL TX beam ID in the RAR window. PDCCH indicates DL assignment for the RAR. Each UE 2001, 2003 decodes TB and receives the RAR based on the DL assignment and the best TX beam at operations 2019*b* and 2020*b*. Each UE 2001, 2003 processes the RAR if the RAR includes UE's best DL TX beam ID (or SS block ID) and the RAR includes the PRACH preamble ID transmitted by it. The BS 2002 includes the TX beam ID (or SS block ID) of the beam used to transmit PDCCH in the DCI of the PDCCH. SS block ID is the ID of the SS block in which the BS 2002 transmits synchronisation or reference signal using the TX beam which is used for transmitting the PDCCH and the corresponding RAR.

RAR Identification Method 4:

PDCCH indicates DL assignment for the RAR. The UE decodes TB and receives the RAR based on this DL assignment. After receiving the RAR, if the RAR includes the PRACH preamble ID, then the UE considers this Random Access Response reception successful. In an embodiment of the present disclosure, even after receiving the RAR successfully, the UE may continue to monitor for additional RAR corresponding to its PRACH transmission in the RAR window(s). Network may configure whether the UE should monitor for additional RAR(s) in the RAR window(s) or whether it should stop monitoring RAR window(s) after receiving a RAR successfully in broadcast or dedicated signaling. Network may also configure the events or scenarios (e.g., handover, SR, TA, and the like) in which the UE should or should not monitor for multiple RARs in the RAR window(s). In case of latency sensitive event, the UE may not be configured to monitor multiple RARs. There can be one or separate RAR window for each PRACH transmission.

If the UE has received multiple RAR corresponding to its PRACH transmission(s), then the UE selects one RAR and uses it for MSG3 transmission. In an embodiment of the present disclosure, the UE randomly selects one RAR from received RARs. In another embodiment of the present disclosure, the UE selects the RAR which includes the total radiated power (TRP) ID of the TRP whose DL synchronization signals or reference signals are received (or best received) by the UE or TRP ID of the TRP selected by the UE. In another embodiment of the present disclosure, the UE may select the RAR which is received with best signal quality amongst the all received RARs. In another embodiment of the present disclosure, the eNB may indicate the rank in the RAR. If the eNB receives the same PRACH preamble using different RX beams then it transmits the RAR for each of them and ranks those according to the signal strength of received PRACH transmission from each RX beam. If the UE receives multiple RAR corresponding to its PRACH transmissions then it selects the RAR with highest rank. In another embodiment of the present disclosure, the eNB may indicate the signal strength of received PRACH transmission in the RAR. If the eNB receives the same PRACH preamble using different RX beams then it transmits the RAR for each of them and indicates the signal strength of received PRACH transmission from each RX beam. If the UE receives multiple RAR corresponding to its PRACH transmissions then it selects the RAR with highest signal strength.

In an embodiment of the present disclosure, network may also indicate one above the methods (random, first, the RAR with strongest received power, the RAR indicating the strongest signal quality of preamble received at the BS, and the like) the UE uses for selecting the RAR.

The UE processes the TA received in the RAR and transmits MSG3 using the received grant in the selected RAR.

In a plurality of the embodiment of the present disclosure, a Power Ramping during Random Access in Beamformed System is provided.

The UE retransmits the PRACH if it fails to receive the RAR after transmitting the PRACH. In traditional system power is ramped up for every PRACH retransmission. In case of beamformed system, power should not be ramped up for every retransmission.

The UE may be transmitting same beam for RX sweeping at the BS

PRACH transmission may fail because of incorrect beam

PRACH transmission may fail because of TX power being not enough

During the random access procedure, when the UE should ramp up power should be defined.

Method 1

Figure 21:
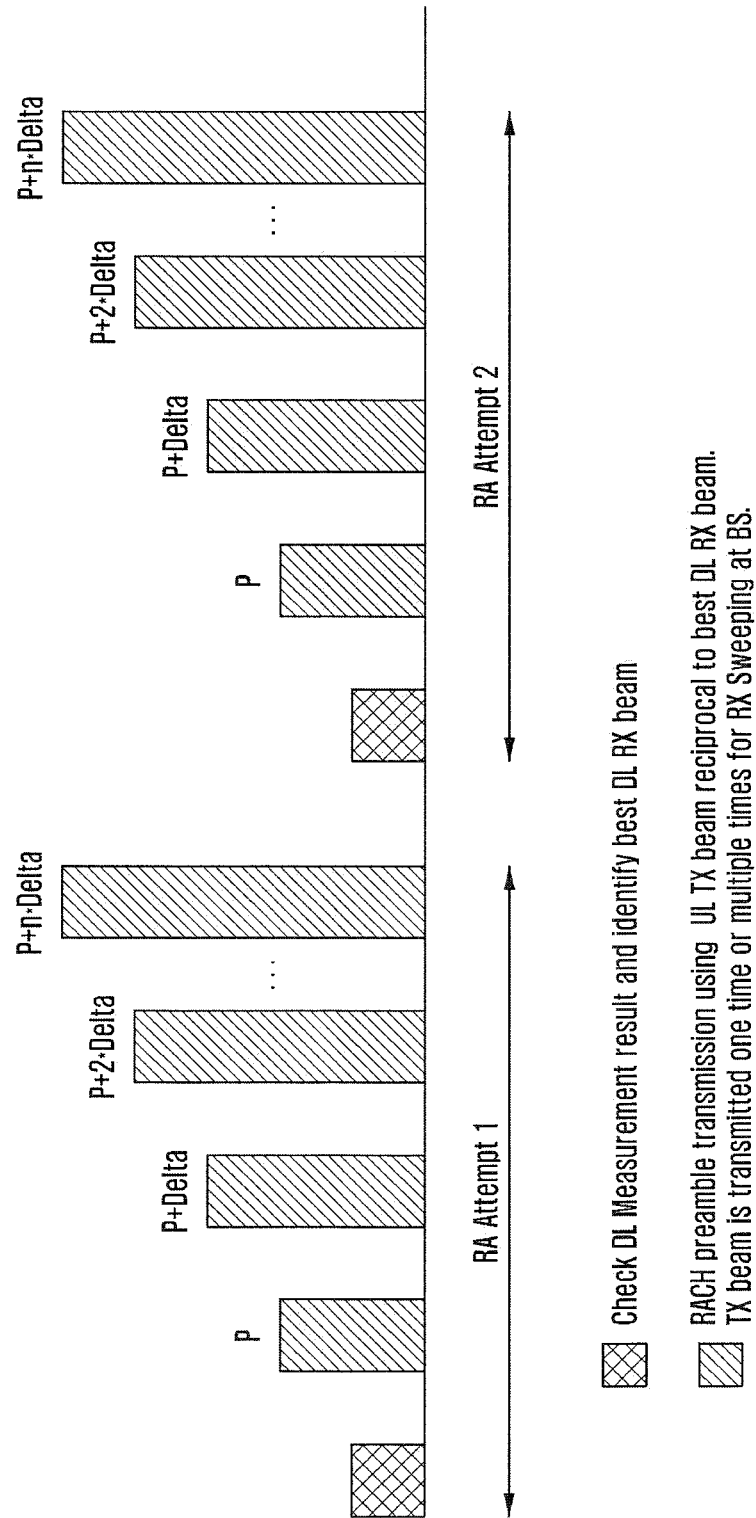
FIG. 21 is a schematic diagram illustrating a method for power ramping during a random access procedure in beamformed system according to an embodiment of the present disclosure.
Figure 22:
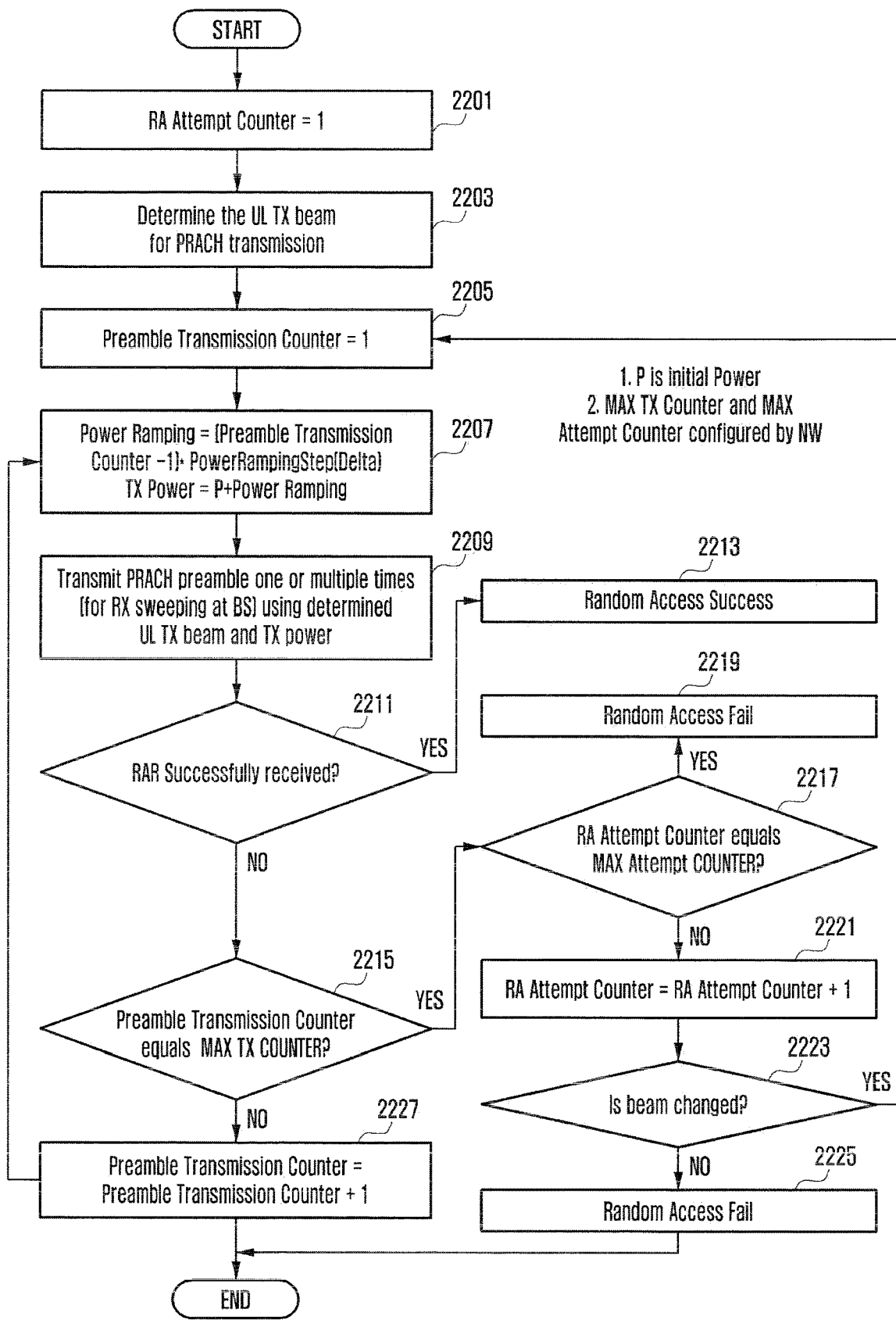
FIG. 22 is a flowchart illustrating a method for power ramping during a random access procedure in beamformed system according to an embodiment of the present disclosure.

This method of the disclosure is illustrated in FIGS. 21 and 22 according to an embodiment of the present disclosure.

FIG. 21 is a schematic diagram illustrating a method for power ramping during a random access procedure in beamformed system according to an embodiment of the present disclosure.

Referring to FIG. 21, a random access procedure comprises of one or more RA Attempts. Maximum number of RA attempts is configurable by network (example by RRC signaling or in system information, and the like). In each RA attempt, the UE transmits PRACH preamble using same TX beam but it ramps up power for same TX beam multiple times. It is to be noted that power is not ramped up for each PRACH preamble transmission in an RA attempt. During the PRACH preamble transmissions in RA attempt, if the UE repeats PRACH preamble transmission for RX beam sweeping at the BS, then the UE does not ramp up the power for these transmissions. If the PRACH preamble transmission is not repeated for RX sweeping then within a RA attempt, power is ramped up for each new PRACH preamble transmission.

RA attempt is shown in FIG. 21. The UE first determines the UL TX beam for PRACH preamble transmission. In an embodiment of the present disclosure, the UE measures the beamformed beam measurement signal (or SS or CSI-RS) transmitted by BS and determines the best DL RX beam i.e., UE's RX beam with which it is able to receive the DL signal with best quality. The UE determines the UL TX beam reciprocal (i.e., same or in same direction) to the determined best DL RX beam for PRACH preamble transmission. The UE transmits PRACH preamble using the determined UL TX beam one or more times using the power 'P' wherein the UE may transmit PRACH preamble multiple times for RX beam sweeping at the BS. The number of times the UE repeats PRACH preamble transmission for RX sweeping can be configured by network (example by RRC signaling or in system information, and the like).

If the RAR is not received, the UE ramps up the power by Delta where Delta is configured by network and transmits, using the same UL TX beam, one or more times using the power 'P+Delta' wherein the UE may transmit PRACH preamble multiple times for RX beam sweeping at the BS. If the RAR is not received, the UE ramps up the power again by Delta where Delta is configured by network and transmits using the same UL TX beam one or more times using the power 'P+2*Delta' wherein the UE may transmit PRACH preamble multiple times for RX beam sweeping at the BS. The UE ramps up the power and retransmits PRACH preamble using the same UL TX beam 'N' times if the RAR is not received. 'N' times are configurable by network.

FIG. 22 is a flowchart illustrating a method for power ramping during a random access procedure in beamformed system according to an embodiment of the present disclosure.

Referring to FIG. 22, at operation 2201, the UE sets RA Attempt Counter to 1. At operation 2203, the UE determines the UL TX beam for PRACH preamble transmission. At operation 2205, the UE sets PRACH Preamble Transmission Counter to 1.

At operation 2207, the UE calculates TX power according to TX power=P+Power Ramping, based on:

P is an initial power

Power Ramping=(PRACH Preamble Transmission Counter−1)*PowerRampingStep (i.e., Delta)

At operation 2209, the UE transmit PRACH preamble one or multiple times (for RX sweeping at the BS) using the determined UL TX beam and the calculated TX power.

At operation 2211, the UE determines that the RAR is successfully received. If received, at operation 2213, it is determined as a random access success. If not received, at operation 2215, the UE determines whether the PRACH Preamble Transmission Counter is equal to MAX TX COUNTER. If the PRACH Preamble Transmission Counter is equal to MAX TX COUNTER, the UE then determines whether the RA Attempt Counter is equal to MAX Attempt COUNTER at operation 2217. If the RA Attempt Counter is equal to MAX Attempt COUNTER, it is determined as a random access failure at operation 2219. If the RA Attempt Counter is not equal to MAX Attempt COUNTER, the UE sets the RA Attempt Counter=RA Attempt Counter+1, at operation 2221. At operation 2223, the UE determine that the UL TX beam for PRACH transmission is changed. If changed, go back for the operation 2205. If not changed, it is determined as a random access failure at operation 2225. In an alternate embodiment of the present disclosure, after operation 2221 UEs go back for the operation 2203.

If the Preamble Transmission Counter is not equal to MAX TX COUNTER, the UE sets the Preamble Transmission Counter=Preamble Transmission Counter+1 at operation 2227, and then go back for the operation 2207.

The MAX TX Counter and the MAX Attempt Counter can be predefined or configured by network (example by RRC signaling or in system information, and the like).

Method 2

Figure 24:
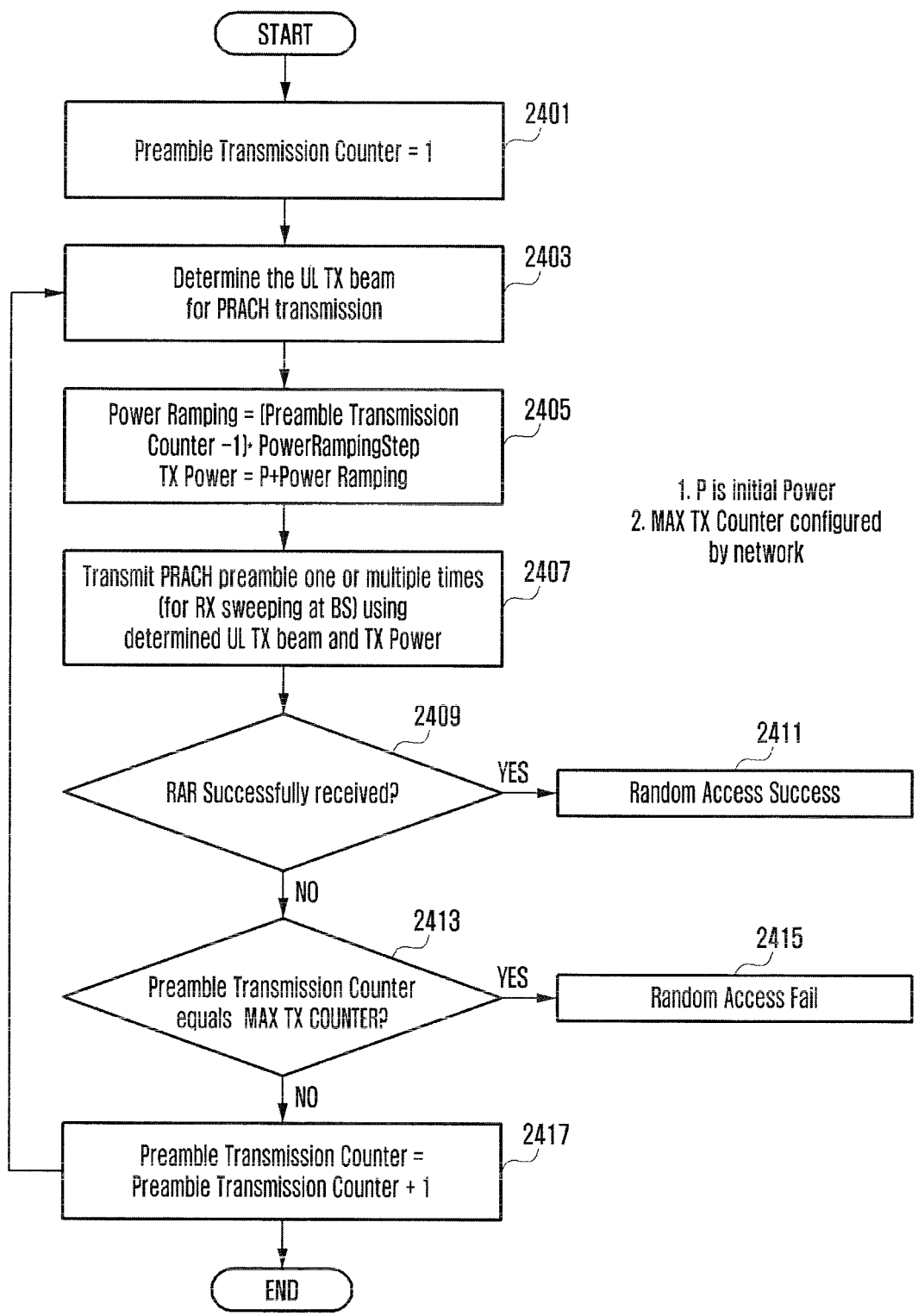
FIG. 24 is a flowchart illustrating a method for power ramping during a random access procedure in beamformed system according to an embodiment of the present disclosure.
Figure 25:
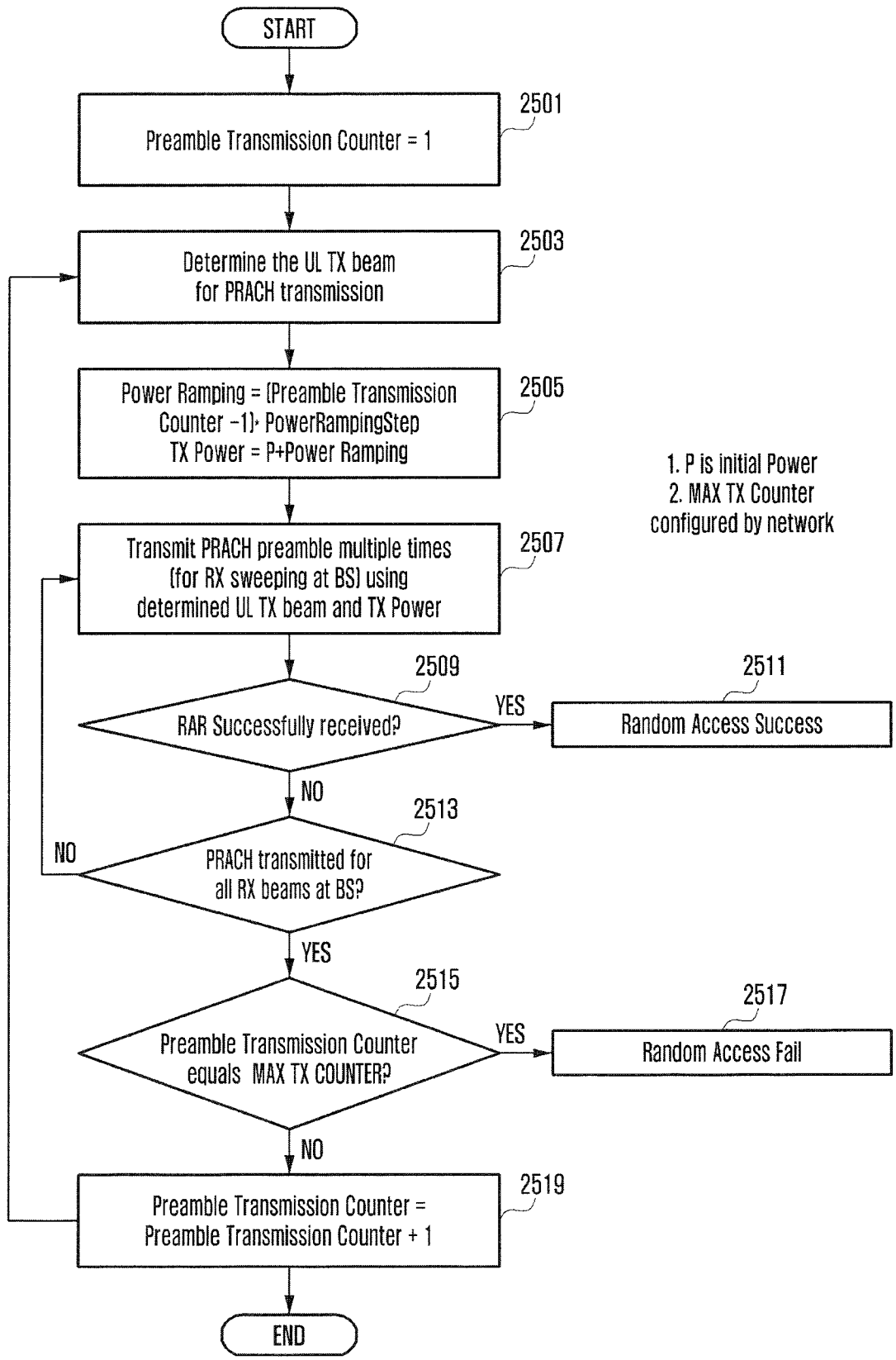
FIG. 25 is a flowchart illustrating a method for power ramping during a random access procedure in beamformed system according to an embodiment of the present disclosure.

This method of the disclosure is illustrated in FIGS. 23, 24 and 25 according to an embodiment of the present disclosure.

FIG. 23 is a schematic diagram illustrating a method for power ramping during a random access procedure in beamformed system according to an embodiment of the present disclosure.

Referring to FIG. 23, the UE Ramp up the power for PRACH preamble retransmission irrespective of whether beam is changed. It is to be noted that during the PRACH preamble transmissions, if the UE repeats PRACH preamble transmission for RX beam sweeping at the BS, then the UE does not ramp up the power for these transmissions.

The UE determines the UL TX beam for PRACH preamble transmission. In an embodiment of the present disclosure, the UE measures the beamformed beam measurement signal (or SS or CSI-RS) transmitted by BS and determines the best DL RX beam i.e., the UE's RX beam with which it is able to receive the DL signal with best quality. The UE determines the UL TX beam reciprocal (i.e., same or in same direction) to determined best DL RX beam. The UE transmits PRACH preamble using determined UL TX beam one or multiple times using the power 'P'. After transmitting PRACH preamble one or multiple times for RX sweeping and if the RAR is not yet received, the UE determines the UL TX beam for PRACH transmission again and retransmit PRACH preamble one or multiple times for RX sweeping using the power 'P+Delta'. After transmitting PRACH preamble one or multiple times for RX sweeping using the power 'P+Delta' and if the RAR is not yet received, the UE determines the UL TX beam for PRACH transmission again and retransmit PRACH preamble one or multiple times for RX sweeping using the power 'P+2Delta'.

This process is repeated until the RAR is received or process is already repeated for N times. 'N' times are configurable by network.

According to various examples, the UE can wait for the RAR after transmitting beam multiple times for RX beam sweeping partially. For example there are 10 RX beams at the BS, the UE transmits PRACH preamble using a TX beam 5 times and then waits for the RAR. If the RAR is not received, the UE transmits PRACH preamble using TX beam for 5 more times.

FIG. 24 is a flowchart illustrating a method for power ramping during a random access procedure in beamformed system according to an embodiment of the present disclosure.

Referring to FIG. 24, at operation 2401, the UE sets PRACH Preamble Transmission Counter to 1. At operation 2403, the UE determines the UL TX beam for PRACH preamble transmission.

At operation 2405, the UE calculates TX power according to TX power=P+Power Ramping, based on:

P is an initial power (Note that P can be calculated every time the UE processes operation 2405. In alternate embodiment of the present disclosure, it may be calculated only once i.e., when PRACH Preamble Transmission Counter equals one)

Power Ramping=(PRACH Preamble Transmission Counter−1)*PowerRampingStep (i.e., Delta)

At operation 2407, the UE transmits PRACH preamble one or multiple times (for RX sweeping at the BS) using the determined UL TX beam and the calculated TX power.

At operation 2409, the UE determines that the RAR is successfully received. If received, at operation 2411, it is determined as a random access success. If not received, at operation 2413, the UE determines whether the PRACH Preamble Transmission Counter is equal to MAX TX COUNTER. If the PRACH Preamble Transmission Counter is equal to MAX TX COUNTER, it is determined as a random access failure at operation 2415. If the PRACH Preamble Transmission Counter is not equal to MAX TX COUNTER, the UE sets the PRACH Preamble Transmission Counter=PRACH Preamble Transmission Counter+1 at operation 2417, and then go back for the operation 2403.

The MAX TX Counter can be predefined or can be configured by network (example by RRC signaling or in system information, and the like).

FIG. 25 is a flowchart illustrating a method for power ramping during a random access procedure in beamformed system according to an embodiment of the present disclosure.

Referring to FIG. 25, at operation 2501, the UE sets PRACH Preamble Transmission Counter to 1. At operation 2503, the UE determines the UL TX beam for PRACH preamble transmission.

At operation 2505, the UE calculates TX power according to TX power=P+Power Ramping, based on:

P is an initial power (Note that P can be calculated every time the UE processes operation 2405. In alternate embodiment of the present disclosure, it may be calculated only once i.e., when PRACH Preamble Transmission Counter equals one)

Power Ramping=(PRACH Preamble Transmission Counter−1)*PowerRampingStep (i.e., Delta)

At operation 2507, the UE transmit PRACH preamble multiple times (for RX sweeping at the BS) using the determined UL TX beam and the calculated TX power.

At operation 2509, the UE determines that RAR is successfully received. If received, at operation 2511, it is determined as a random access success. If not received, at operation 2513, the UE determines whether PRACH is transmitted for all RX beams at the BS using the calculated TX power. If the PRACH is not transmitted for all RX beams at the BS, go back for the operation 2507. If so, the UE determines whether the PRACH Preamble Transmission Counter is equal to MAX TX COUNTER at operation 2515. If the PRACH Preamble Transmission Counter is equal to MAX TX COUNTER, it is determined as a random access failure at operation 2517. If the PRACH Preamble Transmission Counter is not equal to MAX TX COUNTER, the UE sets the Preamble Transmission Counter=Preamble Transmission Counter+1 at operation 2519, and then go back for the operation 2503.

The MAX TX Counter can be predefined or can be configured by network (example by RRC signaling or in system information, and the like).

Method 3

This method of the disclosure is illustrated in FIGS. 26, 27, 28A, and 28B according to an embodiment of the present disclosure.

Figure 26:
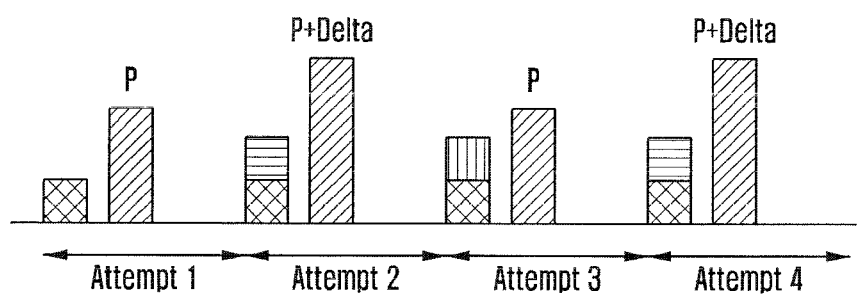
FIG. 26 is a schematic diagram illustrating a method for power ramping during a random access procedure in beamformed system according to an embodiment of the present disclosure.

FIG. 26 is a schematic diagram illustrating a method for power ramping during a random access procedure in beamformed system according to an embodiment of the present disclosure.

Referring to FIG. 26, the UE ramp up the power for PRACH preamble retransmission if TX beam is same as previous PRACH preamble transmission. The UE start from initial power for PRACH preamble retransmission, if TX beam is not same as previous PRACH preamble transmission. It is to be noted that during the PRACH preamble transmissions, if the UE repeats PRACH preamble transmission for RX beam sweeping at the BS, then the UE does not ramp up the power for these transmissions.

RA attempt is shown in FIG. 26. The UE first determines the UL TX beam for PRACH preamble transmission. In an embodiment of the present disclosure, the UE measures the beamformed beam measurement signal (or SS or CSI-RS) transmitted by the BS and determines the best DL RX beam i.e., the UE's RX beam with which it is able to receive the DL signal with best quality. The UE uses the UL TX beam reciprocal (i.e., same or in same direction) to determined best DL RX beam. The UE transmits PRACH preamble using UL TX beam one or more times using the power 'P' wherein the UE may transmit multiple times for RX beam sweeping at the BS.

If the RAR is not received after transmitting PRACH preamble using power 'P', the UE determines the UL TX beam for PRACH transmission again. If the UL TX beam is not changed, the UE ramps up the power by Delta where Delta is configured by the network and transmits using the same UL TX beam one or more times using the power 'P+Delta' wherein these multiple transmissions are for RX beam sweeping at the BS. If the UL TX beam is changed, the UE resets the power to an initial power and transmits using the changed UL TX beam one or more times using the initial power wherein these multiple transmissions are for RX beam sweeping at the BS.

According to various examples, the UE can wait for the RAR after transmitting beam multiple times for RX beam sweeping partially. For example there are 10 RX beams at the BS, the UE transmits PRACH using TX beam 5 times and then wait for the RAR. If the RAR is not received, the UE transmits beam for 5 more times.

Figure 27:
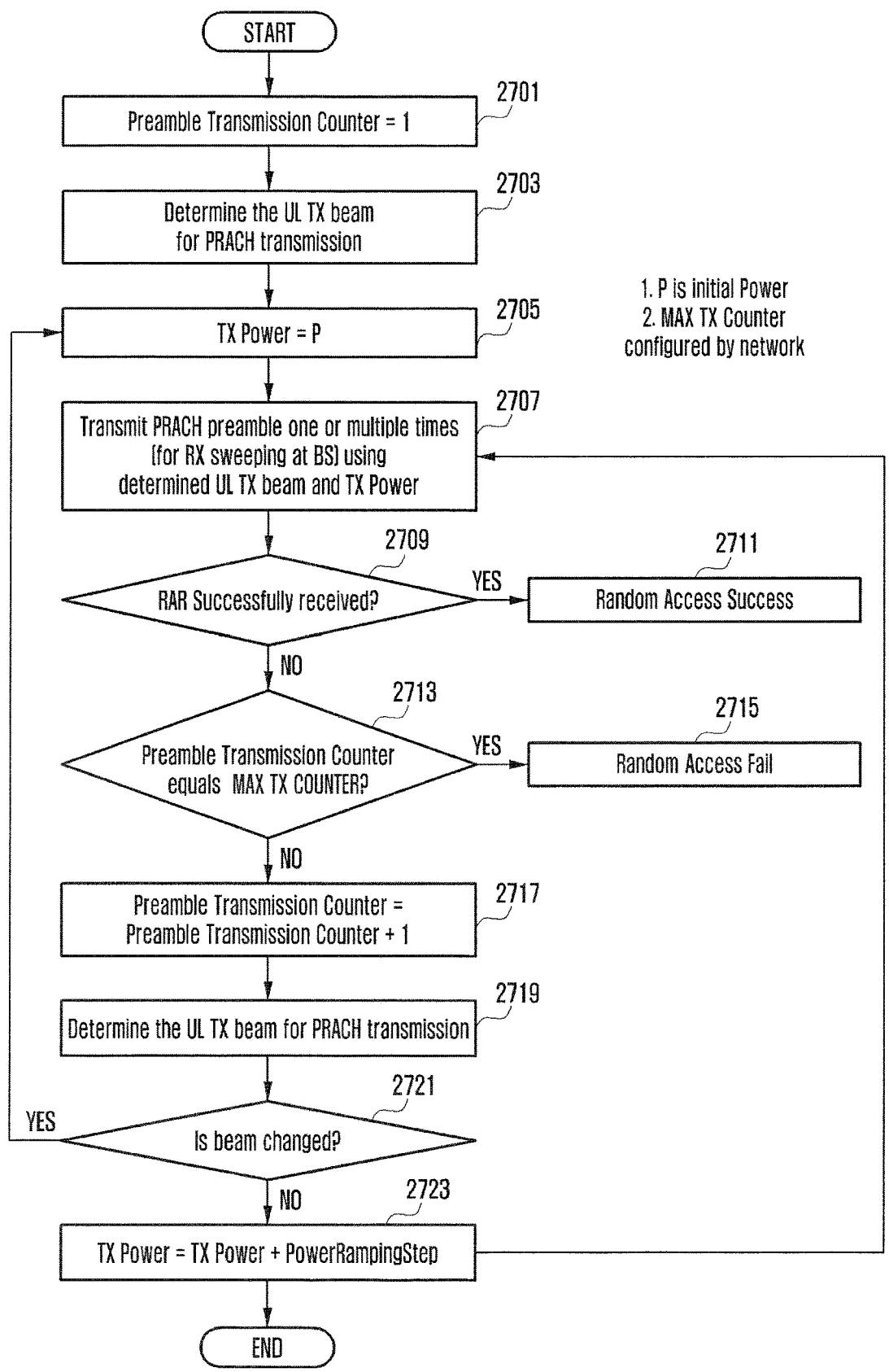
FIG. 27 is a flowchart illustrating a method for power ramping during a random access procedure in beamformed system according to an embodiment of the present disclosure.

FIG. 27 is a flowchart illustrating a method for power ramping during a random access procedure in beamformed system according to an embodiment of the present disclosure.

Referring to FIG. 27, at operation 2701, the UE sets PRACH Preamble Transmission Counter to 1. At operation 2703, the UE determines the UL TX beam for PRACH preamble transmission.

At operation 2705, the UE sets TX power=P. P is an initial power which can be calculated based on DL received power as in prior art.

At operation 2707, the UE transmit PRACH preamble one or multiple times (for RX sweeping at the BS) using the determined UL TX beam and the TX power.

At operation 2709, the UE determines that RAR is successfully received. If received, at operation 2711, it is determined as a random access success. If not received, at operation 2713, the UE determines whether the PRACH Preamble Transmission Counter is equal to MAX TX COUNTER. If the Preamble Transmission Counter is equal to MAX TX COUNTER, it is determined as a random access failure at operation 2715. If the PRACH Preamble Transmission Counter is not equal to MAX TX COUNTER, the UE sets the PRACH Preamble Transmission Counter=Preamble Transmission Counter+1 at operation 2717.

At operation 2719, the UE determines the UL TX beam for PRACH transmission again. At operation 2721, the UE determines the UL TX beam is changed. If changed, go back to the operation 2705. If not changed, the UE sets the TX Power=TX Power+PowerRampingStep at operation 2723, and then go back for the operation 2707.

The MAX TX Counter can be pre-defined or can be configured by network (example by RRC signaling or in system information, and the like).

Figure 28A:
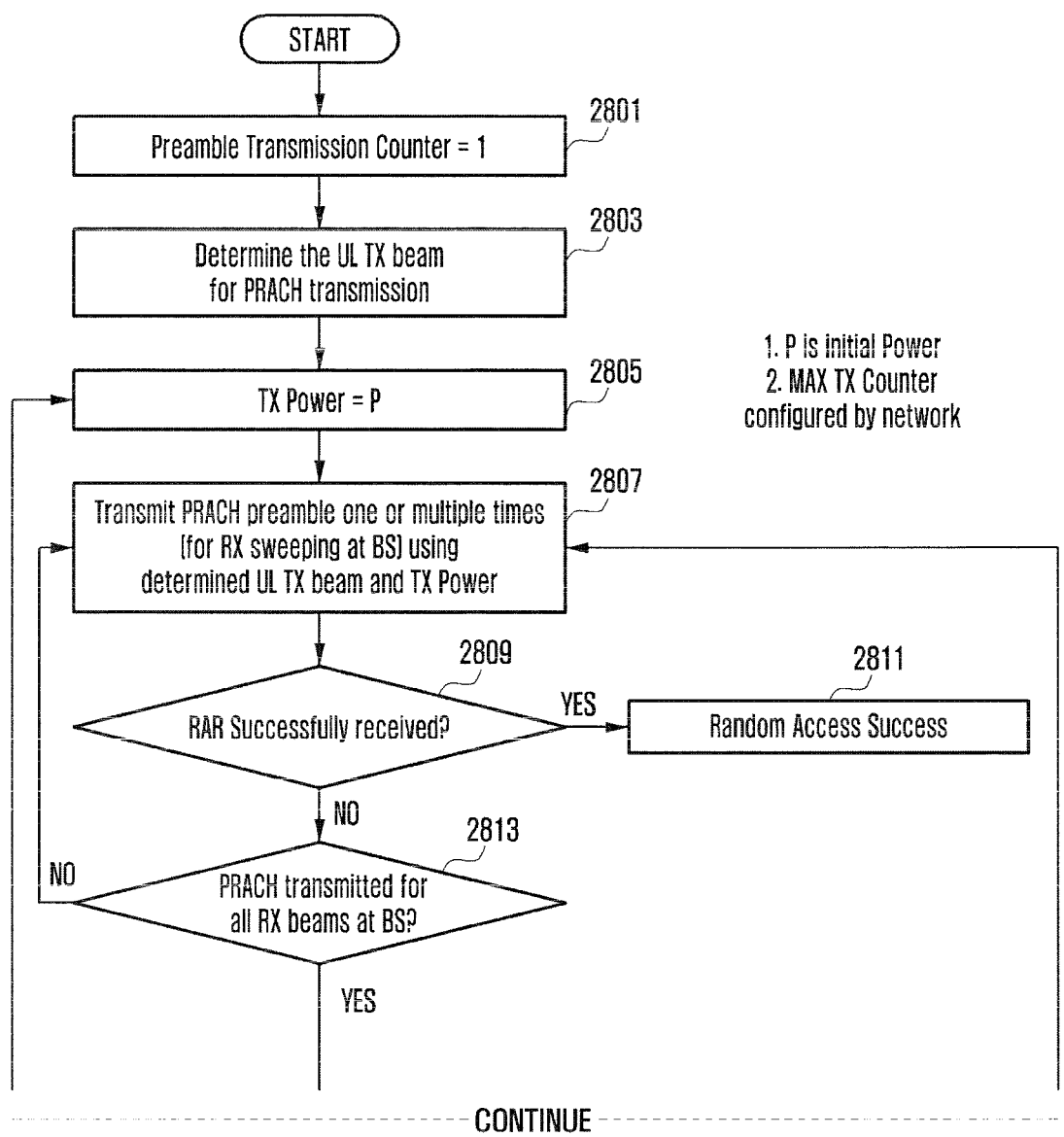
FIGS. 28A and 28B are flowcharts illustrating a method for power ramping during a random access procedure in beamformed system according to an embodiment of the present disclosure.
Figure 28B:
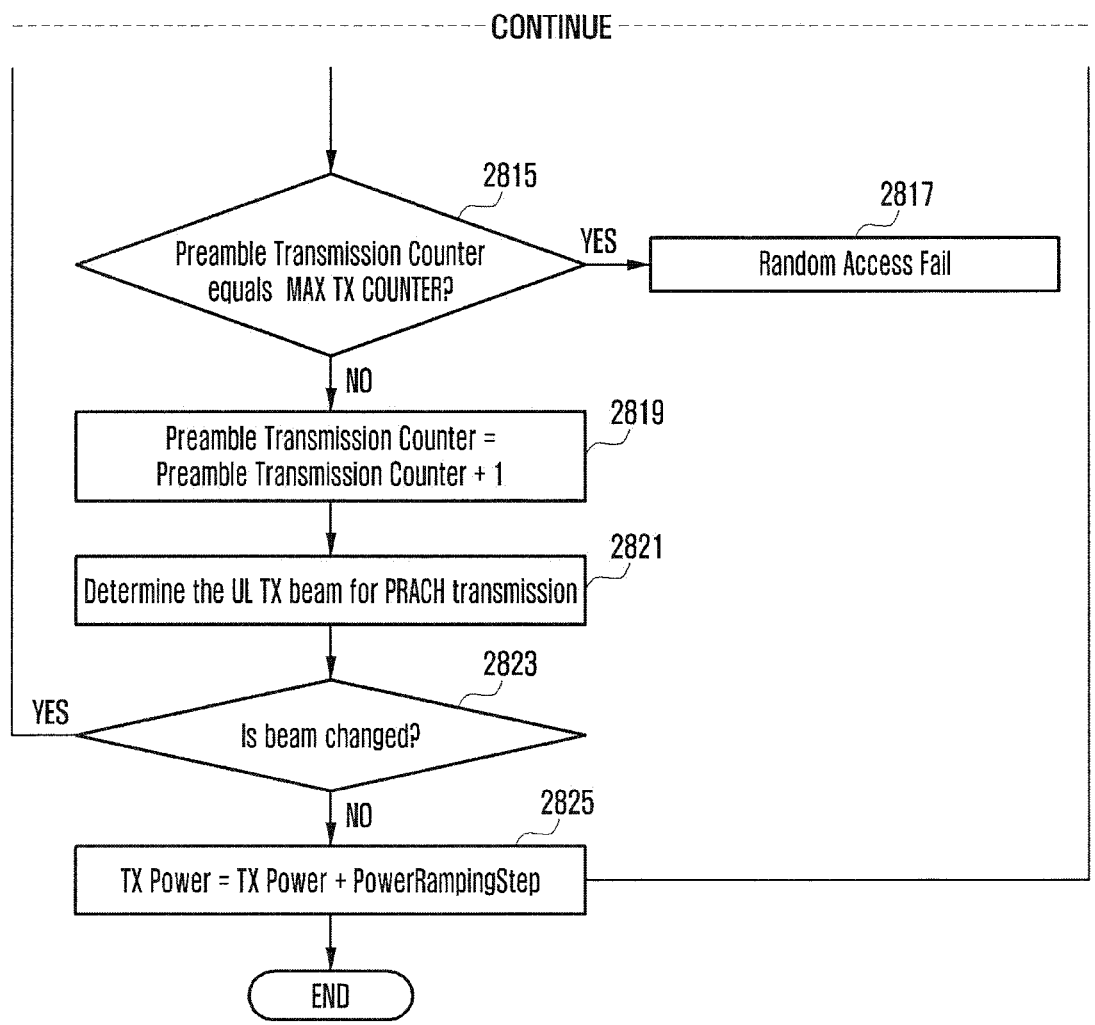

FIGS. 28A and 28B are flowcharts illustrating a method for power ramping during a random access procedure in beamformed system according to an embodiment of the present disclosure.

Referring to FIGS. 28A and 28B, at operation 2801, the UE sets PRACH Preamble Transmission Counter to 1. At operation 2803, the UE determines the UL TX beam for PRACH preamble transmission.

At operation 2805, the UE sets TX power=P. P is an initial power which can be calculated based on DL received power as in prior art.

At operation 2807, the UE transmit PRACH preamble one or multiple times (for RX sweeping at the BS) using the determined UL TX beam and the TX power.

At operation 2809, the UE determines that the RAR is successfully received. If received, at operation 2811, it is determined as a random access success. If not received, at operation 2813, the UE determines whether PRACH is transmitted for all RX beams at the BS. If the PRACH preamble is not transmitted for all RX beams at the BS, go back for the operation 2805. If so, the UE determines whether the PRACH Preamble Transmission Counter is equal to MAX TX COUNTER at operation 2815. If the PRACH Preamble Transmission Counter is equal to MAX TX COUNTER, it is determined as a random access failure at operation 2817. If the PRACH Preamble Transmission Counter is not equal to MAX TX COUNTER, the UE sets the PRACH Preamble Transmission Counter=PRACH seem Preamble Transmission Counter+1 at operation 2819.

At operation 2821, the UE determines the UL TX beam for PRACH transmission again. At operation 2823, the UE determines the UL TX beam is changed. If changed, go back to the operation 2805. If not changed, the UE sets the TX Power=TX Power+PowerRampingStep at operation 2825, and then go back for the operation 2807.

The MAX TX Counter can be predefined or can be configured by network (example by RRC signaling or in system information, and the like).

Method 4

This method of the disclosure is illustrated in FIGS. 29, 30A and 30B, and 31A and 31B according to an embodiment of the present disclosure.

FIG. 29 is a schematic diagram illustrating a method for power ramping during a random access procedure in beamformed system according to an embodiment of the present disclosure.

Referring to FIG. 29, the UE Ramp up the power for PRACH preamble retransmission if TX beam is same as previous PRACH preamble transmission. The UE uses the Power for PRACH preamble retransmission same as power of previous PRACH preamble transmission if TX beam is not same as previous PRACH preamble transmission. It is to be noted that during the PRACH preamble transmissions, if the UE repeats PRACH preamble transmission for RX beam sweeping at the BS, then the UE does not ramp up the power for these transmissions.

RA attempt is shown in FIG. 29. The UE first determines the UL TX beam for PRACH preamble transmission. In an embodiment of the present disclosure, the UE measures the beamformed beam measurement signal (or SS or CSI-RS) transmitted by the BS and determines the best DL RX beam i.e., the UE's RX beam with which it is able to receive the DL signal with best quality. The UE uses the UL TX beam reciprocal (i.e., same or in same direction) to determined best DL RX beam. The UE transmits PRACH using UL TX beam one or more times using the power 'P' wherein the UE may transmit multiple times for RX beam sweeping at the BS.

If the RAR is not received, the UE determines the UL TX beam for PRACH preamble transmission again. If the UL TX beam is not changed, the UE ramps up the power by Delta where Delta is configured by network and transmits using the same UL TX beam one or more times using the power 'P+Delta'. If the UL TX beam is changed, the UE sets the power to previous power and transmits using the changed UL TX beam one or more times using the previous power.

According to various examples, the UE can wait for the RAR after transmitting beam multiple times for RX beam sweeping partially. For example there are 10 RX beams at the BS, the UE transmits PRACH using TX beam 5 times and then wait for the RAR. If the RAR is not received, the UE transmits beam for 5 more times.

Figure 30A:
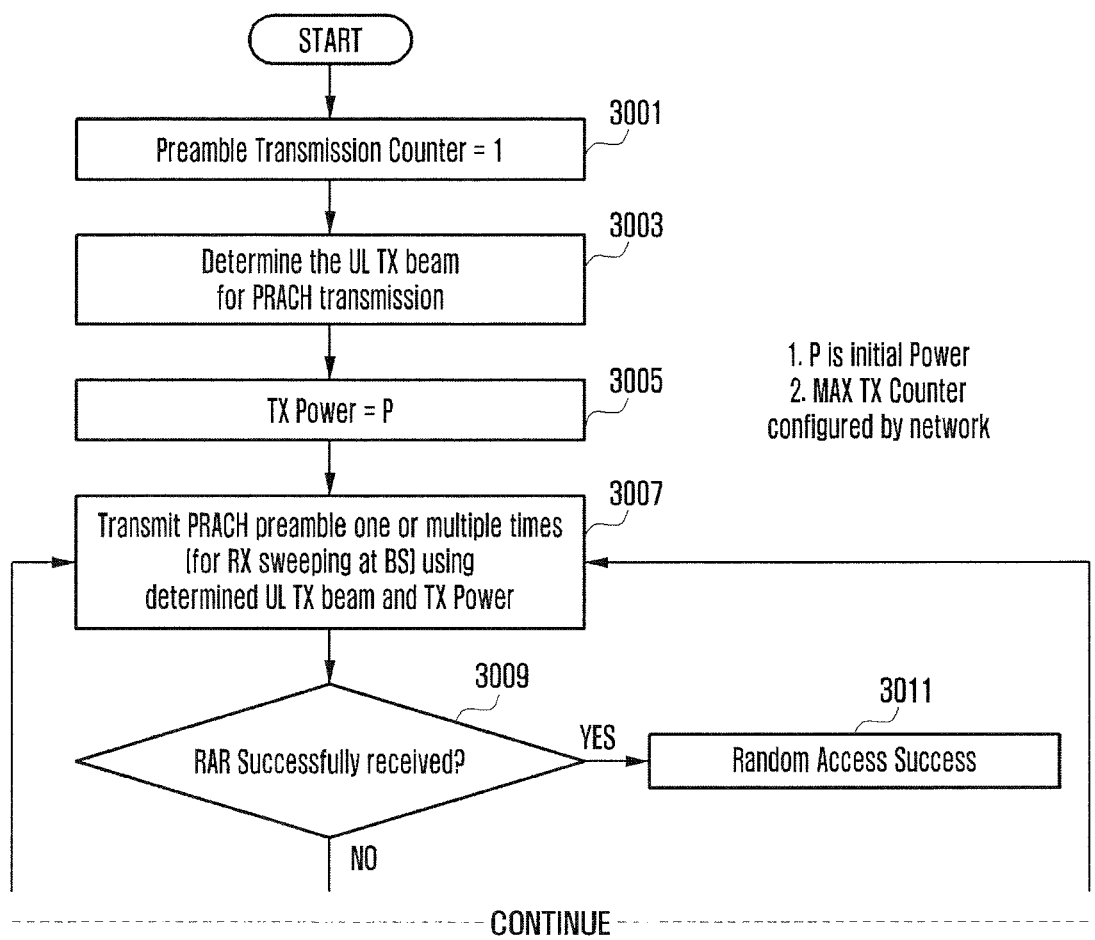
FIGS. 30A and 30B are flowcharts illustrating a method for power ramping during a random access procedure in beamformed system according to an embodiment of the present disclosure.
Figure 30B:
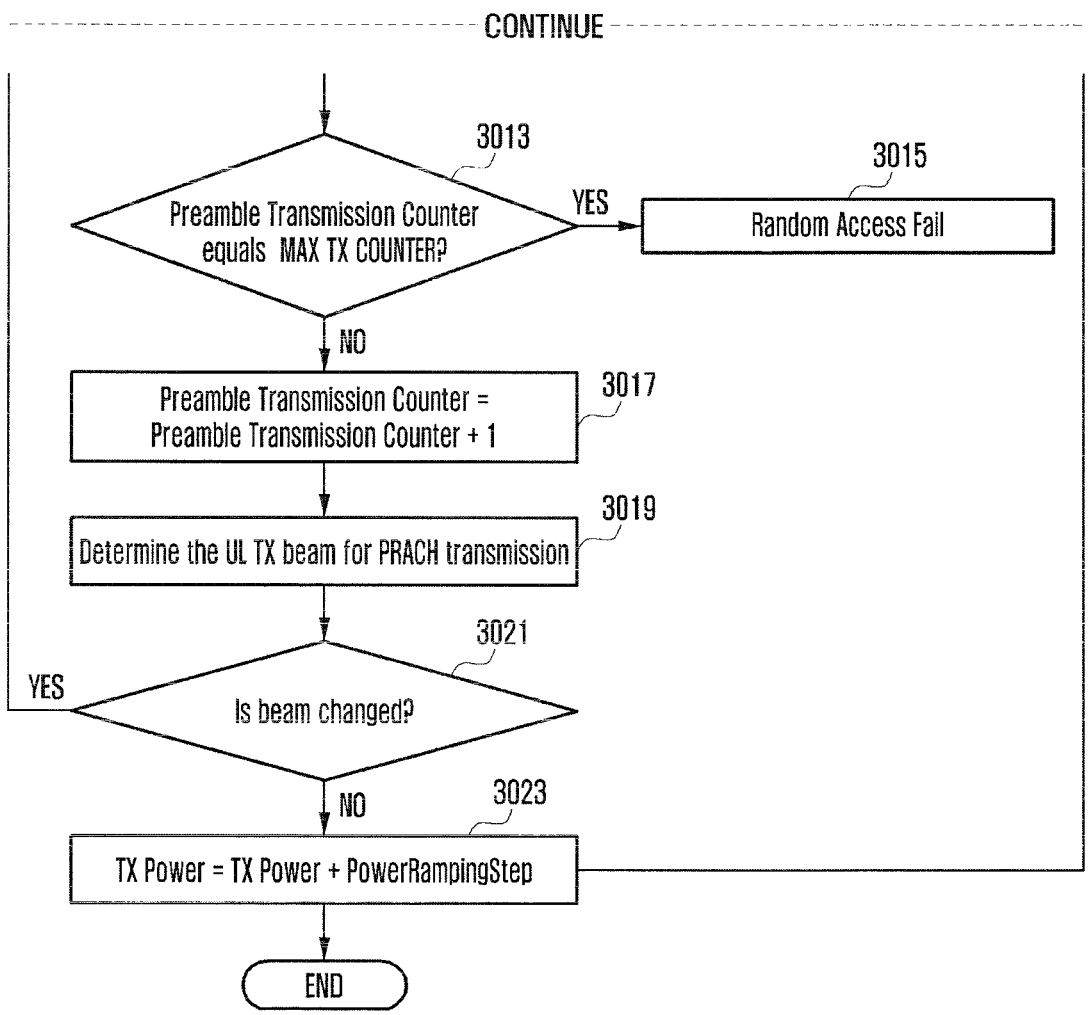

FIGS. 30A and 30B are flowcharts illustrating a method for power ramping during a random access procedure in beamformed system according to an embodiment of the present disclosure.

Referring to FIGS. 30A and 30B, at operation 3001, the UE sets PRACH Preamble Transmission Counter to 1. At operation 3003, the UE determines the UL TX beam for PRACH preamble transmission.

At operation 3005, the UE sets TX power=P. P is an initial power which can be calculated based on DL received power as in prior art.

At operation 3007, the UE transmit PRACH preamble one or multiple times (for RX sweeping at the BS) using the determined UL TX beam and the TX power.

At operation 3009, the UE determines that the RAR is successfully received. If received, at operation 3011, it is determined as a random access success. If not received, at operation 3013, the UE determines whether the PRACH Preamble Transmission Counter is equal to MAX TX COUNTER. If the PRACH Preamble Transmission Counter is equal to MAX TX COUNTER, it is determined as a random access failure at operation 3015. If the PRACH Preamble Transmission Counter is not equal to MAX TX COUNTER, the UE sets the PRACH Preamble Transmission Counter=PRACH Preamble Transmission Counter+1 at operation 3017.

At operation 3019, the UE determines the UL TX beam for PRACH transmission again. At operation 3021, the UE determines the UL TX beam is changed. If changed, go back to the operation 3007. If not changed, the UE sets the TX Power=TX Power+PowerRampingStep at operation 3023, and then go back for the operation 3007.

The MAX TX Counter can be predefined or can be configured by network (example by RRC signaling or in system information, and the like).

Figure 31A:
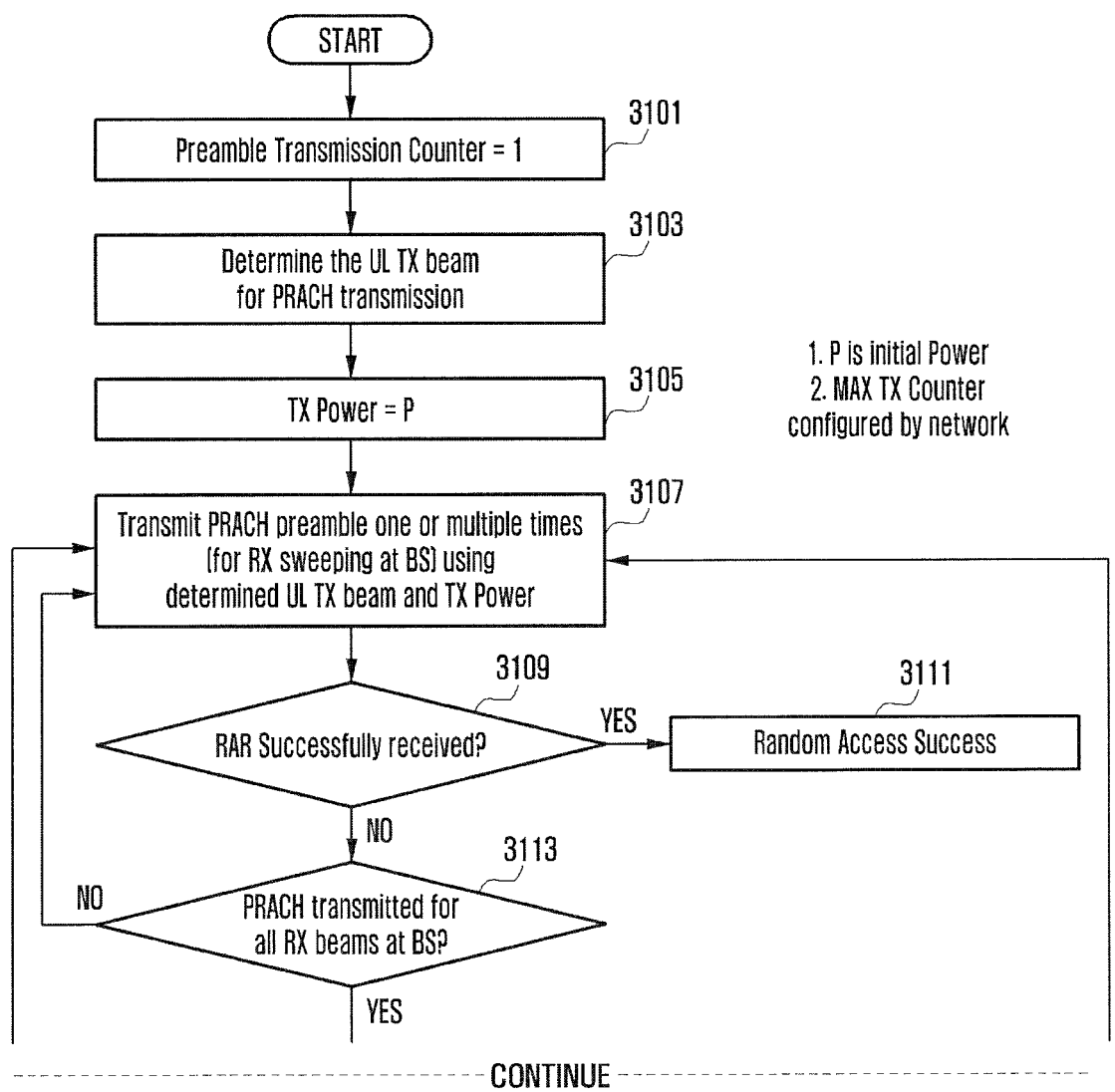
FIGS. 31A and 31B are flowcharts illustrating a method for power ramping during a random access procedure in beamformed system according to an embodiment of the present disclosure.
Figure 31B:
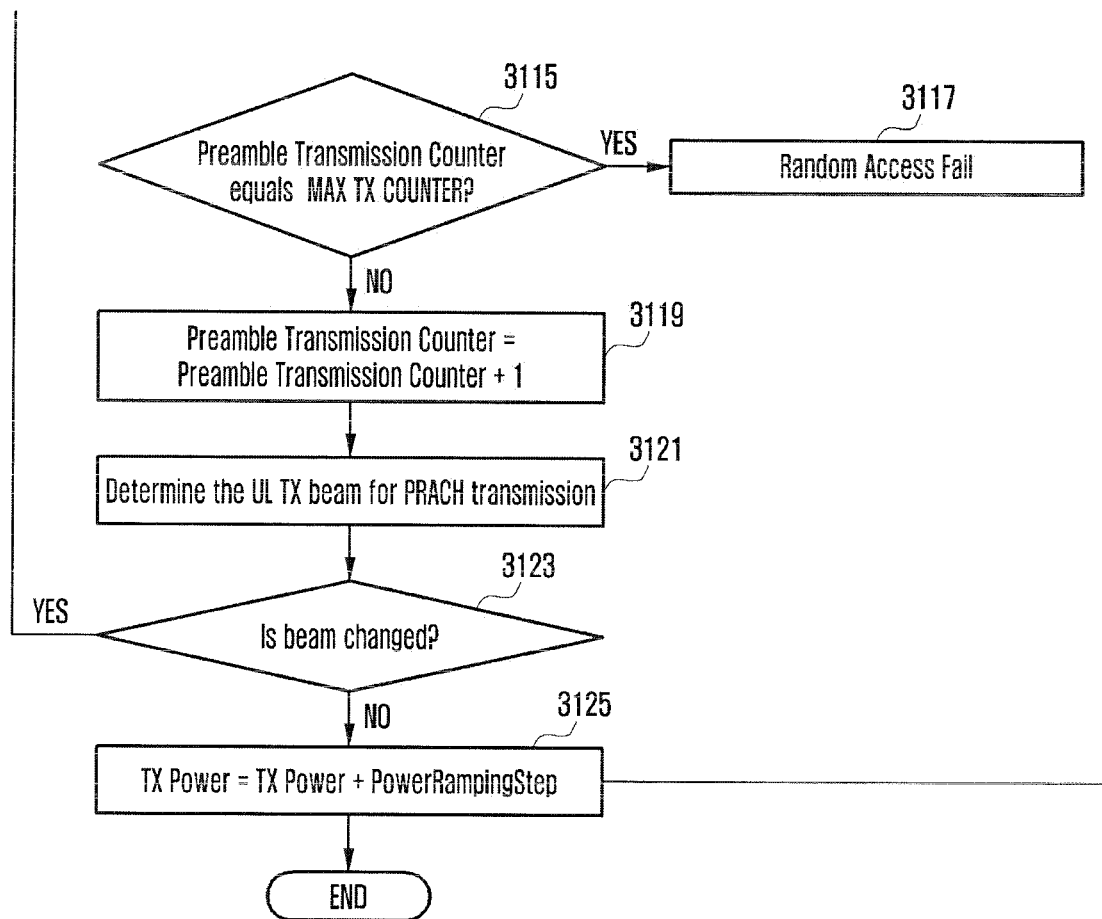

FIGS. 31A and 31B are flowcharts illustrating a method for power ramping during a random access procedure in beamformed system according to an embodiment of the present disclosure.

Referring to FIGS. 31A and 31B, at operation 3101, the UE sets PRACH Preamble Transmission Counter to 1. At operation 3103, the UE determines the UL TX beam for PRACH preamble transmission.

At operation 3105, the UE sets TX power=P. P is an initial power which can be calculated based on DL received power as in prior art.

At operation 3107, the UE transmit PRACH preamble one or multiple times (for RX sweeping at the BS) using the determined UL TX beam and the TX power.

At operation 3109, the UE determines that the RAR is successfully received. If received, at operation 3111, it is determined as a random access success. If not received, at operation 3113, the UE determines whether PRACH preamble is transmitted for all RX beams at the BS. If the PRACH prepare is not transmitted for all RX beams at the BS, go back for the operation 3107. If so, the UE determines whether the Preamble Transmission Counter is equal to MAX TX COUNTER at operation 3115. If the Preamble Transmission Counter is equal to MAX TX COUNTER, it is determined as a random access failure at operation 3117. If the Preamble Transmission Counter is not equal to MAX TX COUNTER, the UE sets the Preamble Transmission Counter=Preamble Transmission Counter+1 at operation 3119.

At operation 3121, the UE determines the UL TX beam for PRACH transmission again. At operation 3123, the UE determines the UL TX beam is changed. If changed, go back to the operation 3107. If not changed, the UE sets the TX Power=TX Power+PowerRampingStep at operation 3125, and then go back for the operation 3107.

The MAX TX Counter can be predefined or can be configured by network (example by RRC signaling or in system information, and the like).

According to various examples, Beam Gain and RACH Power Calculation during Random Access in Beamformed System might be calculated based on:

Calculate path loss ($PL_c$) compensating for TX (at eNB) and RX (at UE) beamforming gain $$P_{PRACH} = \min \{P_{CMAX,c}[i], PREAMBLE\_RECEIVED\_TARGET\_POWER+PL_c\},$$

where, $P_{CMAX,c}[i]$, is the configured the UE transmits power for subframe i of serving cell 'c'

$$P_{CMAX\_L,c} < P_{CMAX,c} < P_{CMAX\_H,c}$$

$$P_{CMAX\_H,c} = \min \{P_{EMAX,c}, P_{Powerclass}\}$$

$P_{EMAX,c}$ is the value given by IE P-Max (in SIB1) for serving cell c $P_{PowerClass}$ is the maximum UE power Scale $P_{PRACH}$ considering TX/RX beamforming gain In a plurality of the embodiment of the present disclosure, a Random Access procedure in NR (new radio access technology (RAT)) is provided.

Method 1

At higher frequency, beamforming is necessary to compensate for high path loss. The UE/eNB needs to transmit/receive RA preamble and MSG3 using beamforming. The ENB/UE needs to transmit/receive the RAR and MSG4 using beamforming. The UE and eNB may support multiple TX/RX beams where each TX/RX beam covers a specific coverage area. If the beamforming is simply applied to each operation in RA procedure the resulting RA procedure will look as shown in FIG. 32.

Figure 32:
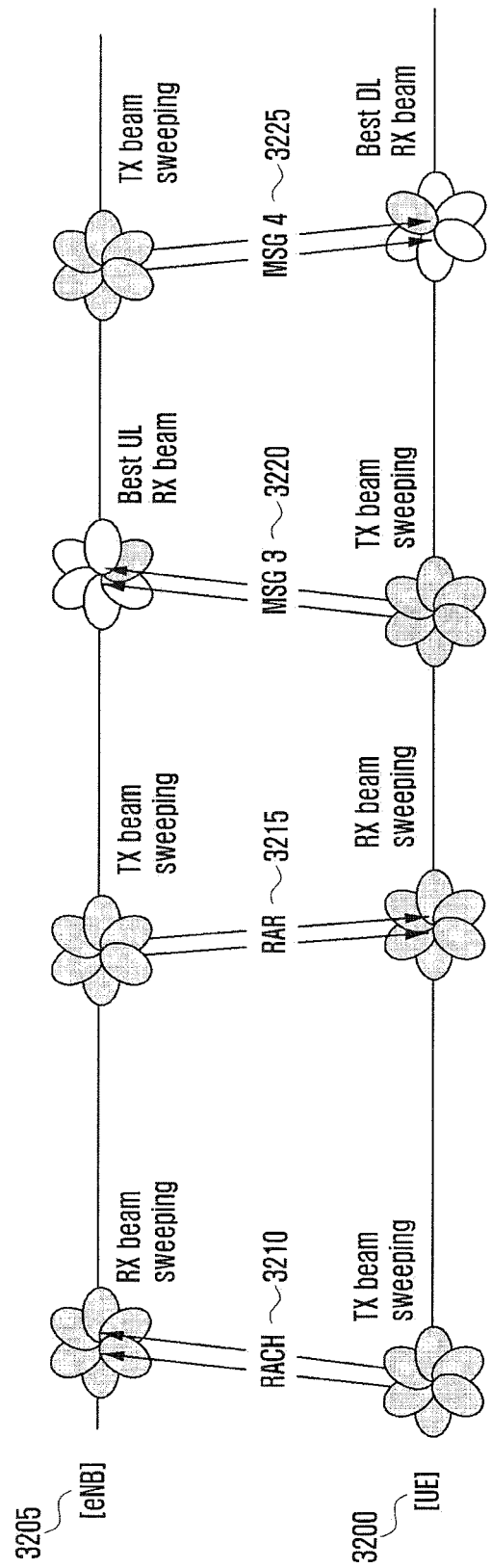
FIG. 32 is a flowchart illustrating a method for a random access procedure in a new radio access technology (RAT) according to an embodiment of the present disclosure.

FIG. 32 is a flowchart illustrating a method for a random access procedure in a new radio access technology (RAT) according to an embodiment of the present disclosure.

Referring to FIG. 32, at operation 3210, the UE 3200 transmits RA preamble using all its TX beams, where each TX beam transmission is repeated for each RX beam of the eNB 3205.

At operation 3215, the eNB 3205 transmits the RAR using all TX beams, where each TX beam transmission is repeated for each RX beam of the UE 3200. The RAR includes TA, UL grant, RAPID (preamble index).

At operation 3220, the UE 3200 transmits MSG3 using all TX beams, where MSG3 is transmitted once from each TX beam. The eNB 3205 receives MSG3 using best UL RX beam where best UL RX beam is the RX beam which was used to successfully receive RA preamble in operation 3210.

At operation 3225, the eNB 3205 transmits MSG4 using all TX beams, where MSG4 is transmitted once from each TX beam. The UE 3200 receives MSG4 using best DL RX beam where best DL RX beam is the RX beam which was used to successfully receive the RAR in operation 3215.

Applying beamforming to each operation of RA procedure leads to significant:

Delay in completing the four steps of RA procedure because of TX/RX beam sweeping.

Wastage of resources as MSG3/MSG4 needs to be transmitted from each TX beam of the UE and the eNB respectively.

Power consumption in the UE/eNB because of transmissions using multiple TX beams.

The above mentioned issues can be overcome if the number of TX/RX beams used in each operation of RA procedure can be minimized (if possible, one TX/RX beam at each step).

Some of the potential enhancements to overcome the above mentioned issues are discussed below.

Method 2

Figure 33:
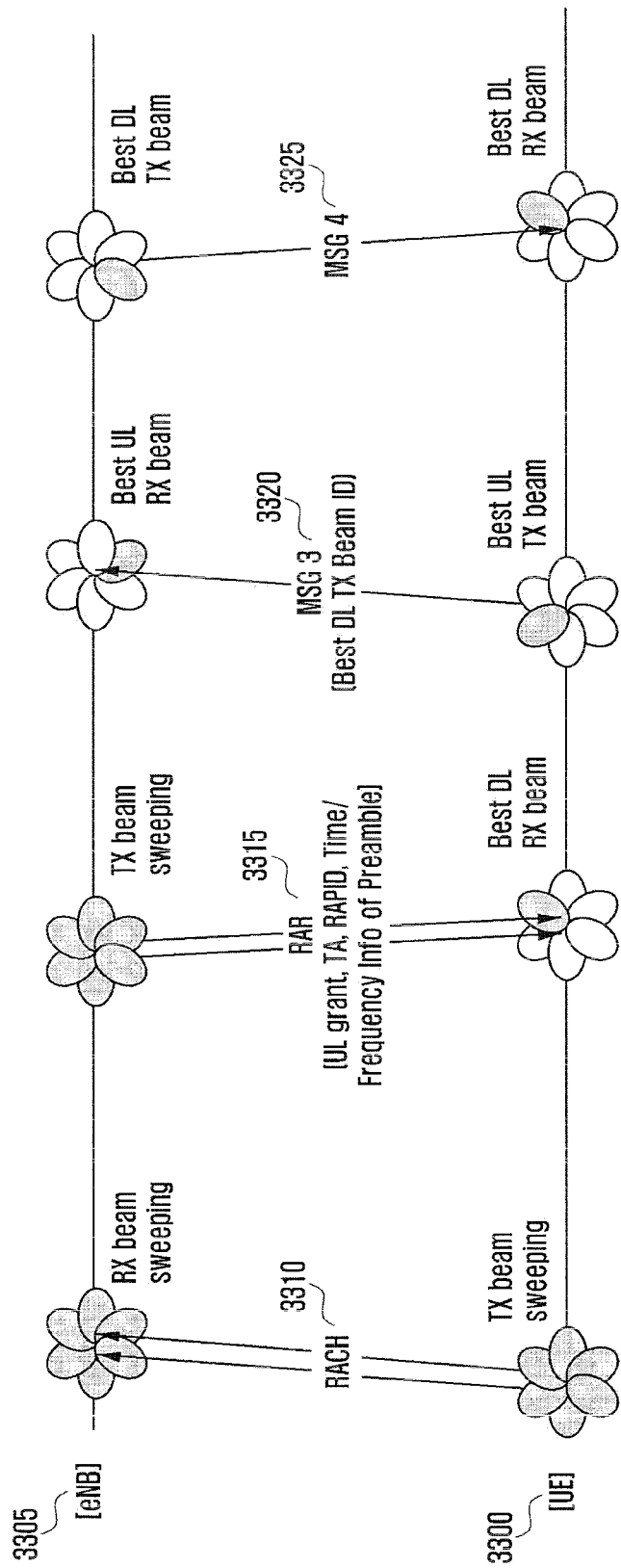
FIG. 33 is a flowchart illustrating a method for a random access procedure in the new RAT according to an embodiment of the present disclosure.

This method of the disclosure is illustrated in FIG. 33 according to an embodiment of the present disclosure.

FIG. 33 is a flowchart illustrating a method for a random access procedure in the new RAT according to an embodiment of the present disclosure.

Referring to FIG. 33, in case of beamformed system, the eNB 3305 may periodically broadcast synchronization signals (e.g., primary synchronization signal (PSS/secondary synchronization signal (SSS)) and broadcast channel (e.g., physical broadcasting channel (PBCH)) using beamforming.

The eNB 3305 may also periodically broadcast reference signals using beamforming. Before initiating the RA procedure, the UE 3300 at least has to acquire these beamformed signals for DL synchronization.

At operation 3310, the UE 3300 transmits RA preamble using all its TX beams, where each TX beam transmission is repeated for each RX beam of the eNB 3305.

At operation 3315, the eNB 3305 transmits the RAR using all TX beams. As part of DL synchronization, the UE 3300 can know the best DL RX beam for receiving the beamformed DL transmissions. The UE 3300 can receive the RAR using best DL RX beam instead of RX sweeping. The eNB 3305 does not have to repeat the RAR transmission for each RX beam of the UE 3300. The eNB 3305 transmits the RAR using all TX beams, where the RAR is transmitted once from each TX beam. The eNB 3305 inform the UE 3300 about the time and frequency information of detected preamble in the RAR in addition to RAPID.

At operation 3320, the UE uses the information received in the RAR to determine the best UL TX beam. Best UL TX beam is the TX beam used by the UE 3300 to transmit RA preamble identified by RAPID in the time and frequency information received in the RAR. The UE 3300 can use best UL TX beam to transmit MSG3 instead of TX sweeping. At operation 3320, the UE 3300 transmits MSG3 using best UL TX beam. Similar to determining the best DL RX beam based on broadcasted beamformed DL signals (e.g., PSS/SSS/PBCH/BRS), the UE 3300 can also determine the best DL TX beam. The UE 3300 can feedback the best DL TX beam ID or SS Block ID (SS block ID is the ID of SS block in which the UE has received the synchronization signal or reference signal with best signal quality) to the eNB 3305 in MSG3. As a result, the eNB 3305 does not have to transmit MSG4 using multiple TX beams. The eNB 3305 receives MSG3 using best UL RX beam where best UL RX beam is the RX beam which was used to successfully receive RA preamble in operation 3310.

At operation 3325, the eNB 3305 transmits MSG4 using best DL TX beam (indicated by the UE in MSG3) and the UE 3300 receives MSG4 using best DL RX beam. If SS block ID is reported by the UE 3300 instead of DL TX beam ID, then the eNB 3305 transmits MSG4 using DL TX beam(s) to transmit synchronization signal or reference signal in the SS block of that SS block ID.

Method 3

Figure 34:
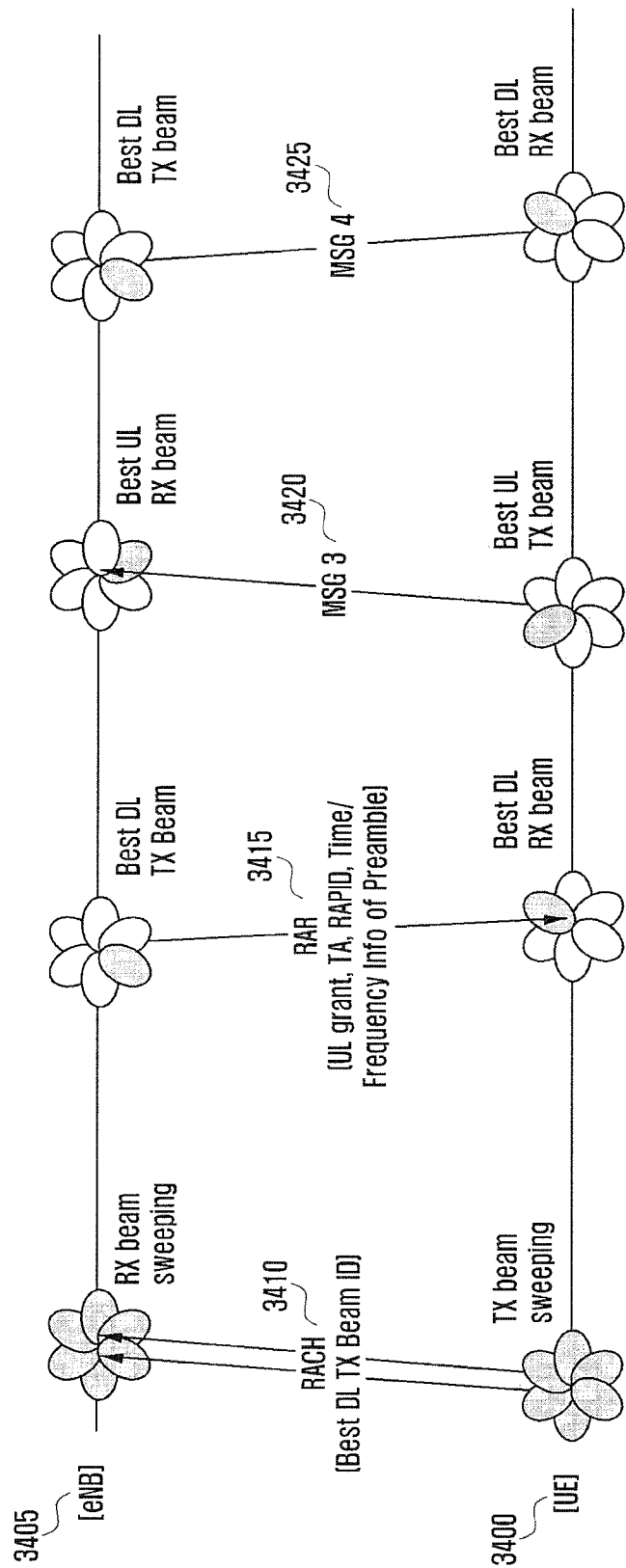
FIG. 34 is a flowchart illustrating a method for a random access procedure in the new RAT according to an embodiment of the present disclosure.

This method of the disclosure is illustrated in FIG. 34 according to an embodiment of the present disclosure.

FIG. 34 is a flowchart illustrating a method for a random access procedure in the new RAT according to an embodiment of the present disclosure.

Referring to FIG. 34, in case of beamformed system, the eNB 3405 may periodically broadcast synchronization signals (e.g., PSS/SSS) and broadcast channel (e.g., PBCH) using beamforming. The eNB 3405 may also periodically broadcast reference signals using beamforming. Before initiating the RA procedure, the UE 3400 at least has to acquire these beamformed signals for DL synchronization.

At operation 3410, the UE 3400 transmits RA preamble using all its TX beams, where each TX beam transmission is repeated for each RX beam of the eNB 3405. The UE 3400 feedbacks the best DL TX beam ID or SS block ID (SS block ID is the ID of SS block in which the UE has received the synchronization signal or reference signal with best signal quality) at this step. TX beam sweeping for the RAR transmission can be reduced if best DL TX beam ID or SS block ID is feed backed during RA preamble transmission instead of MSG3. In order to indicate DL TX beam ID or SS block ID, this embodiment requires mapping between RA preamble(s) and DL TX beam ID/SS block ID and/or RA resource (time/frequency) and DL TX beam ID/SS block ID.

At operation 3415, the eNB 3405 transmits the RAR using best DL TX beam indicated by the UE in operation 3410. If SS block ID is reported by the UE 3400 instead of DL TX beam ID, then the eNB 3405 transmits the RAR using DL TX beam(s) to transmit synchronization signal or reference signal in the SS block of that SS block ID. The eNB 3405 informs the UE 3400 about the time and frequency information of detected preamble in the RAR in addition to RAPID. As part of DL synchronization the UE 3400 can know the best DL RX beam for receiving the beamformed DL transmissions. The UE 3400 can receive the RAR using best DL RX beam instead of RX sweeping.

At operation 3420, the UE uses the information received in the RAR to determine the best UL TX beam. Best UL TX beam is the TX beam used by the UE 3400 to transmit RA preamble identified by RAPID in the time and frequency information received in the RAR. The UE 3400 can use best UL TX beam to transmit MSG3 instead of TX sweeping. At operation 3420, the UE 3400 transmits MSG3 using best UL TX beam. MSG 3 may also include best DL TX beam ID/SS block ID. The eNB 3405 receives MSG3 using best UL RX beam where best UL RX beam is the RX beam which was used to successfully receive RA preamble in operation 3410.

At operation 3425, the eNB 3405 transmits MSG4 using best DL TX beam (indicated by the UE at operation 3410 or at operation 3420) and the UE 3400 receives MSG4 using best DL RX beam.

Method 4

Figure 35:
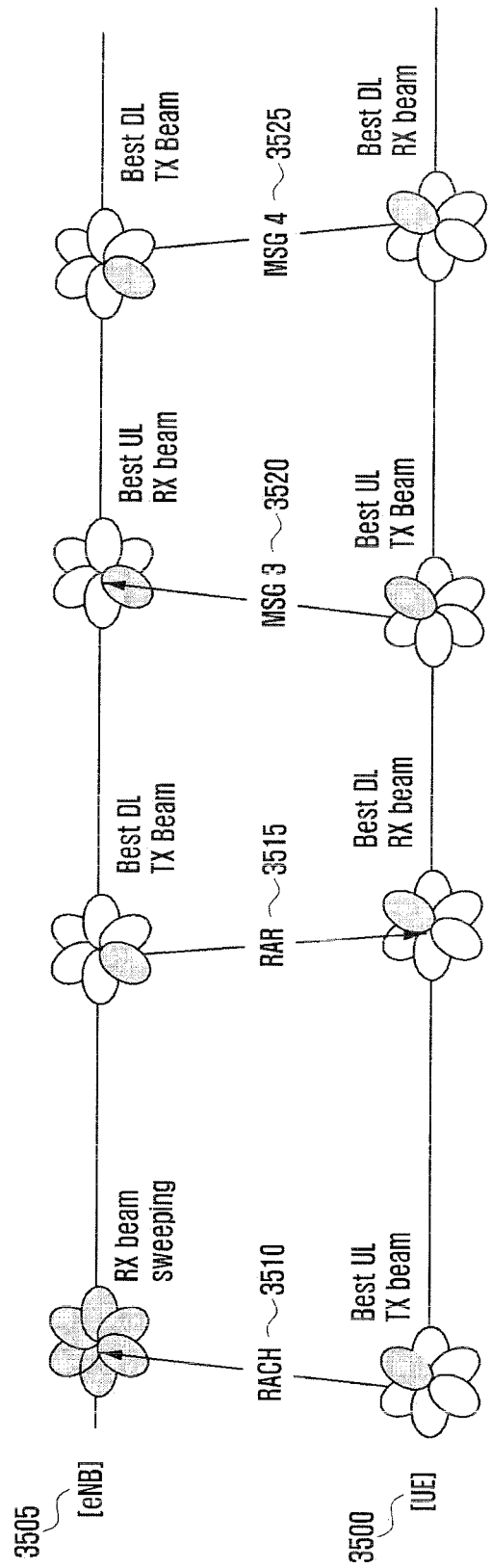
FIG. 35 is a flowchart illustrating a method for a random access procedure in the new RAT according to an embodiment of the present disclosure.

This method of the disclosure is illustrated in FIG. 35 according to an embodiment of the present disclosure.

FIG. 35 is a flowchart illustrating a method for a random access procedure in the new RAT according to an embodiment of the present disclosure.

Referring to FIG. 35, in case of time division duplex (TDD) system DL and UL channel can be reciprocal. Channel reciprocity can be used to simplify the RA procedure in beamformed TDD system.

The UE 3500 can determine the best DL RX beam based on broadcasted beamformed DL signals (e.g., PSS/SSS/PBCH/BRS). The UE 3500 then uses UL TX beam having same coverage as the best DL RX beam for transmission of RA preamble and MSG3. At operation 3510, the UE 3500 can transmit RA preamble using UL TX beam once or multiple times (one for each RX beam of the eNB 3505). Network (eNB) 3505 may inform the UE 3500 using broadcast or dedicated signaling whether it needs to transmit RA preamble using TX beam once or multiple times (one for each RX beam of the eNB 3505). Network (eNB) 3505 may also inform the UE 3500 using broadcast or dedicated signaling whether it needs to transmit RA preamble using multiple TX beams. In alternate embodiment of the present disclosure, UL TX beam for MSG3 can also be determined using the procedure explained in FIG. 33.

At operation 3515, the UE 3500 uses the best DL RX beam for reception of the RAR. The eNB 3505 transmits the RAR using the TX beam having same coverage as the UL RX beam through which RA preamble was detected. The RAR includes TA, UL grant, RAPID.

At operation 3520, the UE 3500 transmits MSG3 using best UL TX beam and the eNB 3505 receives MSG3 using the UL RX beam through which RA preamble was detected.

At operation 3525, the eNB 3505 transmits MSG4 using best DL TX beam and the UE 3500 receives MSG4 using best DL RX beam.

This approach is even better than RA procedure illustrated in FIG. 34 as there is no TX beam sweeping for RA preamble transmission. Also there is no need of any beam feedback.

RACH transmission is different in operation of FIGS. 34 and 35. The UE needs to know which operation to perform. In an embodiment of the present disclosure, network (eNB) can signal whether the UE performs RACH transmission as in FIG. 34 or 35. Alternately, the UE performs RACH transmission as in FIG. 34 for an FDD system and as in FIG. 35 for a TDD system. Alternately, the UE performs operation as in FIG. 35 in the TDD system, if mapping between RA preamble(s) and DL TX beam ID or RA resource (time/frequency) and DL TX beam ID is not signaled by network. Alternately, the UE performs operation as in FIG. 35 if mapping between RA preamble(s) and DL TX beam ID or RA resource (time/frequency) and DL TX beam ID is not signaled by network.

In the operation of FIGS. 32, 33, 34, and 35, RACH resource is defined as a time-frequency resource to send RACH preamble. Network (eNB) may inform (via broadcast or dedicated signaling) whether the UE needs to transmit one or multiple/repeated preamble within a subset of RACH resources. Network may inform the UE using broadcast or dedicated signaling whether it needs to transmit RA preamble using TX beam once or multiple times (one for each RX beam of the eNB). Network may also inform the UE using broadcast or dedicated signaling whether it needs to transmit RA preamble using multiple TX beams. DL synchronisation signals or reference signals or broadcast channel are transmitted multiple times in case of beamforming system. One or multiple DL TX beams can be used for transmitting DL synchronisation signals or reference signals or broadcast channel in each occasion. Network may indicate the association between one or multiple occasions of DL broadcast signal/channel and a subset of RACH resources in broadcast or dedicated signaling. The UE selects the RACH resources for PRACH transmission (s) based on measurement of DL channel/signal and the association between occasions of DL broadcast signal/channel and a subset of RACH resources. The UE selects the RACH resources corresponding to occasion in which it has received the DL synchronisation signals or reference signals or broadcast channel with best or suitable signal quality. In an embodiment of the present disclosure, the occasion can be an SS block.

According to various examples, the BS may inform the UE about the additional reference signals to be measured by the UE in the RAR. These additional reference signals may be transmitted using narrow beams. These narrow beams may be selected by the BS based on PRACH transmission received from the UE.

The UE transmits the PRACH using PRACH resource corresponding to SS occasion in which it has received the DL synchronisation signals or reference signals or broadcast channel with best or suitable signal quality. So, based on PRACH transmission the BS can know the occasion or SS block in which the UE has successfully received the DL signal. SS block may be transmitted by the BS using wide beam or multiple narrow beams. The additional reference signals indicated in the RAR corresponds to these narrow beams or narrow beams covering the area covered by wide beam.

After receiving the RAR, the UE perform the measurement of these additional reference signals and sends the report (e.g., one or more strongest beams), in MSG3.

According to various examples, source the BS can provide the additional reference signals of target BS to the UE in handover command. The UE performs measurement of these additional reference signals and sends the report (e.g., one or more strongest beams) to target the BS in MSG 3 during the random access procedure with the target BS.

Figure 36:
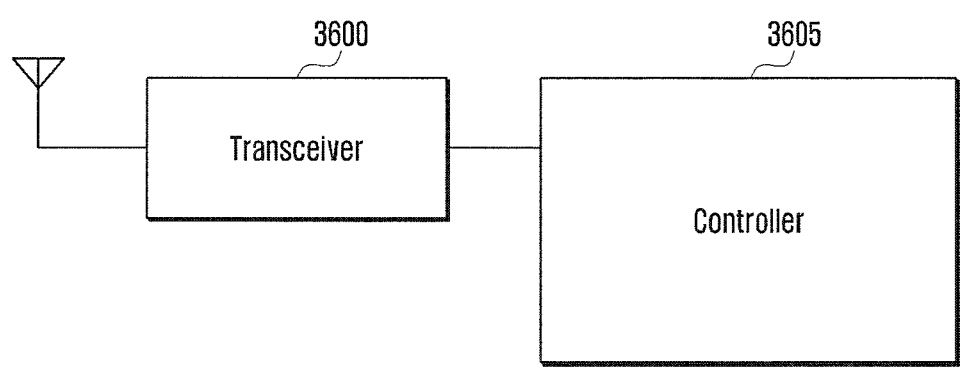
FIG. 36 is a block diagram of a terminal apparatus according to an embodiment of the present disclosure.

FIG. 36 is a block diagram of a terminal apparatus according to various embodiments of the present disclosure.

Referring to FIG. 36, the terminal apparatus includes a transceiver 3600 (ex) RF module, and the like) and a controller 3605 (ex) at least one processor). The transceiver 3600 is capable of transmission/reception of signals to/from at least one base station (ex) MeNB, SeNB) by controlling of the controller. The controller 3605 is capable of performing operations of terminal (UE) in the various embodiments of the present disclosure.

Figure 37:
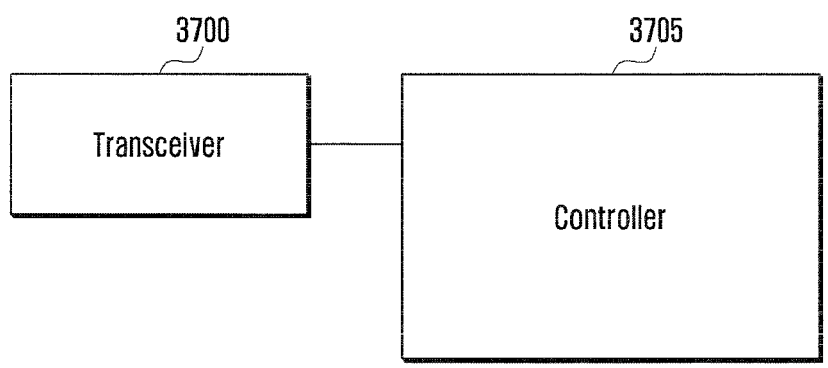
FIG. 37 is a block diagram of a base station (e.g., a master eNB (MeNB) or a secondary eNB (SeNB)) according to an embodiment of the present disclosure.

FIG. 37 is a block diagram of a base station (ex) MeNB or SeNB) according to various embodiments of the present disclosure.

Referring to FIG. 37, the base station includes a transceiver 3700 (ex) RF module, and the like) and a controller 3705 (ex) at least one processor). The transceiver 3700 is capable of transmission/reception of signals to/from at least one terminal and another base station by controlling of the controller. The controller 3705 is capable of performing operations of a base station (MeNB or SeNB) in the various embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of performing a random access by a terminal in a wireless communication system, the method comprising:
    transmitting, to a base station, a first random access preamble using a first uplink (UL) transmission (TX) beam based on a first power;
    identifying whether a random access response (RAR) as a response to the first random access preamble is received during a RAR window;
    if the RAR is not received during the RAR window, determining which beam is used to transmit a second random access preamble;
    if the first UL TX beam is determined to be used to transmit the second random access preamble, identifying a second power by ramping up the first power by a predetermined value and transmitting the second random access preamble using the first UL TX beam based on the second power; and
    if a second UL TX beam different from the first UL TX beam is determined to be used to transmit the second random access preamble, transmitting the second random access preamble using the second UL TX beam without a power ramping up.

2. The method of claim 1, further comprising:
    if the RAR is not received during the RAR window, increasing a number of transmissions of random access preamble by 1.

3. The method of claim 2, further comprising:
    if the number of transmissions of random access preamble reaches a maximum value, determining that a random access has failed.

4. The method of claim 1, further comprising:
receiving information on association between occasions for synchronization signal (SS) block and a subset of resources for random access preamble.

5. The method of claim 4, further comprising:
determining a first downlink (DL) reception (RX) beam based on a downlink signal of the SS block; and
identifying the first UL TX beam corresponding to the determined first DL RX beam.

6. The method of claim 4, wherein the determining of which beam is used to transmit the second random access preamble comprises:
determining a DL RX beam based on a downlink signal of the SS block; and
identifying a UL TX beam corresponding to the determined DL RX beam.

7. A terminal in a wireless communication system, the terminal comprising:
a transceiver configured to transmit and receive signals; and
at least one processor configured to:
control the transceiver to transmit, to a base station, a first random access preamble using a first uplink (UL) transmission (TX) beam based on a first power,
identify whether a random access response (RAR) as a response to the first random access preamble is received during a RAR window,
if the RAR is not received during the RAR window, determine which beam is used to transmit a second random access preamble,
if the first UL TX beam is determined to be used to transmit the second random access preamble, identify a second power by ramping up the first power by a predetermined value and transmitting the second random access preamble using the first UL TX beam based on the second power, and
if a second UL TX beam different from the first UL TX beam is determined to be used to transmit the second random access preamble, control the transceiver to transmit the second random access preamble using the second UL TX beam without a power ramping up.

8. The terminal of claim 7, wherein the at least one processor is further configured to:
if the RAR is not received during the RAR window, increase a number of transmissions of random access preamble by 1.

9. The terminal of claim 8, wherein the at least one processor is further configured to:
if the number of transmissions of random access preamble reaches a maximum value, determine that a random access has failed.

10. The terminal of claim 7, wherein the at least one processor is further configured to:
control the transceiver to receive information on association between occasions for synchronization signal (SS) block and a subset of resources for random access preamble.

11. The terminal of claim 7, wherein the at least one processor is further configured to:
determine a first downlink (DL) reception (RX) beam based on a downlink signal of the SS block, and
identify the first UL TX beam corresponding to the determined first DL RX beam.

12. The terminal of claim 7, wherein the at least one processor is further configured to:
determine a DL RX beam based on a downlink signal of the SS block, for determining which beam is used to transmit the second random access preamble, and
identify a UL TX beam corresponding to the determined DL RX beam.

* * * * *